(12) United States Patent
Ariizumi et al.

(10) Patent No.: US 9,990,540 B2
(45) Date of Patent: Jun. 5, 2018

(54) OPERATION ESTIMATION APPARATUS, ROBOT, AND OPERATION ESTIMATION METHOD

(71) Applicant: HONDA MOTOR CO., LTD., Tokyo (JP)

(72) Inventors: Takahiro Ariizumi, Wako (JP); Takahiro Nakamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 1 day.

(21) Appl. No.: 15/156,920

(22) Filed: May 17, 2016

(65) Prior Publication Data
US 2016/0342830 A1 Nov. 24, 2016

(30) Foreign Application Priority Data
May 18, 2015 (JP) ................. 2015-100958

(51) Int. Cl.
*G06K 9/00* (2006.01)
*G06F 17/30* (2006.01)
(Continued)

(52) U.S. Cl.
CPC ... *G06K 9/00335* (2013.01); *G06F 17/30598* (2013.01); *G06K 9/00362* (2013.01);
(Continued)

(58) Field of Classification Search
CPC ........ G06F 3/017; G06F 3/011; G06F 3/0482; G06F 3/01; G06F 21/31; G06F 1/3231;
(Continued)

(56) References Cited

U.S. PATENT DOCUMENTS

2004/0190776 A1* 9/2004 Higaki ............... G06K 9/00375
382/190
2009/0010490 A1* 1/2009 Wang ................. G06K 9/00771
382/103
(Continued)

FOREIGN PATENT DOCUMENTS

JP 2006-099749 4/2006

OTHER PUBLICATIONS

Chiang, Cheng-Chieh. "Automatic Raising Hand Detection in an Intelligent Classroom." International Journal of Engineering Innovations and Research 3, No. 2 (2014): 151.*
(Continued)

*Primary Examiner* — Carol Wang
(74) *Attorney, Agent, or Firm* — Rankin, Hill & Clark LLP

(57) ABSTRACT

An operation estimation apparatus includes a distance measurement unit configured to measure a distance for a predetermined range, a human-body processing unit configured to detect a person on the basis of a distribution of measured distances, a tracking unit configured to assign an identifier to each detected person, and a situation estimation unit configured to estimate reaction of the person on the basis of a human data height which is a value of a height direction included in the measured distance in a first period set by prompting the person to start and end hand raising, wherein the situation estimation unit measures the human data height for each person to which the identifier is assigned a plurality of times in the first period, extracts an identifier for which human data heights are in the predetermined range, and estimates the reaction of the person corresponding to the extracted identifier.

16 Claims, 32 Drawing Sheets

(51) Int. Cl.
*G06T 7/246* (2017.01)
*B25J 9/16* (2006.01)

(52) U.S. Cl.
CPC .......... *G06K 9/00771* (2013.01); *G06T 7/246* (2017.01); *B25J 9/1697* (2013.01); *G06T 2207/10028* (2013.01); *G06T 2207/30196* (2013.01); *G06T 2207/30242* (2013.01)

(58) Field of Classification Search
CPC ........... G06K 9/00355; G06K 9/00335; G06K 9/00375; G06K 9/00362; G06K 9/00771; B25J 9/1697
See application file for complete search history.

(56) References Cited

U.S. PATENT DOCUMENTS

| | | | | |
|---|---|---|---|---|
| 2009/0079813 A1* | 3/2009 | Hildreth | ................. | H04N 7/147 348/14.03 |
| 2011/0001813 A1* | 1/2011 | Kim | ................... | G06K 9/00355 348/77 |
| 2011/0154266 A1* | 6/2011 | Friend | ..................... | A63F 13/06 715/863 |
| 2011/0157009 A1* | 6/2011 | Kim | ....................... | G06F 3/017 345/156 |
| 2011/0169917 A1* | 7/2011 | Stephen | .................. | G06T 7/246 348/46 |
| 2011/0289456 A1* | 11/2011 | Reville | ................... | G06F 3/017 715/830 |
| 2013/0194175 A1* | 8/2013 | Tarama | ................... | G06F 3/005 345/156 |
| 2014/0089849 A1* | 3/2014 | Choi | ...................... | G06F 3/017 715/810 |
| 2014/0267008 A1* | 9/2014 | Jain | ......................... | G06F 3/017 345/156 |
| 2015/0079565 A1* | 3/2015 | Miller | .................. | G09B 23/281 434/252 |
| 2015/0154453 A1* | 6/2015 | Wilf | ..................... | G06K 9/00711 382/103 |
| 2015/0262003 A1* | 9/2015 | Toba | .................. | G06K 9/00355 382/106 |
| 2016/0253044 A1* | 9/2016 | Katz | ....................... | G06F 3/017 |

OTHER PUBLICATIONS

Duan, Xiaodong, and Hong Liu. "Detection of hand-raising gestures based on body silhouette analysis." In Robotics and Biomimetics, 2008. ROBIO 2008. IEEE International Conference on, pp. 1756-1761. IEEE, 2009.*

Kapralos, Bill, Andrew Hogue, and Hamed Sabri. "Recognition of hand raising gestures for a remote learning application." In Image Analysis for Multimedia Interactive Services, 2007. WIAMIS'07. Eighth International Workshop on, pp. 38-38. IEEE, 2007.*

* cited by examiner

FIG. 12
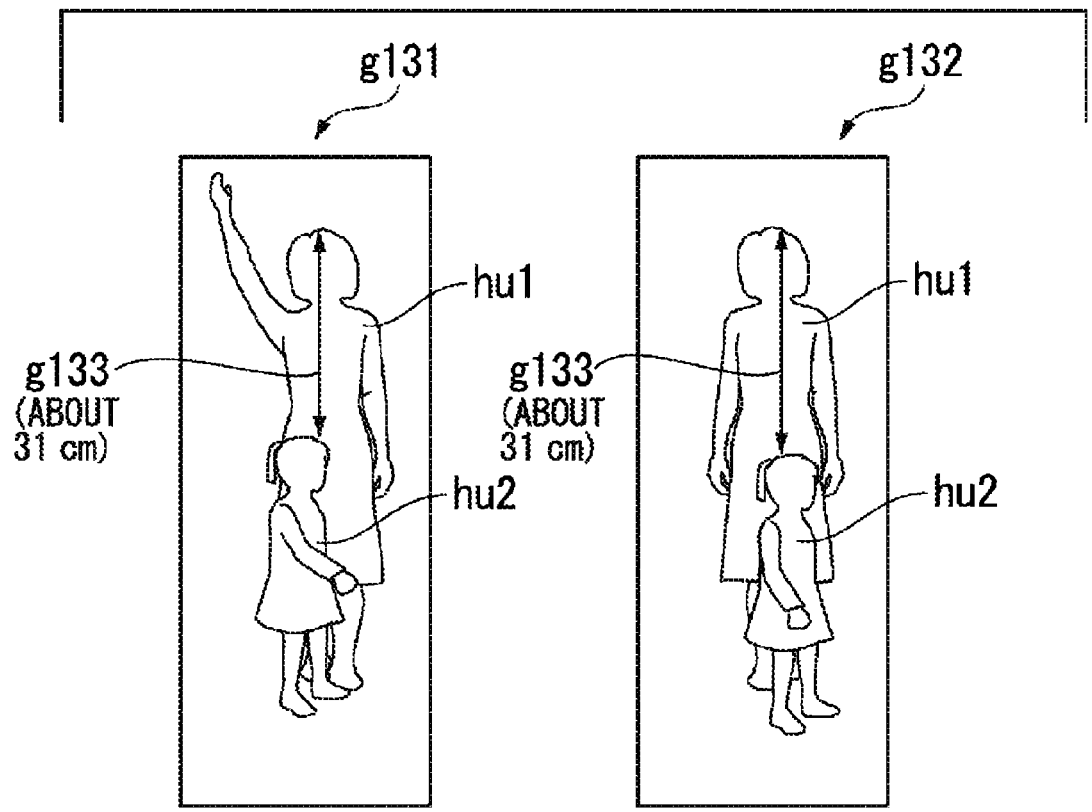
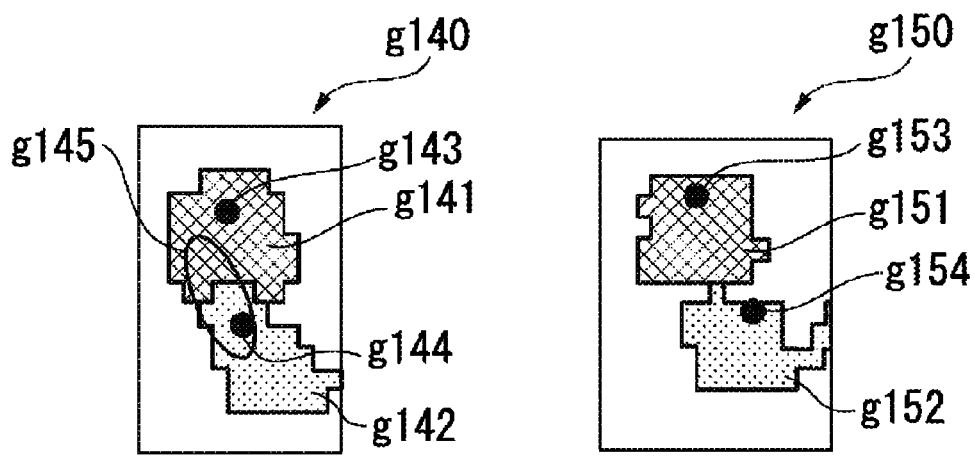

OPERATION ESTIMATION APPARATUS, ROBOT, AND OPERATION ESTIMATION METHOD

CROSS-REFERENCE TO RELATED APPLICATION

Priority is claimed on Japanese Patent Application No. 2015-100958, filed May 18, 2015, the content of which is incorporated herein by reference.

BACKGROUND OF THE INVENTION

Field of the Invention

The present invention relates to an operation estimation apparatus, a robot, and an operation estimation method.

Description of Related Art

An apparatus (hereinafter, referred to as a gesture recognition apparatus) for recognizing a gesture in which a will or emotion is represented according to motion of each portion of a human body such as an arm, a hand, a finger, a foot, or a head has been proposed.

In the above-described gesture recognition apparatus, a specific portion of a person in a detection target area is extracted on the basis of an image for which a value of a distance to a physical object in the detection target area is designated as a pixel value generated by an image sensor. In the gesture recognition apparatus, recognizing a predetermined gesture in a specific space on the basis of time-series data of a shape of an extracted specific portion has been proposed. Also, the specific portion is, for example, a portion anterior to a wrist of a human hand and a predetermined gesture is, for example, an operation in which the hand is held over an image sensor (for example, see Japanese Unexamined Patent Application, First Publication No. 2006-99749 (hereinafter, Patent Literature 1)).

SUMMARY OF THE INVENTION

However, in the technology disclosed in Patent Literature 1, only the case in which only one person is in a detection target area is considered. Thus, in the technology disclosed in Patent Literature 1, if a distance between adjacent persons is short when a plurality of persons are in the detection target area, it is not possible to separately recognize the persons adjacent to each other. Thus, in the technology disclosed in Patent Literature 1, when a plurality of persons are in the detection target area, there is a problem in that it is not possible to recognize gestures of the plurality of persons in the detection target area.

An aspect according to the present invention has been made in view of the above-described problem and an objective of the present invention is to provide an operation estimation apparatus, a robot, and an operation estimation method capable of improving the precision of detection of operations of a plurality of persons in a detection target area.

In order to achieve the above-described objective, the present invention adopts the following aspects.

(1) According to an aspect of the present invention, there is provided an operation estimation apparatus including: a distance measurement unit configured to measure a distance for a predetermined range; a human-body processing unit configured to detect a person on the basis of a distribution of distances measured by the distance measurement unit; a tracking unit configured to assign an identifier to each person detected by the human-body processing unit; and a situation estimation unit configured to estimate the reaction of the person on the basis of a human data height which is a value of a height direction included in the measured distance in a first period set by prompting the person to start and end hand raising, wherein the situation estimation unit measures the human data height for each person to which the identifier is assigned by the tracking unit a plurality of times in the first period, extracts an identifier for which a plurality of human data heights are in the predetermined range, and estimates the reaction of the person corresponding to the extracted identifier.

(2) In the aspect (1), the situation estimation unit may calculate a hand-raising threshold value set on the basis of an average value or a maximum value of the human data heights in a second period in which no person performs the hand raising for each person and human physique data, extract a person for which the number of times that the human data height exceeding the hand-raising threshold value is measured is greater than the predetermined number of times in the first period, and estimate the reaction of the extracted person.

(3) In the aspect (2), the situation estimation unit may determine the predetermined number of times on the basis of the number of times that the human data height exceeding the hand-raising threshold value is measured and information indicating a distribution associated with whether the hand raising is performed in the first period.

(4) In any one of the aspects (1) to (3), the human-body processing unit may divide each of a plurality of predetermined ranges into two or more regions, select a threshold value of a distribution of distances at which the person is detected on the basis of human physique data for each division region, and detect the person on the basis of the distribution of the distances which are measured.

(5) In any one of the aspect (1) to (4), the distance measurement unit may include: a plurality of distance measurement units configured to measure distances for different predetermined ranges, and the human-body processing unit may include: a plurality of clustering units configured to generate human cluster data by clustering the distances measured by the distance measurement units; and a cluster data integration unit configured to integrate the human cluster data generated by the plurality of clustering units.

(6) In any one of the aspects (1) to (5), the distance measurement unit may include: a plurality of distance measurement units configured to measure distances for different predetermined ranges, the human-body processing unit may include: a ranging data integration unit configured to integrate the distances measured by the plurality of distance measurement units for two or more predetermined ranges; and a clustering unit configured to classify the measured distances as a cluster on the basis of a result of integration by the ranging data integration unit and detect the person on the basis of the classified cluster, and the tracking unit may assign the identifier to each person detected by the clustering unit.

(7) In any one of the aspects (1) to (5), the distance measurement unit may include: a plurality of distance measurement units configured to measure distances for different predetermined ranges, the human-body processing unit may include: a ranging data integration unit configured to integrate the distances measured by the plurality of distance measurement units for two or more predetermined ranges; a dividing unit configured to re-divide each of two or more predetermined ranges which are integrated into m (m is an integer greater than or equal to 2) regions which are equal to or different from predetermined regions in shape and number; m clustering units configured to classify the measured distances included in each of the m regions as a cluster for each of the m regions and detect the person on the basis of the classified cluster; and a cluster data integration unit configured to integrate results of detections by the m clustering units, and the tracking unit may assign the identifier to each person detected by the clustering unit on the basis of the integrated results.

(8) In any one of the aspects (1) to (7), the tracking unit may detect the person at a time subsequent to a predetermined time on the basis of a position of human data corresponding to the person detected at the predetermined time.

(9) In the aspect (2) to (3), the second period may be a period set by prompting the person to end the hand raising, and the situation estimation unit may calculate an upper-limit threshold value for determining the hand raising on the basis of the human data height for each piece of human data corresponding to each person in the second period, extract human data for which the number of times that the human data height greater than the hand-raising threshold value and less than the upper-limit threshold value is measured is greater than the predetermined number of times in a third period in which the person performs the hand raising, and estimate the reaction of the person corresponding to the extracted human data.

(10) In any one of the aspects (1) to (9), the tracking unit may generate virtual distance information indicating distance information virtually measured around a position of human data corresponding to the person detected at a predetermined time in information of the distance measured at a time subsequent to the predetermined time, the clustering unit which generates human cluster data by clustering the distances may generate mixed distance information in which the virtual distance information is mixed with the information of the distance measured at the subsequent time, the human-body processing unit may detect the person at the subsequent time on the basis of the mixed distance information, and the tracking unit may assign the identifier to each person detected by the clustering unit.

(11) In the aspect (10), the tracking unit may change a density of the virtual distance information around the position of the human data corresponding to the person detected at the predetermined time according to a time period in which the person is in a predetermined range from the position.

(12) In the aspect (10) or (11), the tracking unit may scatter the virtual distance information around the human data detected at the predetermined time according to a time period in which the person is in a predetermined range from the position so that a center is dense.

(13) In the aspect (6) or (7), the human-body processing unit may include: a density calculation unit configured to calculate a density with a peripheral cluster for each cluster on the basis of a distance between clusters classified by the clustering unit which generates human cluster data obtained by clustering the distances; and a re-clustering unit configured to calculate a threshold value set on the basis of human physique data from a measurement value of a height included in a region of a cluster for each cluster with respect to the cluster in which the density calculated by the density calculation unit is low, extract a measurement point having a measurement value of the height greater than the calculated threshold value, and generate one or more clusters smaller than the cluster among clusters by performing a re-clustering process on the extracted measurement point, and the situation estimation unit may estimate the reaction of the person on the basis of the number of small clusters among the clusters.

(14) In the aspect (4), the human-body processing unit may select physique data of a child as the human physique data for a region close to a robot which outputs a signal indicating a prompt for the person to start or end the hand raising for each division region.

(15) In any one of the aspects (1) to (14), the operation estimation apparatus may include: a control unit configured to output a signal indicating a prompt for the person to start or end the hand raising and control behavior of the robot on the basis of the estimated reaction of the person.

(16) According to an aspect of the present invention, there is provided a robot including: the operation estimation apparatus according to any one of the aspects (1) to (15); a storage unit in which a signal output by the robot and an order of output are associated and stored; and a control unit configured to output a signal indicating a prompt for the person to start or end the hand raising and control behavior of the robot on the basis of the reaction of the person estimated by the operation estimation apparatus.

(17) According to an aspect of the present invention, there is provided an operation estimation method including: a distance measurement procedure in which a distance measurement unit measures a distance for a predetermined range; a human processing procedure in which a human-body processing unit detects a person on the basis of a distribution of distances measured in the distance measurement procedure; a tracking procedure in which a tracking unit assigns an identifier to each person detected in the human processing procedure; and a situation estimation procedure in which a situation estimation unit measures human data height for each person to which the identifier is assigned in the tracking procedure a plurality of times on the basis of the human data height which is a value of a height direction included in the measured distance in a first period set by prompting the person to start and end hand raising, extracts an identifier for which a plurality of human data heights are in the predetermined range, and estimates the reaction of the person corresponding to the extracted identifier.

In the above-described aspects (1), (2), (3), (5), (9), (15), (16), and (17), it is possible to reduce an error of detection of hand raising even when a parent and a child, etc., between which there is a height difference, are close. As a result, it is possible to improve the precision of detection of hand raising in the present embodiment.

Also, in the case of the above-described (4) and (14), it is possible to improve the precision of detection of the hand raising because a region is divided to perform a process on each division region by reflecting a feature of a distribution of persons where, for example, children tend to gather at a position close to the robot and it is possible to reduce a change in a height measurement value of a person or a position of the person due to erroneous detection of the person by erroneous integration and division of clustering.

Also, in the case of the above-described (6) and (7), it is possible to improve the precision of detection of the person by clustering even in the periphery close to a limit of a measurement range of each distance measurement unit when distances are measured using the plurality of distance measurement units. Also, in the case of (6) and (7), the precision of tracking can be improved because it is possible to suppress the deviation of a position of a cluster in an integration process.

Also, in the case of the above-described (7), it is possible to distribute the cost according to a clustering process.

Also, in the case of the above-described (8), (10), (11), and (12), it is possible to improve the precision of detection of a hand raising operation because it is possible to reduce erroneous integration or error division of a clustering process. Also, it is possible to improve the precision of tracking persons because the center of gravity of the cluster is stable.

Also, in the case of the above-described (13), it is possible to improve the precision of detection of hand raising even for a person who slightly raises his/her hand.

BRIEF DESCRIPTION OF THE DRAWINGS

FIG. 12 is a diagram for describing a situation in which two persons are adjacent and an example in which a clustering process is performed using a conventional technique.

DETAILED DESCRIPTION OF THE INVENTION

First, an overview of the present invention will be described.

For example, in an event venue, a human type robot may perform the role of a moderator on a stage. In this situation, a scenario, an operation, a voice signal, etc. are pre-stored in the robot and the stored voice signal may be reproduced at the timing according to the scenario while the stored operation is performed. In the operation of this robot, it is difficult to perform communication between a person (hereinafter, also referred to as a spectator) and the robot in the venue because the robot merely speaks sounds according to the scenario.

Thus, in the present embodiment, the robot selects the next operation to be performed or an output voice signal according to reaction of people in the venue, so that communication between the robot and the person is enriched. In the present embodiment, the robot selects a topic from among presented topics by estimating hand raising by the person in the venue and finds a majority decision on the basis of an estimation result.

Hereinafter, embodiments of the present invention will be described with reference to the drawings.

First Embodiment

<Schematic Configuration of System and Ranging Points>

First, the schematic configuration of the system and the ranging points to be used in the system will be described.

Figure 1:
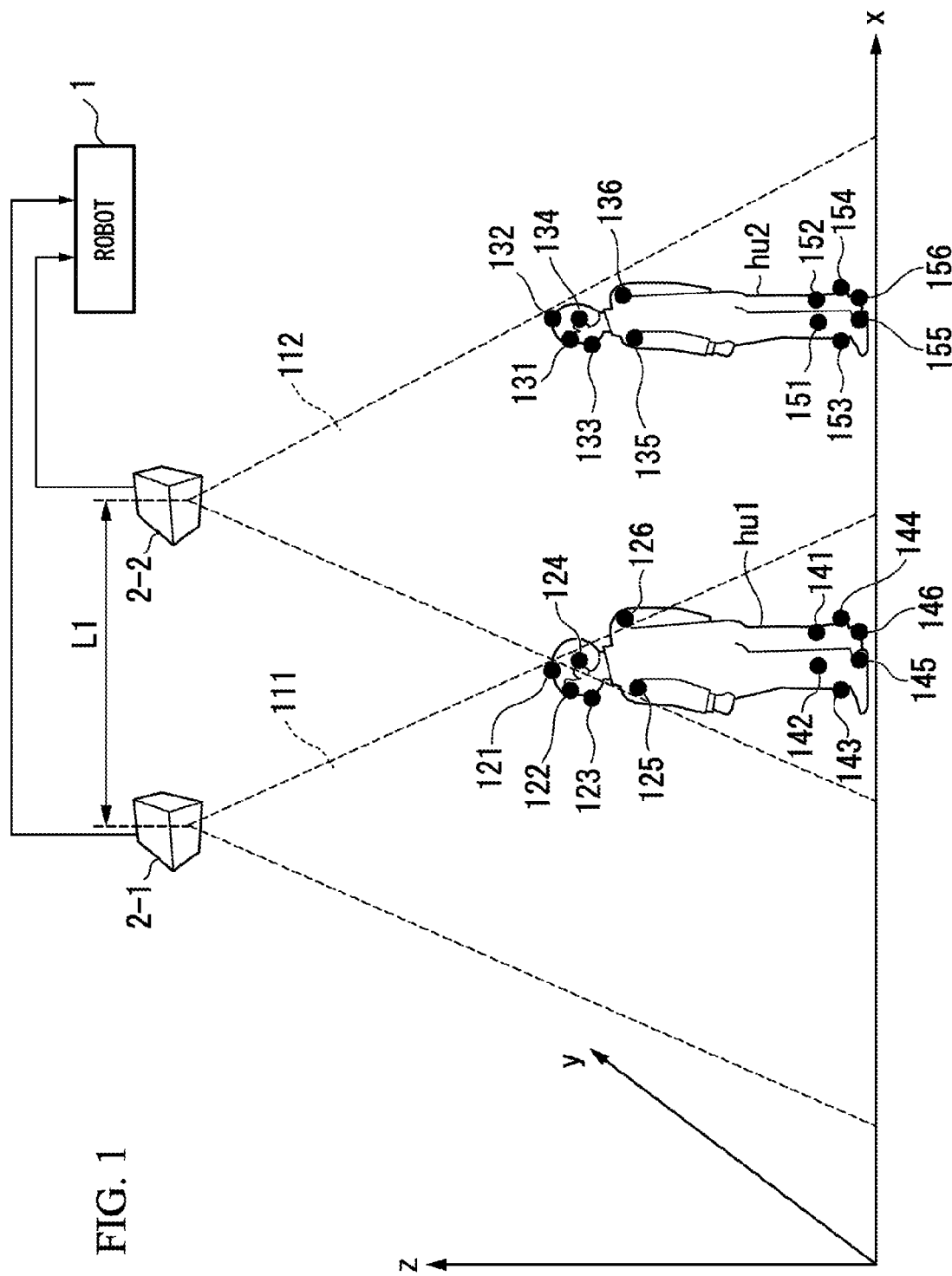
FIG. 1 is a diagram for describing a schematic configuration of a system and ranging points to be used in the system according to a first embodiment.

FIG. 1 is a diagram for describing the schematic configuration of the system and the ranging points to be used in the system according to the present embodiment. In FIG. 1, a left/right direction in a direction of the paper surface is designated as an x-axis direction, a depth direction is designated as a y-axis direction, and a height direction is designated as a z-axis direction.

The system in the example illustrated in FIG. 1 is constituted of a robot 1 and two LRF sensors 2-1 and 2-2. Also, the ranging points illustrated in FIG. 1 are only some of a plurality of ranging points measured by the LRF sensors 2-1 and 2-2.

For example, the robot 1 performs the role of a moderator on a stage (not illustrated), prompts persons in a venue (not illustrated) to raise their hands for a plurality of questions, and performs a hand-raising determination for the plurality of questions.

The LRF sensor 2-1 and the LRF sensor 2-2 measure a distance from a target through laser irradiation. A point at which a distance at which the laser hits the target is measured is referred to as a ranging point and the ranging point corresponds to, for example, the top of the head of a person, the ear, the collar of the clothing, the shoulder, or the like. Information indicating a position in an xy plane and information indicating a height are included in the ranging point.

The two LRF sensors 2-1 and 2-2 are installed at an interval of a distance L1 in a ceiling of a detection target space. When none of the LRF sensors 2-1 and 2-2 are specified, the LRF sensors 2-1 and 2-2 are simply referred to as an LRF sensor 2. A region indicated by reference sign 111 is a detectable region (hereinafter, referred to as a detection region) of the LRF sensor 2-1 and a region indicated by reference sign 112 is a detection region of the LRF sensor 2-2. Also, in an example illustrated in FIG. 1, a ranging point greater than or equal to a predetermined height is shown. In the example illustrated in FIG. 1, a person hu1 and a person hu2 are in detection regions of the two LRF sensors 2.

Also, in the example illustrated in FIG. 1, the person hu1 is in the detection region 111 of the LRF sensor 2-1 and the person hu1 and the person hu2 are in the detection region 112 of the LRF sensor 2-2.

Ranging points 121 to 126 are ranging points for the person hu1. The ranging points 131 to 136 are ranging points for the person hu2. Also, the example illustrated in FIG. 1 is an example in which light radiated by the LRF sensor 2-1 is radiated from a front direction of the person hu1 and light radiated by the LRF sensor 2-2 is radiated from a rear direction of the person hu1.

In the example illustrated in FIG. 1, ranging points 121 to 123 are ranging points measured by the LRF sensor 2-1 and ranging points 124 to 126 and 131 to 136 are ranging points measured by the LRF sensor 2-2. Also, as described above, the ranging points illustrated in FIG. 1 are only some of a plurality of measured ranging points.

Also, in FIG. 1, projection points 141 to 146 are points at which the ranging points 121 to 126 are projected onto the xy plane and projection points 151 to 156 are points at which the ranging points 131 to 136 are projected onto the xy plane.

<Configuration of Robot 1>

Next, the configuration of the robot 1 will be described.

Figure 2:
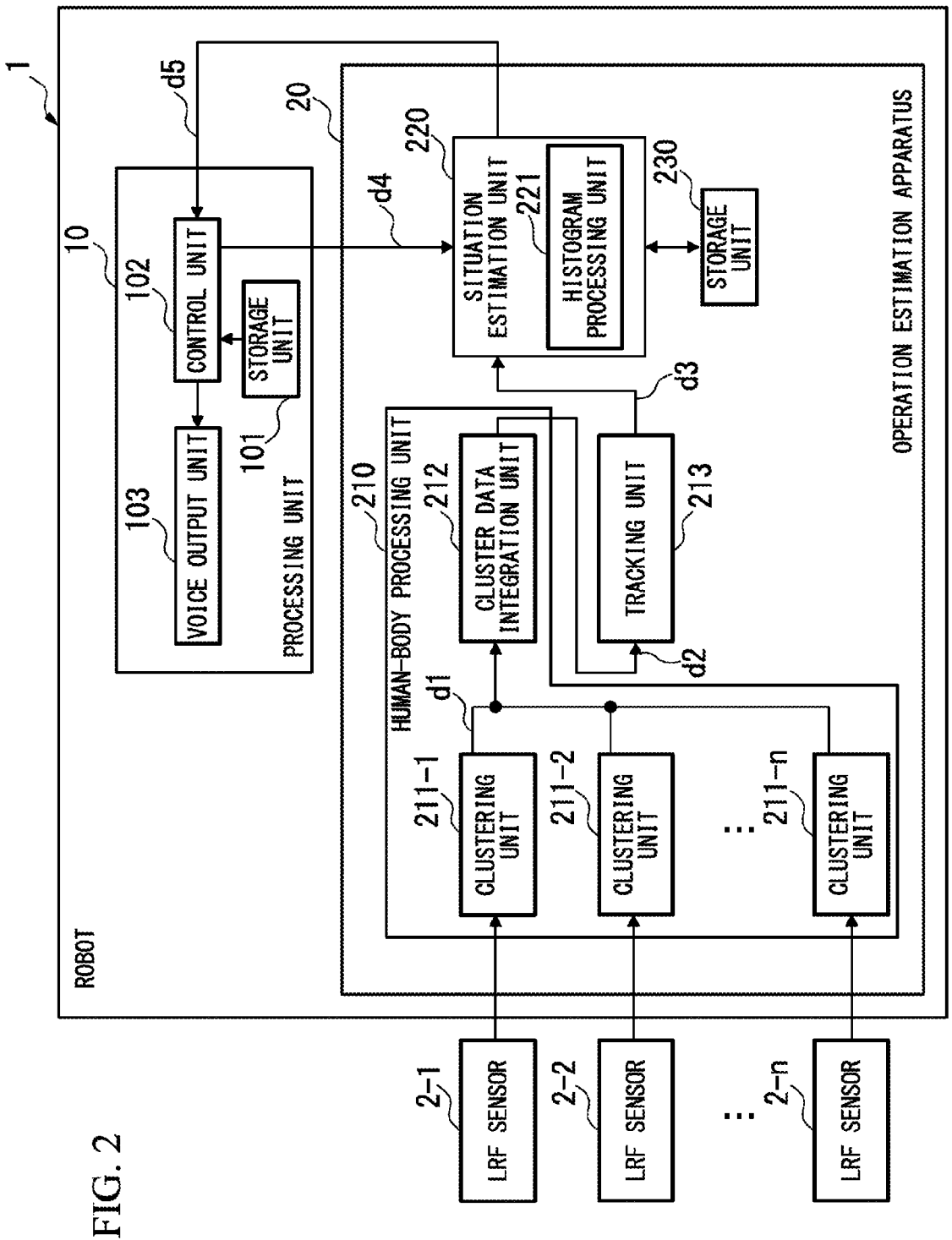
FIG. 2 is a schematic block diagram of a robot according to the first embodiment.

FIG. 2 is a schematic block diagram of the robot 1 according to the present embodiment.

As illustrated in FIG. 2, the robot 1 is configured to include a processing unit 10 and an operation estimation apparatus 20. The robot 1 is connected to n (n is an integer greater than or equal to 1) LRF sensors 2-1 to 2-n (distance measurement units) wirelessly or by wire. Also, when none of the LRF sensors 2-1 to 2-n are specified, the LRF sensors 2-1 to 2-n are referred to as an LRF sensor 2. Also, although an example in which the robot 1 includes the operation estimation apparatus 20 has been described in the present embodiment, the present invention is not limited thereto. For example, a guide system used in the event venue or the like may include the operation estimation apparatus 20.

The LRF sensor 2 is a three-dimensional positioning sensor for detecting a distance from a physical object and a direction as a ranging point by scanning a detection target space at a predetermined pitch while radiating laser light and measuring a time until the light is reflected by the physical object and returned. Each of the plurality of LRF sensors 2 transmits information of a detected ranging point (hereinafter, referred to as ranging-point information) to the robot 1 wirelessly or by wire. Each of the plurality of LRF sensors 2 is installed at a position at which a person can be viewed in a bird's eye view, for example, in a ceiling, a wall, or the like of a detection target space, so that a part of the detection target space thereof overlaps that of at least one of the others. The wavelength of the laser light is, for example, 905 nm, 785 nm, or the like. Also, the scanning range of one LRF sensor 2 is, for example, 270 degrees in a horizontal plane, a step angle is 0.25 degrees, and the number of steps is 1080. Also, although an example in which the LRF sensor 2 is used as an example of the sensor has been described in the present embodiment, the present invention is not limited thereto and any other sensor capable of measuring a distance and direction may be used.

First, a configuration of the processing unit 10 will be described.

The processing unit 10 performs various types of control such as operations of the robot 1. The processing unit 10 includes a storage unit 101, a control unit 102, and a voice output unit 103.

Information related to control of the robot 1, voice output data, scenario information, etc. are stored in the storage unit 101. Also, the scenario information is information describing that a predetermined operation is performed at a predetermined time.

The control unit 102 reads the scenario information stored in the storage unit 101 and causes a corresponding voice signal to be output from the voice output unit 103 on the basis of the read scenario information. Also, the control unit 102 generates a trigger signal d4 at a timing at which the voice signal is output and outputs the generated trigger signal d4 to a situation estimation unit 220 of the operation estimation apparatus 20. Also, the trigger signal d4 includes information indicating that a voice signal for prompting his/her hand to be raised is output, information indicating that a voice signal for prompting his/her hand to be lowered is output, information indicating a second period, and information indicating a third period. The second period and the third period will be described below. Also, the control unit 102 selects the next process to be performed from the scenario information on the basis of information d5 indicating a detection result input from the operation estimation apparatus 20.

The voice output unit 103 outputs a voice signal according to a process of the control unit 102, and is, for example, a speaker.

Next, the configuration of the operation estimation apparatus 20 will be described.

The operation estimation apparatus 20 includes a human-body processing unit 210, a tracking unit 213, the situation estimation unit 220, and a storage unit 230. The human-body processing unit 210 includes n clustering units 211-1 to 211-$n$, and a cluster data integration unit 212. Also, the situation estimation unit 220 includes a histogram processing unit 221. When none of the clustering units 211-1 to 211-$n$ are specified, the clustering units 211-1 to 211-$n$ are referred to as a clustering unit 211. Also, each of the LRF sensors 2-1 to 2-$n$ is connected to the corresponding clustering units 211-1 to 211-$n$ wirelessly or by wire. Also, the operation estimation apparatus 20 may be configured to include the LRF sensor 2.

The clustering unit 211 calculates a component of each of xyz-axis directions of each ranging point using ranging-point information input from the LRF sensor 2. Also, although the clustering unit 211 calculates a component of each of the xyz-axis directions of each ranging point using ranging-point information input from the LRF sensor 2 in the present embodiment, the present invention is not limited thereto. The sensor 2 may calculate the component of each of the xyz-axis directions of each ranging point and output the calculated component of each of the xyz-axis directions of each ranging point to the clustering unit 211.

Also, although an example in which the number of clustering units 211 is N is illustrated in the example illustrated in FIG. 2, the present invention is not limited thereto. When one LRF sensor 2 can measure a ranging point of a predetermined region, the number of clustering units 211 may be one.

The clustering unit 211 projects the ranging point on the xy plane using a component of an x-axis direction (hereinafter, also referred to as an x-axis component) and a component of a y-axis direction (hereinafter, also referred to as a y-axis component) of each calculated ranging point. The projected ranging point is referred to as a projection point. The clustering unit 211 classifies a plurality of projection points projected onto the xy plane using a well-known technique as a cluster (also referred to as clustering). The clustering unit 211 classifies the ranging point, for example, using a hierarchical technique such as a nearest neighbor method. Also, the classified cluster corresponds to a set of ranging points of each person. In information included in the cluster, a component of a z-axis direction (hereinafter, also referred to as a z-axis component) is associated with xy coordinates of the projection point. The clustering unit 211 calculates the center of gravity for each classified cluster and designates the calculated center of gravity as a human cluster data position. The clustering unit 211 extracts a maximum value of heights for each classified cluster and designates the extracted maximum value as a human cluster data height. The clustering unit 211 generates human cluster data d1 by associating a human cluster data position and a human cluster data height for each cluster and outputs the generated human cluster data d1 to the cluster data integration unit 212.

The human cluster data d1 is input from each of the clustering units 211-1 to 211-$n$ to the cluster data integration unit 212. The cluster data integration unit 212 integrates the cluster data d1 in a predetermined range among the input human cluster data d1. Also, the predetermined range is, for example, a range regarded to be a cluster of one person. The cluster data integration unit 212 integrates the human cluster data d1 of the human cluster data position within such a range. The cluster data integration unit 212 outputs human cluster data d2 integrated by associating position information of the center of gravity of the integrated cluster and height information which is a maximum value of z-direction components among integrated clusters to the tracking unit 213. Also, the cluster data d1 is integrated because clusters showing the same person redundantly detected by a plurality of clustering units are integrated as with the person hu1 described in FIG. 1.

Also, because the integration of the human cluster data d1 is not performed by the cluster data integration unit 212 when there is no ranging point of the person redundantly detected by the plurality of clustering units, the human cluster data d1 and the human cluster data d2 are completely the same. Also, because the integration of the human cluster data d1 is not performed even in the case of one clustering unit 211, the human cluster data d1 and the human cluster data d2 are completely the same. Also, in the following description, the human cluster data d2 output by the cluster data integration unit 212 is referred to as integrated human cluster data d2 even when the integration of the human cluster data d1 is not performed.

The human cluster data d2 integrated by the cluster data integration unit 212 is input to the tracking unit 213. The tracking unit 213 performs a tracking process at each predetermined time interval on the basis of position information which is the center of gravity of the integrated human cluster data d2. The tracking unit 213 adds an ID obtained as a result of performing the tracking process to the position information and the height information of the integrated human cluster data d2 to generate human data d3 in which the position information, the height information, and the ID are associated for each cluster. Also, after the tracking process is performed and the ID is assigned, the position information is referred to as a human data position and the height information is referred to as a human data height. Also, the same ID is assigned to the same person (cluster) through time series as a result of performing the tracking process and therefore information indicating the movement of the person is obtained. The tracking unit 213 outputs the generated person-specific human data d3 to the situation estimation unit 220.

Figure 5:
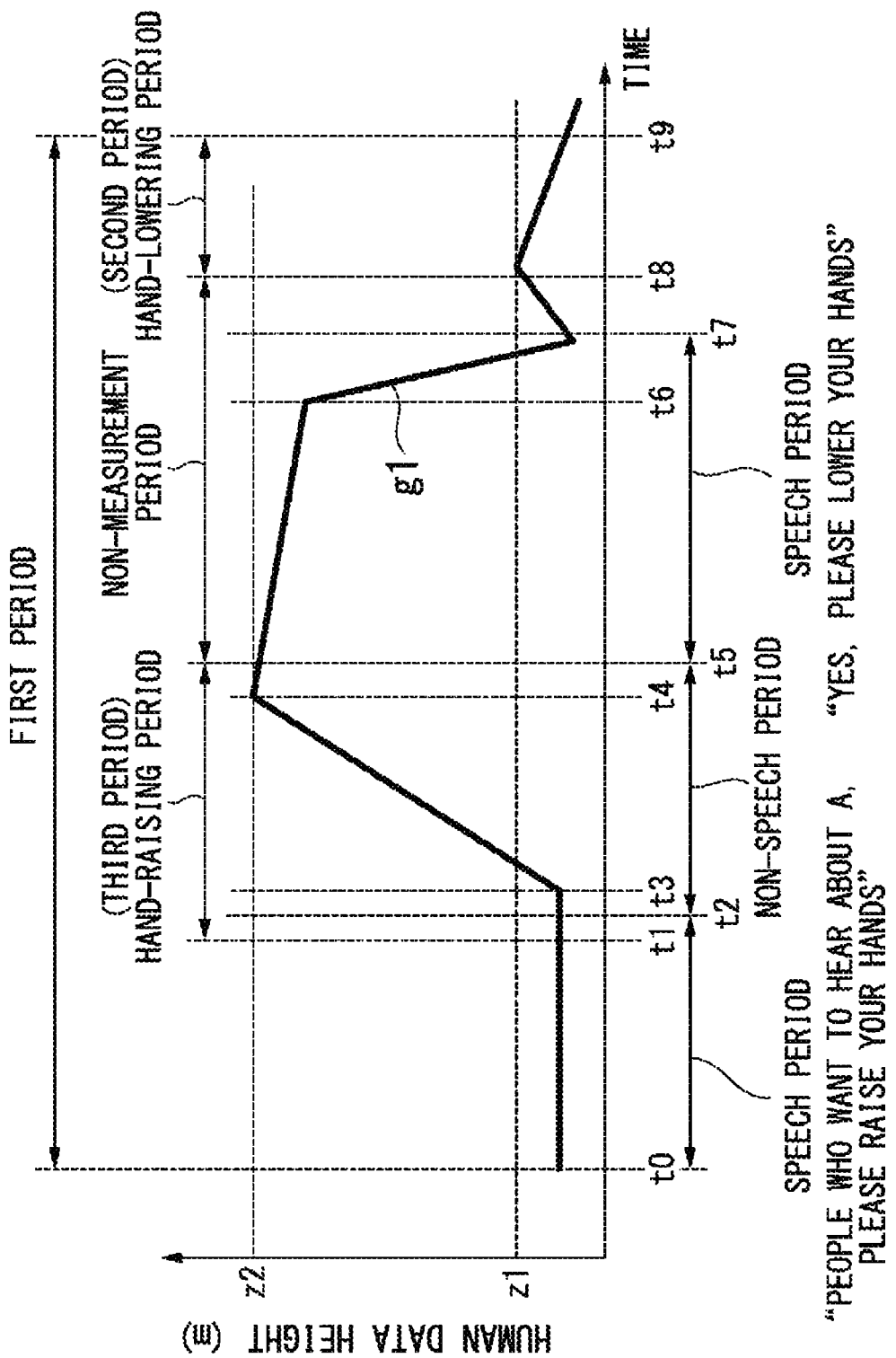
FIG. 5 is a diagram for describing a period in which a voice signal is output, a timing at which a person raises his/her hand, a timing at which the person lowers his/her hand, a hand-raising measurement period, and a hand-lowering measurement period according to the first embodiment.

Here, the tracking process is a process of tracking a change in a position of the human cluster data (including a height) in time series. For example, the tracking unit 213 assigns an initial value of an identifier (hereinafter, referred to as an ID) to human cluster data of a point in time at time t1 (FIG. 5). Thereafter, the tracking unit 213 compares positions of human cluster data of time t and time t+$\Delta$t for each sampling time $\Delta$t (also referred to as a frame) and assigns the same ID as that of a previous sampling time (frame) when a movement amount between the two times is within a predetermined range. Here, the predetermined range is a range in which the human cluster data is movable or the like, for example, when a person walks and moves in the sampling time $\Delta$t. Also, the tracking unit 213 determines that a person corresponding to an ID is absent in a predetermined region when the human cluster data in a predetermined range from the human cluster data position to which the ID for which the tracking process is performed is assigned is not continuously included within the input human cluster data d2 during a predetermined time, and deletes human data corresponding to the ID.

A trigger signal d4 based on scenario information from the control unit 102 is input to the situation estimation unit 220.

The histogram processing unit 221 performs a histogram creation process for each ID during a predetermined period (for example, a second period and a third period) using the human data d3 input from the tracking unit 213 according to the input trigger signal d4. Also, the histogram creation process will be described below. The histogram processing unit 221 measures the number of human data heights exceeding a threshold value (hereinafter, referred to as hand-raising threshold value) of a height direction for determining that his/her hand is raised among human data heights included in the human data d3 in a predetermined period calculated in the histogram creation process. The histogram processing unit 221 causes the storage unit 230 to store the number of times that the human data height exceeds the hand-raising threshold value (or the number of human data heights exceeding the hand-raising threshold value) for each ID. Also, the hand-raising threshold value is, for example, a value obtained by adding a predetermined value to a value of a human height. The predetermined value is a predetermined value determined on the basis of human physique data, and is, for example, 10 (cm). Here, the human physique data is, for example, a length from the acromion to the radial styloid process, etc. when his/her hand is raised for the human height. Also, the human physique data may be set for each country or region. The human physique data may be stored in the storage unit 230.

The situation estimation unit 220 reads the number of human data heights from the storage unit 230 for each ID. The situation estimation unit 220 reads a determination threshold value from the storage unit 230. The situation estimation unit 220 compares the number of human data heights with the determination threshold value and estimates that the person raises her/his hand when the number of height measurement values is greater than the determination threshold value. When a comparison result indicates that the number of human data heights is less than the determination threshold value, the situation estimation unit 220 estimates that the person does not raise his/her hand. Also, the determination threshold value is determined on the basis of a distribution of whether the hand raising is performed created on the basis of actually measured values. Also, the determination threshold value may be a predetermined value. The determination threshold value will be described below.

Also, the situation estimation unit 220 performs the above-described estimation a predetermined number of times according to the trigger signal d4, and finds a majority decision by estimating when the number of persons raising their hands is largest. The situation estimation unit 220 outputs a majority decision result as information d5 indicating a detection result to the processing unit 10.

A predetermined value for use in a hand-raising threshold value and a determination threshold value are stored in the storage unit 230. Also, the number of height measurement values exceeding the hand-raising threshold value is stored in the storage unit 230 for each ID.

Next, a clustering process and a processing procedure of generating the human cluster data d1 will be described.

Figure 3:
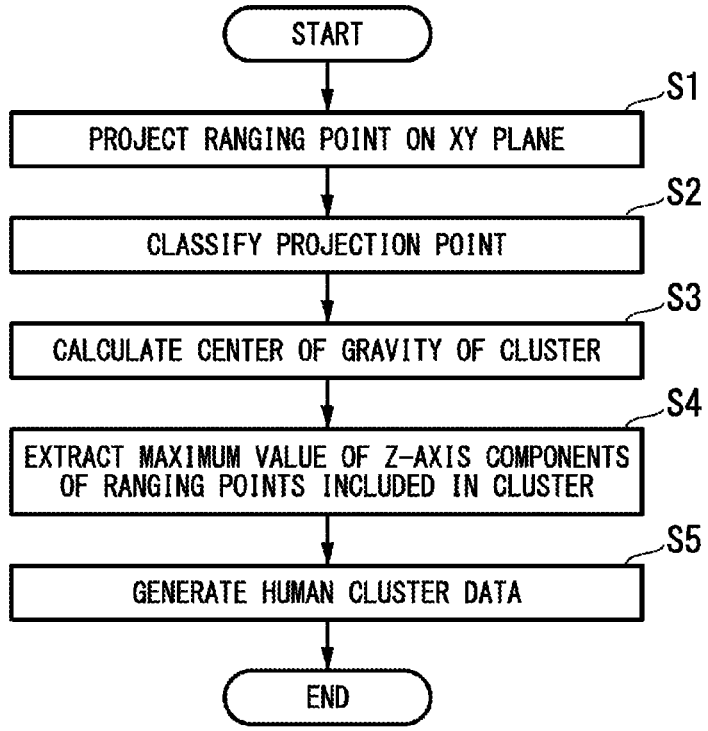
FIG. 3 is a flowchart of a clustering process and a processing procedure of generating human cluster data according to the first embodiment.

FIG. 3 is a flowchart of the clustering process and the processing procedure of generating the human cluster data according to the present embodiment.

(Step S1) The clustering unit 211 projects the ranging point at which a value of a z-axis component is greater than or equal to a predetermined value on the xy plane using the x-axis component and the y-axis component included in information of each ranging point among ranging-point information input from the corresponding LRF sensor 2. The clustering unit 211 moves the process to step S2.

(Step S2) The clustering unit 211 classifies projection points projected onto the xy plane as a cluster. The clustering unit 211 moves the process to step S3.

(Step S3) The clustering unit 211 calculates the center of gravity of the projection points included in the cluster for each classified cluster and designates the calculated center of gravity as a human cluster data position in the cluster. The clustering unit 211 moves the process to step S4.

(Step S4) The clustering unit 211 extracts a maximum value of the z-axis component (height) among ranging points corresponding to projection points included within the cluster for each classified cluster and designates the extracted maximum value as a human cluster data height in the cluster. The clustering unit 211 moves the process to step S5.

(Step S5) The clustering unit 211 generates the human cluster data d1 of each cluster by associating a human cluster data position of each cluster with a human cluster data height.

Next, a specific example of the clustering process and the process of generating the human cluster data d1 will be described with reference to FIGS. 1 and 3.

The clustering unit 211-1 projects input ranging points 121 to 123 on the xy plane and generates information of projection points 141 to 143. The clustering unit 211-2 projects input ranging points 124 to 126 and 131 to 136 on the xy plane and generates information of projection points 144 to 146 and 151 to 156 (step S1).

Next, the clustering unit 211-1 classifies the projection points 141 to 143 as an $11^{th}$ cluster. Also, the clustering unit 211-2 classifies the projection points 144 to 146 as a $21^{st}$ cluster and classifies the projection points 151 to 153 as a $22^{nd}$ cluster (step S2). The clustering unit 211-1 calculates the center of gravity of the clustered projection points 141 to 143 as a human cluster data position. The clustering unit 211-2 calculates the center of gravity of the clustered projection points 144 to 146 as a human cluster data position and calculates the center of gravity of the projection points 151 to 153 as a human cluster data position (step S3).

Next, the clustering unit 211-1 extracts the z-axis component of the ranging point 121 which is a maximum value of the z-axis component among the ranging points 121 to 123 corresponding to the projection points 141 to 143 included in the $11^{th}$ cluster. The clustering unit 211-2 extracts the z-axis component of the ranging point 124 which is the maximum value of the z-axis component among ranging points 124 to 126 corresponding to the projection points 144 to 146 included in the $21^{st}$ cluster. Also, the clustering unit 211-2 extracts the z-axis component of the raging point 132 which is the maximum value of the z-axis component among ranging points 131 to 136 corresponding to the projection points 151 to 156 included in the $22^{nd}$ cluster (step S4).

Next, the clustering unit 211-1 generates human cluster data $d1_{(11)}$ by associating the human cluster data position in the $11^{th}$ cluster with the human cluster data height. Also, in a subscript (nm), n corresponds to a number n of the clustering unit 211-$n$ and $m$ corresponds to the number of the cluster classified by each clustering unit 211. The clustering unit 211-2 generates human cluster data $d1_{(21)}$ by associating the human cluster data position in the $21^{st}$ cluster with the human cluster data height. Also, the clustering unit 211-2 generates human cluster data $d1_{(22)}$ by associating the human cluster data position in the second cluster with the human cluster data height (step S5).

<First Integration Process which is Performed by Cluster Data Integration Unit 212>

Next, the integration process which is performed by the cluster data integration unit 212 will be described.

Figure 4:
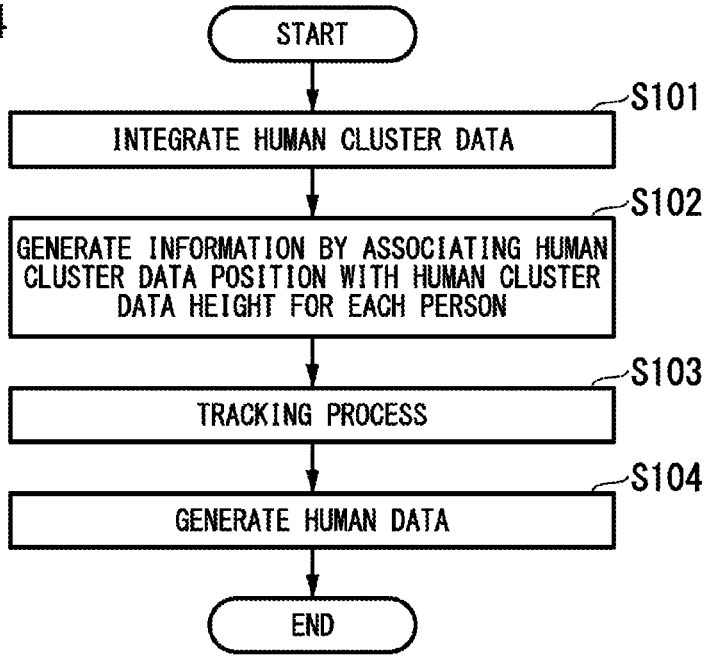
FIG. 4 is a flowchart of an integration processing procedure which is performed by a cluster data integration unit according to the first embodiment.

FIG. 4 is a flowchart of an integration processing procedure which is performed by the cluster data integration unit 212 according to the present embodiment. Also, the case in which the number of clustering units 211 is two or more will be described in the following example.

(Step S101) The cluster data integration unit 212 integrates a plurality of pieces of human cluster data d1 input from the clustering units 211-1 to 211-$n$. The cluster data integration unit 212 moves the process to step S102.

(Step S102) The cluster data integration unit 212 designates the center of gravity of each integrated cluster as position information of the cluster after the integration and designates a highest value among the height information of each integrated cluster as the height information after the integration. Next, the cluster data integration unit 212 generates human cluster data d2 in which the position information is associated with the height information for each cluster after the integration and outputs the generated human cluster data d2 to the tracking unit 213. The cluster data integration unit 212 moves the process to step S103.

(Step S103) The tracking unit 213 performs a tracking process at each predetermined time interval on the basis of the position (including the height) of the integrated human cluster data d2 input from the cluster data integration unit 212. The tracking unit 213 first assigns an ID to each piece of input human cluster data. Next, the tracking unit 213 assigns the same ID as that assigned in a previous frame to human cluster data regarded to be that of the same person as a result of performing the tracking process.

(Step S104) The tracking unit 213 generates human data d3 by associating an ID obtained as a result of performing the tracking process in time series with the human data position and the human data height for each person and outputs the generated human data d3 to the situation estimation unit 220.

Next, a specific example of the integration process which is performed by the cluster data integration unit 212 will be described with reference to FIGS. 1 and 4.

The cluster data integration unit 212 integrates the human cluster data $d1_{(11)}$ input from the clustering unit 211-1 and the human cluster data $d1_{(21)}$ input from the clustering unit 211-2 by determining that the information indicating the position is in a predetermined range (step S101). Also, the human cluster data $d1_{(11)}$ is a cluster due to the projection points 141 to 143. The human cluster data $d1_{(21)}$ is a cluster due to the projection points 144 to 146.

Next, the cluster data integration unit 212 designates the center of gravity of human cluster data $d1_{(11)}$ and $d1_{(21)}$ as position information indicating the cluster position after the integration, designates a higher value among heights of the human cluster data $d1_{(11)}$ and $d1_{(21)}$ as height information indicating a height of a cluster after the integration, and generates human cluster data d2-1 in which the position information is associated with the height information (step S102).

Also, the cluster data integration unit 212 determines that there is no other human cluster data for which information indicating a position is in a predetermined range with the human cluster data $d1_{(22)}$ input from the clustering unit 211-2. Also, the human cluster data $d1_{(22)}$ is a cluster by the projection points 151 to 156. In this case, the cluster data integration unit 212 does not integrate other human cluster data with the human cluster data $d1_{(22)}$ (step S101). In this case, the cluster data integration unit 212 outputs the human cluster data $d1_{(22)}$ as the input human cluster data d2-2 as it is (step S102).

Next, the tracking unit 213 performs a tracking process at each predetermined time interval for each piece of human cluster data using the human cluster data d2-1 and d2-2 input from the cluster data integration unit 212. The tracking unit 213 first assigns ID1 to the input human cluster data d2-1 and assigns ID2 to the input human cluster data d2-2.

Next, the tracking unit 213 assigns the same ID as that assigned in a previous frame to human cluster data regarded to be that of the same person as a result of performing the tracking process in time series (step S103). Next, the tracking unit 213 generates human data d3 of ID1 and ID2 by associating the ID obtained as a result of performing the tracking process with the human data including the human data position and the human data height for each person (step S104).

<Description of Measurement Period>

Next, a period in which a voice signal is output, a timing at which the person raises his/her hand, a timing at which the person lowers his/her hand, a hand-raising period, and a hand-lowering period will be described.

FIG. 5 is a diagram for describing the period in which the voice signal is output, the timing at which the person raises his/her hand, the timing at which the person lowers his/her hand, the hand-raising measurement period, and the hand-lowering measurement period according to the present embodiment. In FIG. 5, the horizontal axis represents time and the vertical axis represents human data height (m). Also, in the example illustrated in FIG. 5, the case in which a person who wants to hear a topic about "A" is present or the robot 1 causes a person to raise his/her hand is shown. Also, "A" is, for example, one of topics to be described by the robot 1.

First, a period in which the control unit 102 outputs a voice signal, that is, a speech period of the robot 1, will be described.

A time period t1 to t2 is a speech period in which the robot 1 speaks "People who want to hear about A, please raise your hands" for prompting hand raising.

A time period t2 to t5 is a non-speech period in which the robot 1 does not speak.

A time period t5 to t7 is a speech period in which the robot 1 speaks "Yes, please lower your hands" for prompting hand lowering. Also, the speech period differs according to content of the speech.

Next, an example of a timing at which the person raises his/her hand and a timing at which the person lowers his/her hand will be described. In FIG. 5, a line denoted by reference sign g1 indicates a maximum value of the z-axis component at each time among ranging points of one person.

In the example indicated by reference sign g1 of FIG. 5, the person does not raise his/her hand in a time period t0 to t3.

The person starts to raise his/her hand at time t3 and the maximum value at time t4 becomes z2. As shown in the example denoted by reference sign g1 of FIG. 5, the person may not rapidly raise his/her hand even when the speech for prompting hand raising ends. Also, the timing at which his/her hand starts to be raised significantly differs according to a person.

At time t6, the person is prompted to lower his/her hand and starts to lower his/her hand. As illustrated in the example denoted by reference sign g1 of FIG. 5, the person does not immediately lower his/her hand even when the person is prompted to lower his/her hand, but his/her hand is lowered in a time shorter than a time taken to raise his/her hand. Also, the fact that, unlike the timing of the hand raising, the timing of the hand lowering is substantially the same between for all people and all people tend to simultaneously lower their hands was obtained by experiment. Thus, in the present technique, the height at the time of the hand lowering is measured after the speech for prompting hand lowering to reliably measure the height at the time of the hand lowering.

Next, the hand-raising period and the hand-lowering period will be described.

A period in which the hand raising is measured (hereinafter, referred to as the hand-raising period) (third period) is a previous period of a predetermined time, for example, 3 sec, from time t5 at which the hand lowering is prompted and is a time period t1 to t5 in the example illustrated in FIG. 5. The histogram processing unit 221 measures the hand-raising period and the human data height during hand raising and measures the number of times that the human data height is greater than or equal to the hand-raising threshold value.

Also, a period in which the hand lowering is measured (hereinafter, referred to as the hand-lowering period) (second period) is a time period t8 to t9 after a predetermined time, for example, 4 sec, from time t5 at which the hand lowering is prompted. The hand-lowering period is, for example, 1 sec. This period is a period in which it is assumed that the person reliably lowers his/her hand after the hand lowering is prompted. The histogram processing unit 221 measures the hand-lowering period and the human data height when his/her hand is lowered. The histogram processing unit 221 calculates an average value of human data heights during the hand-lowering period and calculates the hand-raising threshold value of each piece of human data from the calculated average value. Alternatively, the histogram processing unit 221 may measure a maximum value z1 of the heights of the human data during the hand-lowering period and calculate the hand-raising threshold value from the maximum value. The histogram processing unit 221 uses the calculated hand-raising threshold value in the measurement of the hand-raising period. Also, it is preferable for the hand-lowering period to be after time t7 at which the speech for prompting hand raising ends.

Also, a time period t1 to t9 set by prompting to end the hand raising after the robot 1 prompts to start the hand raising is defined as a first period.

<Description of Erroneous Detection Example>

Next, the case in which two persons are adjacent to each other will be described with reference to FIGS. 6 and 7.

Figure 6:
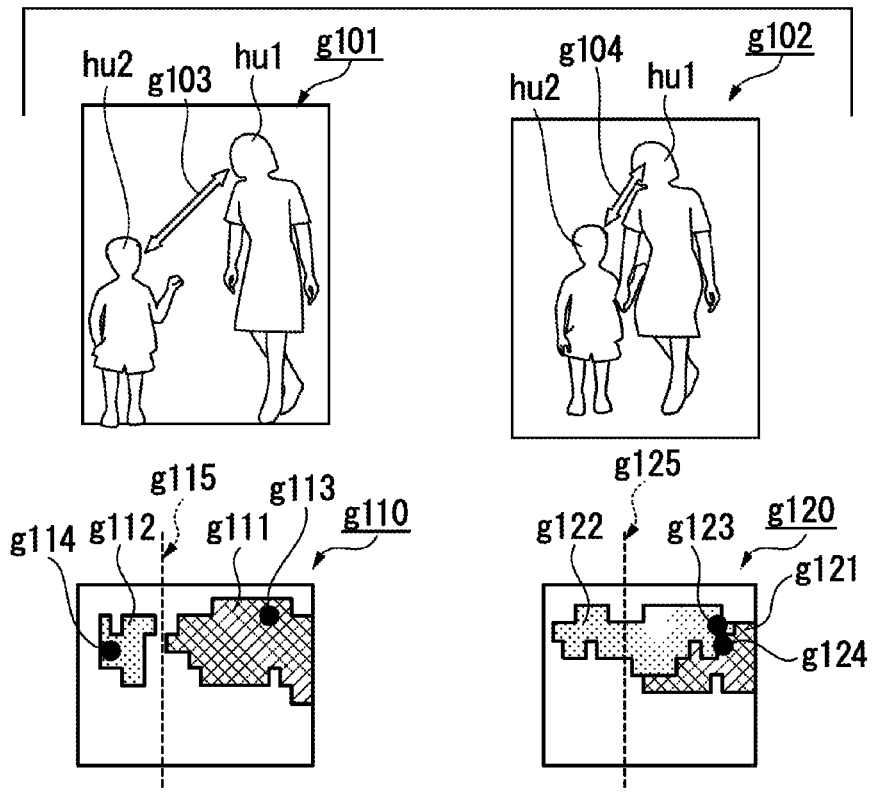
FIG. 6 is a diagram for describing a situation in which two persons are adjacent and an example in which a clustering process is performed using a conventional technique.

FIG. 6 is a diagram for describing a situation in which the two persons are adjacent and an example in which a clustering process is performed using a conventional technique. FIG. 7 is a diagram for describing an example of a change in height information of two persons for each measurement time when the clustering process is performed using a conventional technique. In the example, two persons hu1 and hu2 illustrated in FIG. 6 do not raise their hands during a period illustrated in FIG. 7. Also, height information illustrated in FIG. 7 is information in human data after the tracking process.

Figure 7:
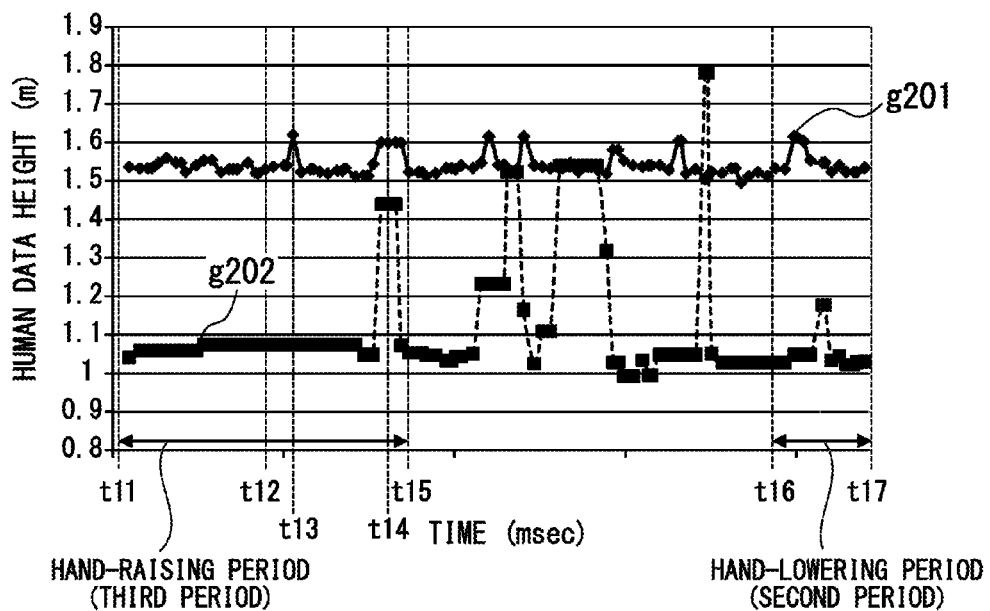
FIG. 7 is a diagram for describing an example of a change in height information of two persons for each measurement time when the clustering process is performed using a conventional technique.

A diagram indicated by reference sign g101 of FIG. 6 is a diagram for describing states of the person hu1 and the person hu2 at time t12 of FIG. 7. A diagram indicated by reference sign g102 of FIG. 6 is a diagram for describing states of the person hu1 and the person hu2 at time t14 of FIG. 7. Also, the example illustrated in FIG. 6 is an example in which there are two persons hu1 and hu2, the person hu1 is a mother, and the person hu2 is her child.

In FIG. 7, the horizontal axis represents time (msec) and the vertical axis represents human data height (m). In FIG. 7, a curve g201 indicates a change in a human data height corresponding to the person hu1 of FIG. 6 for a measurement time and a curve g202 indicates a change in the human data height corresponding to the person hu2 of FIG. 6 for a measurement time. Also, FIGS. 6 and 7 are examples of actually measured data and a result of processing the data.

A diagram indicated by reference sign g110 of FIG. 6 is a diagram for describing a result of performing the clustering process using a conventional technique at time t12 (FIG. 7). A diagram indicated by reference sign g120 is a diagram for describing a result of performing the clustering process using a conventional technique at time t14 (FIG. 7). Also, the diagrams indicated by reference signs g110 and g120 are the diagrams after ranging points are projected onto the xy plane (FIG. 1) and the clustering process is performed.

First, time t12 (FIG. 7) will be described.

In the example illustrated in the diagram indicated by reference sign g101 of FIG. 6, a position of a head (or face) of the person hu1 and a position of a head (or face) of the person hu2 are separated by about 70 (cm) as indicated by an arrow g103.

In the diagram indicated by reference sign g110 of FIG. 6, a region indicated by reference sign g111 is human cluster data d1 classified as the person hu1 and a region indicated by reference sign g112 is human cluster data classified as the person hu2. Also, in the diagram indicated by reference signs g110, a point g113 indicates a position of a maximum value of the z-axis direction in the human cluster data classified as the person hu1 and a point g114 indicates a position of a maximum value of the z-axis direction in the human cluster data classified as the person hu2. The point g113 corresponds to a position of the top of the head of the person hu1 and the point g114 corresponds to a position of the top of the head of the person hu2. In the diagram indicated by reference sign g110, the human cluster data of each of the person hu1 and the person hu2 is separated at a position indicated by a broken line g115. Also, this position is defined as a dividing position of the cluster.

Next, time t14 (FIG. 7) will be described.

In the example of the diagram indicated by reference sign g102 of FIG. 6, a position of a head (or face) of the person hu1 and a position of a head (or face) of the person hu2 are separated by only about 40 (cm) as indicated by an arrow g104 because the person hu2 is close to the person hu1. In the diagram indicated by reference sign g120 of FIG. 6, a region indicated by reference sign g121 is human cluster data classified as the person hu1 and a region indicated by reference sign g122 is human cluster data classified as the person hu2. Also, in the diagram indicated by reference signs g120, a point g123 indicates a position of a maximum value of the z-axis direction in the human cluster data classified as the person hu2. A point g124 indicates a position of a maximum value of the z-axis direction in the human cluster data classified as the person hu1. The points g123 and g124 correspond to positions of the top of the head, the shoulder, and the like of the person hu1. That is, in the example of the diagram indicated by reference sign g120, a ranging point of the person hu1 and a ranging point of the person hu2 are included in the human cluster data classified as the person hu2. As a result, in the example of the diagram indicated by reference sign g120, height information of the person hu2 is erroneously detected as height information of the person hu1.

In the diagram indicated by reference sign g120, the human cluster data of each of the person hu1 and the person hu2 is not separated at a dividing position of the cluster indicated by a broken line g125 which is a position to be classified because the person hu2 is close to the person hu1.

Next, temporal changes in the states of the person hu1 and the person hu2 and the human data heights corresponding to the person hu1 and the person hu2 will be described.

In FIG. 7, a time period t11 to t15 is a hand-raising period (third period) and a time period t16 to t17 is a hand-lowering period (second period).

At a time before time t11, the control unit 102 starts an output from the voice output unit 103 for a voice signal "People who want to hear about A, please raise your hands."

At time t12, as indicated by a curve g201 of FIG. 7, a value measured as the human data height information of the person hu1 is about 1.52 (m). Also, as indicated by a curve g202 of FIG. 7, a value measured as the human data height information of the person hu2 is about 1.08 (m).

Because the person hu1 moves at time t13, a value measured as the human data height information of the person hu1 is about 1.62 (m) as indicated by a curve g201 of FIG. 7. Also, as indicated by a curve g202 of FIG. 7, a value measured as the human data height information of the person hu2 is about 1.08 (m).

Because the person hu1 moves and the person hu2 is closer to the person hu1 at time t14, a value measured as the human data height information of the person hu1 is about 1.60 (m) as indicated by the curve g201 of FIG. 7. Also, as indicated by the curve g202 of FIG. 7, a value measured as the human data height information of the person hu2 is about 1.45 (m). 1.45 (m) which is a value measured as the height information is not a height by the hand raising of the person hu2, but is a height of the shoulder of the person hu1. However, because the person hu2 was close to the person hu1, the ranging point to be originally classified as the person hu1 was classified as the person hu2 as a result in which the clustering process was not properly performed. Because this ranging point was become a highest point among ranging points classified as the person hu2, this ranging point was finally erroneously measured as a human data height of the person hu2.

Thus, when the clustering process of the conventional technique was performed, the maximum height of the person hu1 in the hand-raising period (third period) was about 1.62 (m) at time t13 and the maximum height of the person hu2 in the hand-raising period (third period) was measured to be about 1.45 (m) at time t14.

As indicated by the curve g201 of FIG. 7, an average value of human data heights of the person hu1 in the hand-lowering period (second period) is about 1.56 (m). Also, as indicated by the curve g202 of FIG. 7, an average value of human data heights of the person hu2 in the hand-lowering period (second period) is about 1.08 (m).

The case in which the situation estimation unit 220 estimates that hand raising is performed when a difference between the maximum value of the human data heights of the hand-raising period (third period) and the average value of the human data heights of the hand-lowering period (second period) is more than or equal to 10 (cm) which is a predetermined value will be described in the example illustrated in FIG. 7 in which the clustering process is performed using a conventional technique.

When the average value in the hand-lowering period (second period) in which no hand raising is performed is designated as a value of a height of each person, a value of the height of the person hu1 is about 1.56 (m) and a value of the height of the person hu2 is about 1.08 (m). When a value obtained by adding a predetermined value to the value of the height is designated as a hand-raising threshold value, the hand-raising threshold value of the person hu1 is 1.66 (m) and the hand-raising threshold value of the person hu2 is 1.18 (m).

The maximum value of the human data height of the person hu1 in the third period is about 1.62 (m) at time t13. The situation estimation unit 220 estimates that the person hu1 does not raise her hand because 1.62 (m) of the maximum value of the human data height is less than 1.66 (=1.56 (m)+10 (cm) (m) of the hand-raising threshold value.

The maximum value of the human data height of the person hu2 in the third period is about 1.45 (m) at time t14. The situation estimation unit 220 erroneously estimates that his/her hand is raised, in spite of the fact that the person hu2 does not raise his/her hand, because 1.45 (m) of the maximum value of the human data height exceeds 1.18 (m) of the hand-raising threshold value.

Thus, when the clustering process is performed using the conventional technique as described using FIGS. 6 and 7, the generation of the cluster and the separation of the cluster are not properly performed if persons are adjacent within a predetermined distance. When the separation of the cluster is not properly performed, the case in which it is not possible to properly measure the height of each person occurs and the situation estimation unit 220 erroneously estimates whether the hand raising is performed.

<Description of Process which is Performed by Histogram Processing Unit 221>

In the present embodiment, the situation estimation unit 220 estimates whether the hand raising is performed on the basis of a result of processing by the histogram processing unit 221 as will be described below to prevent the above-described erroneous estimation.

Figure 8:
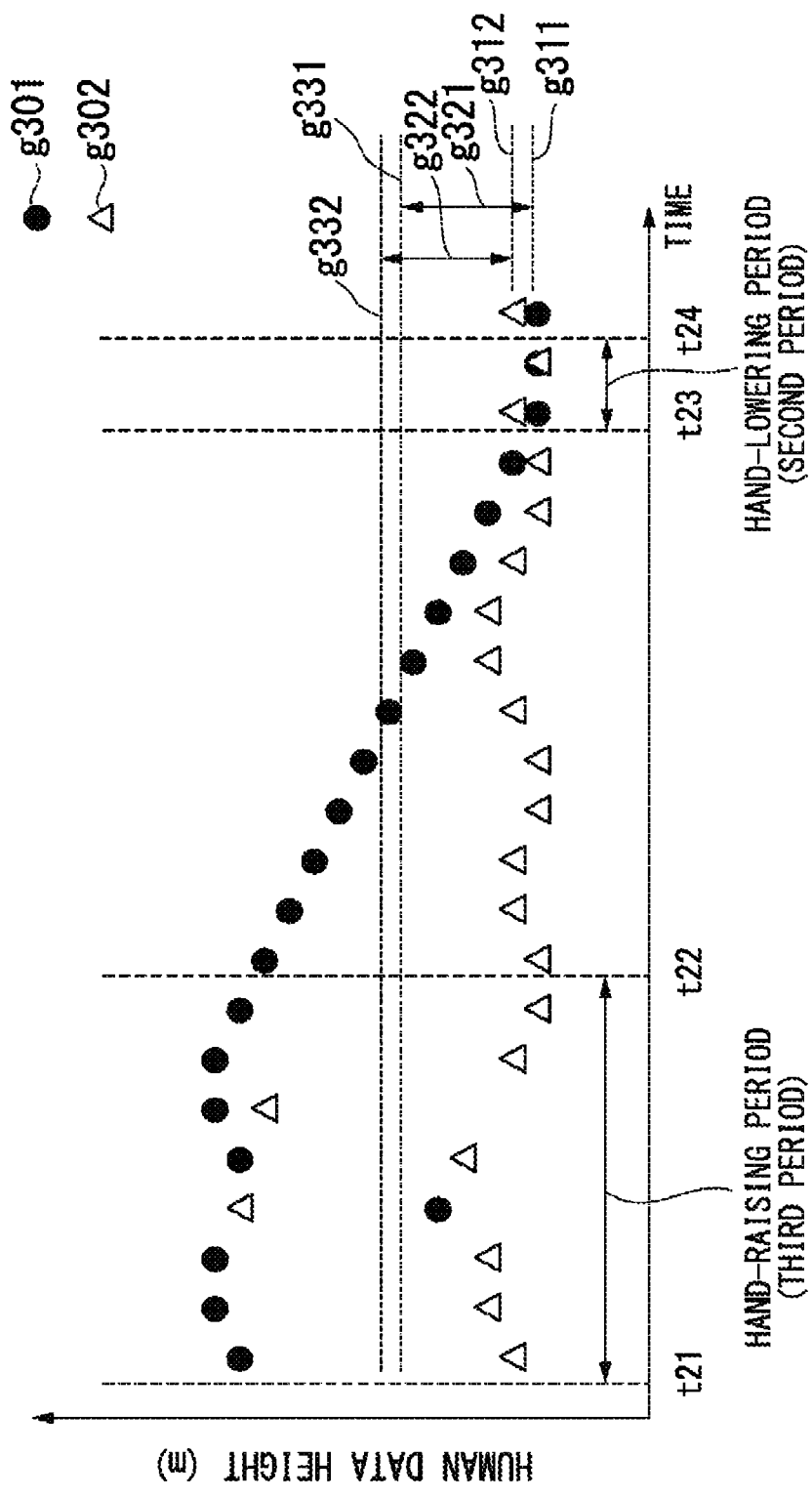
FIG. 8 is a diagram for describing an example of a process which is performed by a histogram processing unit according to the first embodiment.

FIG. 8 is a diagram for describing an example of a process which is performed by the histogram processing unit 221 according to the present embodiment. In FIG. 8, the horizontal axis represents time and the vertical axis represents human data height. Also, in FIG. 8, a point g301 indicates a human data height of a person identified by ID1 and a point g302 indicates a human data height of a person identified by ID2. The hand-raising period is a third period and the hand-lowering period is a second period. Also, a broken line g311 indicates an average value of human data heights of a person recognized by ID1 in the second period and a broken line g312 is an average value of human data heights of a person recognized by ID2 in the second period. An arrow g321 and an arrow g322 indicate predetermined values for determining the hand raising. The predetermined value is, for example, 10 (cm). A broken line g331 is a broken line indicating a value (hand-raising threshold value) obtained by adding the predetermined value indicated by the arrow g321 to the average value indicated by the broken line g311 and a broken line g332 is a broken line indicating a hand-raising threshold value obtained by adding the predetermined value indicated by the arrow g322 to the average value indicated by the broken line g312.

Figure 9:
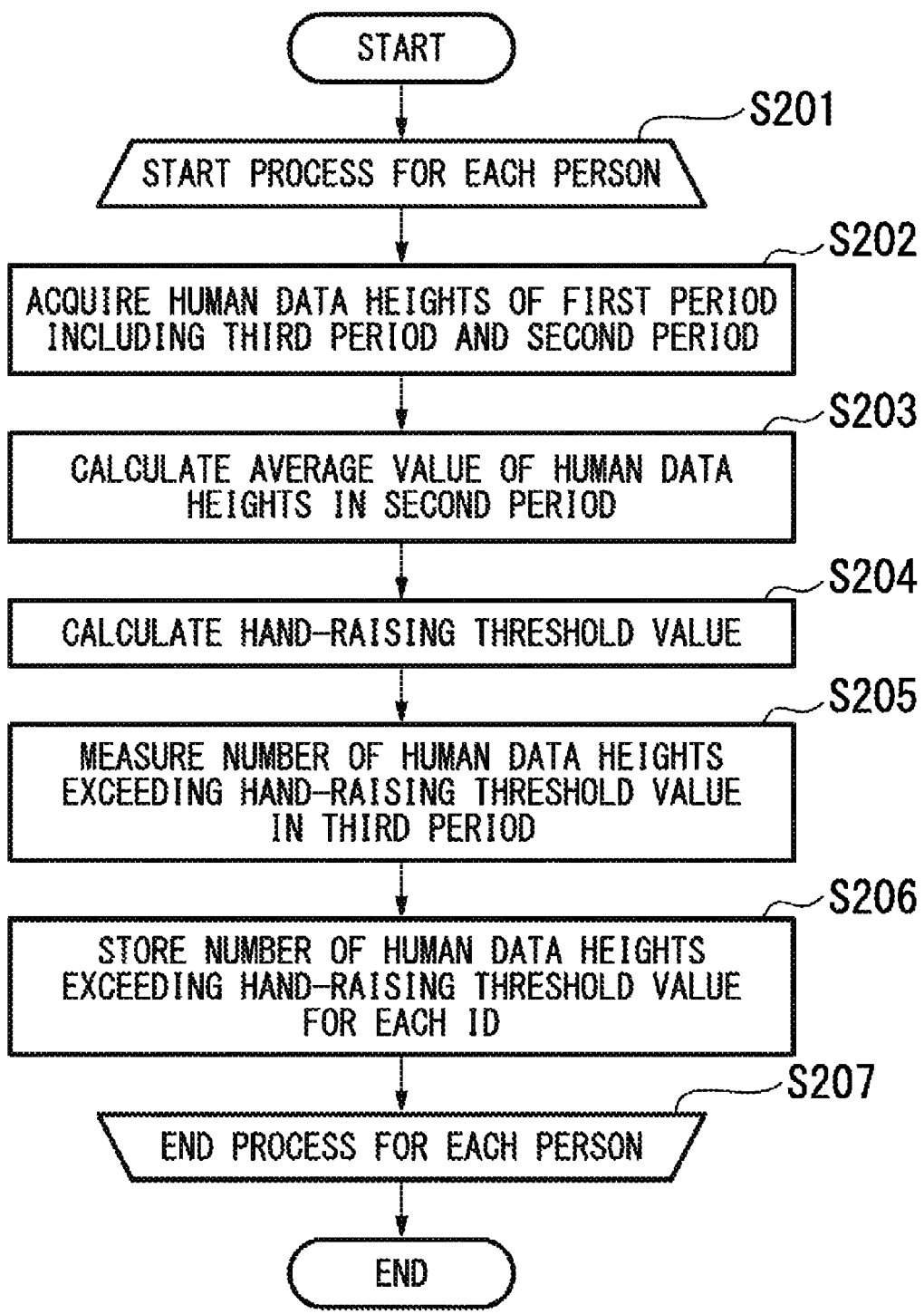
FIG. 9 is a flowchart of a processing procedure which is performed by the histogram processing unit according to the first embodiment.

FIG. 9 is a flowchart of a processing procedure which is performed by the histogram processing unit 221 according to the present embodiment. Also, in the present embodiment, the process to be described below is referred to as a histogram creation process.

Also, in the following description, the tracking process starts at time t21 of FIG. 8.

(Step S201) The histogram processing unit 221 performs the processes of steps S202 to S206 for each person.

(Step S202) The histogram processing unit 221 acquires a human data height between times t21 and t24 (FIG. 8) in the first period including the third period and the second period.

(Step S203) The histogram processing unit 221 calculates the average value of the human data heights in the second period for the human data tracked during the first period in step S201.

(Step S204) The histogram processing unit 221 calculates the hand-raising threshold value by adding a predetermined value (for example, 10 (cm)) to the average value of the human data heights calculated in step S203.

(Step S205) The histogram processing unit 221 measures the number of times that the human data height exceeds the hand-raising threshold value calculated in step S204 for each ID in the third period.

(Step S206) The histogram processing unit 221 causes the storage unit 230 to store the number of times that the measured human data height exceeds the hand-raising threshold value for each ID.

(Step S207) The histogram processing unit 221 ends the histogram creation process after the processes of steps S202 to S206 end for all persons. Also, the histogram processing unit 221 iteratively performs the above-described process whenever the third period and the second period occur.

Also, although an example in which the histogram processing unit 221 measures the number of times that the human data height exceeds the hand-raising threshold value in the third period in step S205 of FIG. 9 has been described, the present invention is not limited thereto.

The histogram processing unit 221 may be configured to measure the number of times that the human data height exceeds the hand-raising threshold value in the first period including the third period and the second period.

In the example illustrated in FIG. 8, the number of times that the human data height exceeds the hand-raising threshold value in the third period is 7 for ID1 and is 2 for ID2.

The histogram processing unit 221 performs the above-described process on all persons in a venue. The situation estimation unit 220 classifies a person raising his/her hand and a person not raising his/her hand on the basis of the number of times that the human data height exceeds the hand-raising threshold value in the third period measured by the histogram processing unit 221.

Figure 10:
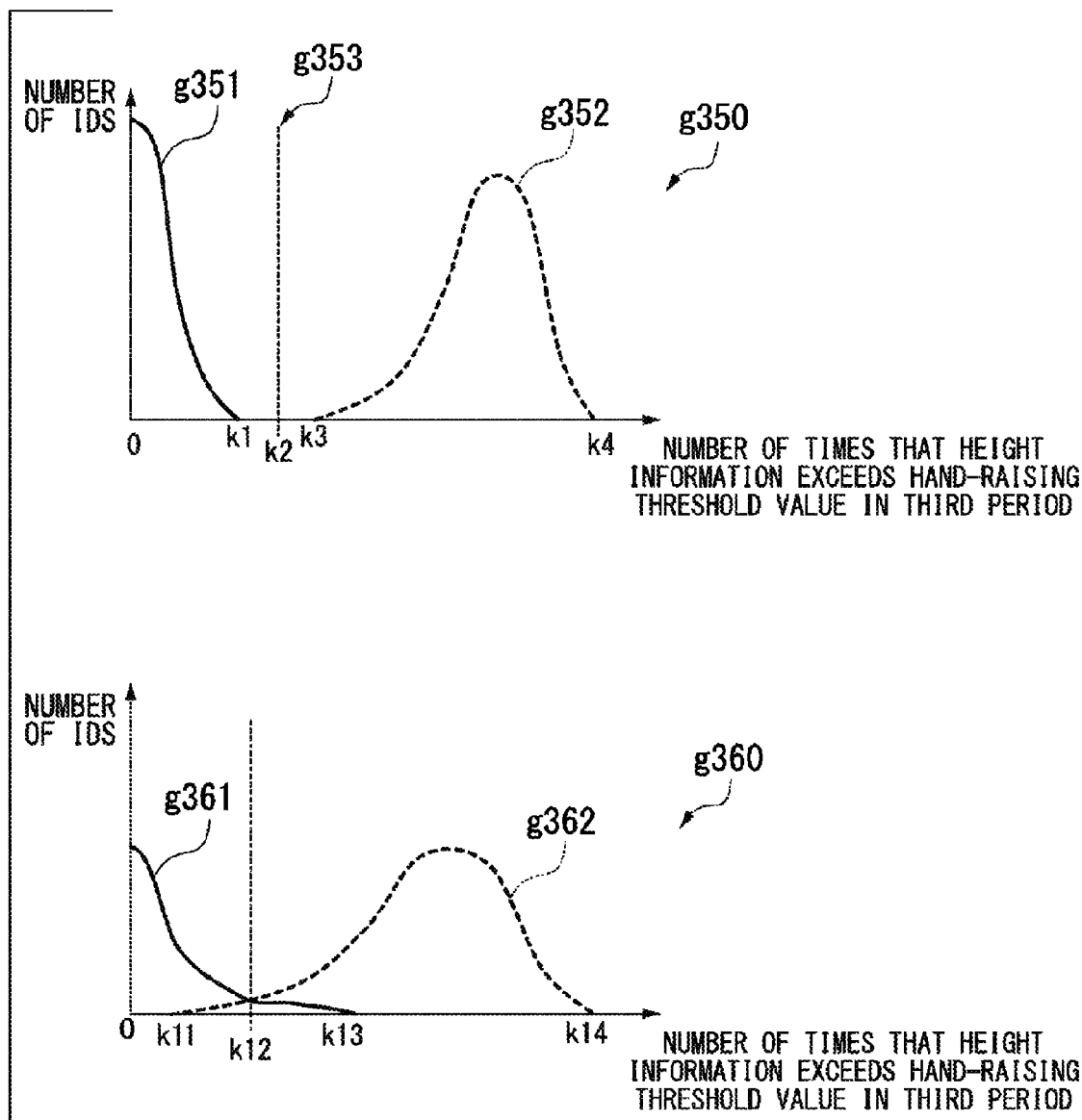
FIG. 10 is a diagram for describing an example of a relationship between the number of times that height information exceeds a hand-raising threshold value in a third period and the number of IDs according to the first embodiment.

FIG. 10 is a diagram for describing an example of a relationship between the number of times that height information exceeds the hand-raising threshold value in the third period and the number of IDs according to the present embodiment. Also, the diagram illustrated in FIG. 10 is an example of a result of counting the number of persons raising their hands and the number of persons not raising their hands through visual observation by a person using an image obtained by imaging a state of the venue.

In FIG. 10, a diagram indicated by reference sign g350 is an example in which a distribution of the persons raising their hands and a distribution of the persons not raising their hands are ideal. In the diagram indicated by reference sign g350, a curve g351 indicates a relationship between the number of IDs corresponding to the persons not raising their hands and the number of times that the human data height exceeds the hand-raising threshold value in the third period. Also, a curve g352 indicates a relationship between the number of IDs corresponding to the persons raising their hands and the number of times that the human data height exceeds the hand-raising threshold value in the third period.

In the example of the diagram indicated by reference sign g350, the number of times that the human data height of the person not raising his/her hand in the third period exceeds the hand-raising threshold value is distributed from 0 to k1. Also, the number of times that the human data height of the person raising his/her hand in the third period exceeds the hand-raising threshold value is distributed from k3 to k4. In the example of the diagram indicated by reference sign g350, the distribution of the persons not raising their hands indicated by reference sign g351 and the distribution of the persons raising their hands indicated by reference sign g352 are separated at intervals of k1 and k3. Thus, k2 which is an average value of k1 and k3 can be designated as a determination threshold value of whether hand raising is performed. The situation estimation unit 220 determines whether the person raises his/her hand using the determination threshold value set as described above. Also, the determination threshold value is pre-stored in the storage unit 230.

In FIG. 10, a diagram indicated by reference sign g360 is an example in which the distribution of the persons raising their hands and the distribution of the persons not raising their hands are close to each other. In the diagram indicated by reference sign g360, a curve g361 indicates a relationship between the number of IDs corresponding to the persons not raising their hands and the number of times that the human data height exceeds the hand-raising threshold value in the third period. Also, a curve g362 indicates a relationship between the number of IDs corresponding to the persons raising their hands and the number of times that the human data height exceeds the hand-raising threshold value in the third period.

In the example of the diagram indicated by reference sign g360, the number of times that the human data height of the person not raising his/her hand in the third period exceeds the hand-raising threshold value is distributed from 0 to k13. Also, the number of times that the human data height of the person raising his/her hand in the third period exceeds the hand-raising threshold value is distributed from k11 to k14. In the example of the diagram indicated by reference sign g360, the distribution of the persons not raising their hands indicated by reference sign g361 and the distribution of the persons raising their hands indicated by reference sign g362 overlap between k11 and k13. In this case, when a value between k11 and k13 is set as the determination threshold value, the case in which a determination of whether the person raises his/her hand is erroneous may occur. Thus, for example, in this case, at least one of the following determination criteria can be used.

Determination criterion 1: it is determined that no hand raising is performed when the number of times is less than or equal to k11

Determination criterion 2: it is determined that hand raising is performed when the number of times is greater than or equal to k13

For example, k13 may be designated as a threshold value when the hand raising is not erroneously counted (hereinafter, referred to as FA). Also, k11 may be designated as a threshold value when preventing the hand raising from being counted is desired (hereinafter referred to as FN). When reducing both FA and FN is desired, an intersection k12 of the curve may be designated as the threshold value. Thus, it is only necessary for the threshold value to be a value between k11 and k13.

The situation estimation unit 220 determines whether the person raises his/her hand using the determination threshold value set on the basis of the above-described determination criteria.

A distribution as illustrated in FIG. 10 is determined by a density within a venue, a relation between people, etc. For example, when a distance between two persons is close in a region in which there are a parent and a child, lovers, or the like even when the entire venue is not crowded with people, it may be preferable to use the determination threshold values described with reference to reference sign g360 of FIG. 10. Thus, the situation estimation unit 220 may use any one determination threshold value among the determination threshold values described using reference sign g360 of FIG. 10 on the basis of the distribution of xy coordinates of each piece of human data during the first period including the third period and the second period in the diagrams indicated by reference signs g110 and g120 of FIG. 6.

Next, a processing procedure of hand-raising detection by the robot 1 will be described.

Figure 11:
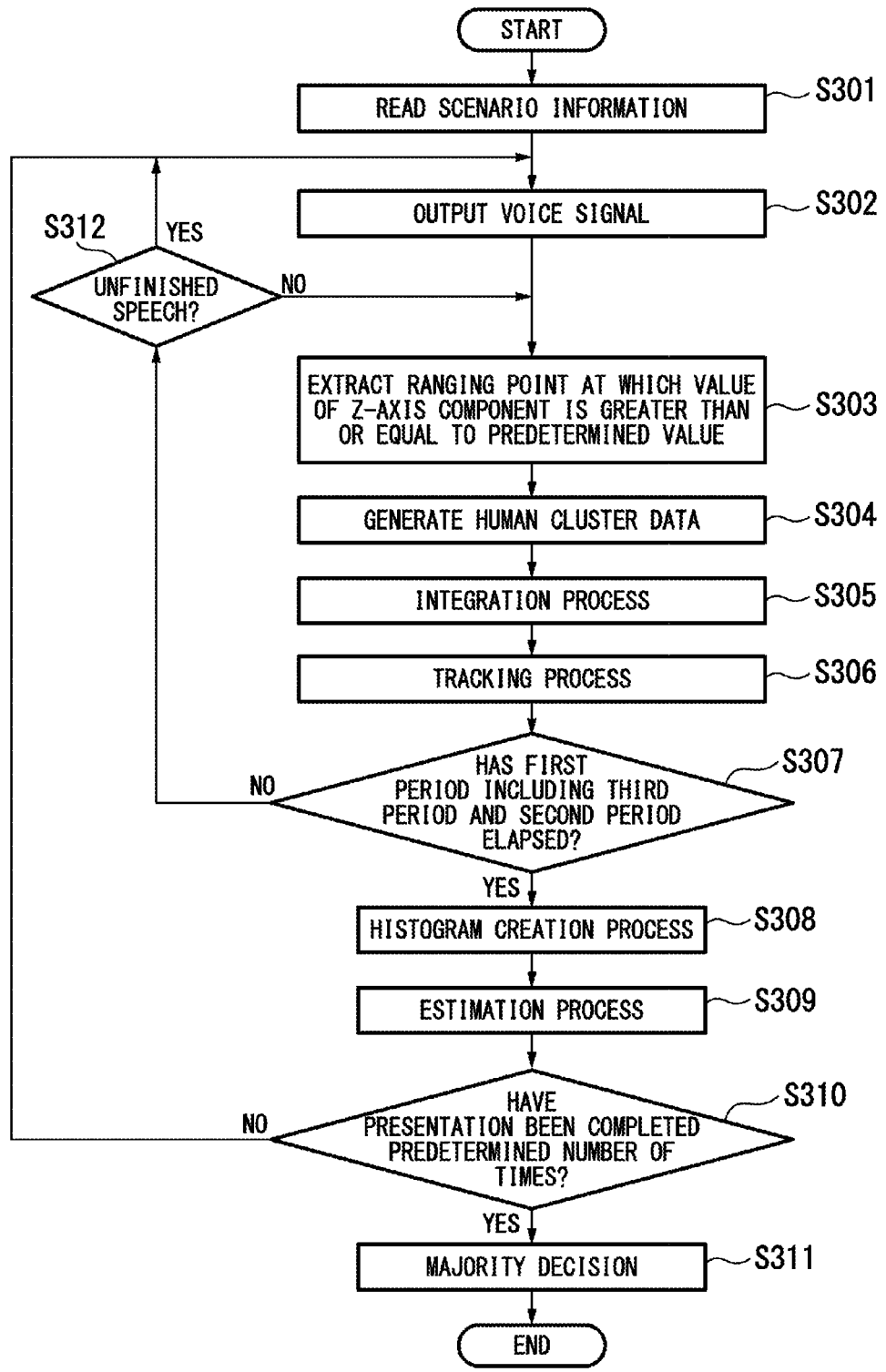
FIG. 11 is a flowchart of a processing procedure of hand-raising detection by the robot according to the first embodiment.

FIG. 11 is a flowchart of a processing procedure of hand-raising detection by the robot 1 according to the present embodiment.

(Step S301) The control unit 102 reads scenario information stored in the storage unit 101. The control unit 102 moves the process to step S302.

(Step S302) The control unit 102 causes a voice signal to be output from the voice output unit 103 on the basis of the read scenario information. The control unit 102 moves the process to step S303.

(Step S303) The clustering unit 211 extracts a ranging point at which a value of the z-axis component is greater than or equal to a predetermined value from among ranging-point information input from the LRF sensor 2. The clustering unit 211 moves the process to step S304.

(Step S304) The clustering unit 211 generates human cluster data using information of the ranging point extracted in step S303. The clustering unit 211 moves the process to step S305.

(Step S305) The cluster data integration unit 212 performs an integration process using the human cluster data generated in step S304. Next, when integration between clusters is performed, the cluster data integration unit 212 designates a center of gravity of an integrated cluster as a position of cluster data after the integration (a human cluster data position) and designates a maximum value of heights of the integrated cluster as a height of the cluster data after the integration (a human cluster data height). Next, the cluster data integration unit 212 generates human cluster data d2 in which the human cluster data position and the human cluster data height are associated for each cluster and outputs the generated human cluster data d2 to the tracking unit 213. The cluster data integration unit 212 moves the process to step S306.

(Step S306) The tracking unit 213 performs a tracking process at each predetermined time interval on the basis of the human cluster data position using the human cluster data d2 input from the cluster data integration unit 212. The tracking unit 213 first assigns an ID for each piece of input human cluster data. Next, the tracking unit 213 assigns the same ID as that first assigned to the human cluster data regarded to be that of the same person as a result of performing the tracking process in time series. Next, the tracking unit 213 generates human data d3 by associating an ID obtained as a result of performing the tracking process, a human data position, and a human data height and outputs the generated human data d3 to the situation estimation unit 220. The tracking unit 213 moves the process to step S307.

(Step S307) The situation estimation unit 220 determines whether the first period including the third period and the second period has elapsed. The situation estimation unit 220 proceeds to step S308 when it is determined that the first period including the third period and the second period has elapsed (step S307; YES), and proceeds to step S312 when it is determined that the first period including the third period and the second period has not elapsed (step S307; NO).

(Step S312) The situation estimation unit 220 determines whether or not the speech has not been finished. The situation estimation unit 220 returns to step S302 when it is determined that the speech has not been finished (step S312; YES) and returns to step S303 when it is determined that the speech is finished (step S312; NO).

(Step S308) The histogram processing unit 221 performs a histogram creation process of steps S201 to S207 of FIG. 9. The histogram processing unit 221 moves the process to step S309.

(Step S309) The situation estimation unit 220 estimates the number of persons raising their hands using a result of processing in step S308 and the determination threshold value stored in the storage unit 230. The situation estimation unit 220 moves the process to step S310.

(Step S310) The situation estimation unit 220 determines whether question presentation has been completed a predetermined number of times on the basis of scenario information. The situation estimation unit 220 proceeds to step S311 when it is determined that the question presentation has been completed a predetermined number of times (step S310; YES) and returns to step S302 when it is determined that the question presentation has not been completed a predetermined number of times (step S310; NO).

(Step S311) The situation estimation unit 220 finds a majority decision on the basis of an estimation result for each question estimated in step S309 after a predetermined question is presented a predetermined number of times on the basis of the scenario information. The situation estimation unit 220 performs a comparison with the number of persons raising their hands for each question estimated in step S309 and selects a question for which the number of persons is largest.

The process of hand-raising detection ends.

For example, because both a ranging point of one person and a ranging point of the other person are clustered when two persons such as a parent and a child between whom there is a height difference are close to each other, a dividing position of the cluster is shifted as described using FIG. 6. Because the dividing position of the cluster is shifted, the height measurement value and the position in the xy plane for each cluster may be erroneously detected.

Thus, the determination threshold value is set on the basis of a distribution of the number of times that it exceeds the hand-raising threshold value in the third period for persons raising their hands and persons not raising their hands created by the histogram processing unit 221 using actually measured data. In the present embodiment, it is estimated whether the person raises his/her hand using the determination threshold value set as described above.

Thereby, in the present embodiment, it is possible to estimate that hand raising is performed for human data for which the number of times that a height measurement value greater than the hand-raising threshold value is measured in the third period is greater than the determination threshold value even when there is a period in which the clustering process cannot be properly performed when persons adjacent to each other are close to or away from each other in a period in which the hand raising is prompted. In the present embodiment, it is possible to estimate that no hand raising is performed for human data for which the number of times that a height measurement value greater than the hand-raising threshold value in the third period is measured is less than the determination threshold value even when there is a period in which the clustering process cannot be properly performed when persons adjacent to each other are close to or away from each other in a period in which the hand raising is prompted. As a result, according to the present embodiment, it is possible to improve the precision of estimation of operations of a plurality of persons in a detection target area because it is possible to reduce erroneous estimation.

As described above, an operation estimation apparatus (for example, the operation estimation apparatus 20) of the present embodiment includes: a distance measurement unit (for example, the LRF filter 2) configured to measure a distance (for example, each value of a three-dimensional direction for a person) for a predetermined range; a human-body processing unit (for example, the clustering unit 211 and the clustering integration unit 212) configured to detect a person on the basis of a distribution of distances measured by the distance measurement unit; a tracking unit (for example, the tracking unit 213) configured to assign an identifier (for example, an ID) to each person detected by the human-body processing unit; and a situation estimation unit (for example, the situation estimation unit 220) configured to estimate a reaction of the person on the basis of a human data height which is a value of a height direction included in the measured distance in a first period set by prompting the person to start and end hand raising, wherein the situation estimation unit measures the human data height for each person to which the identifier is assigned by the tracking unit a plurality of times in the first period, extracts an identifier for which a plurality of human data heights are in the predetermined range, and estimates the reaction of the person corresponding to the extracted identifier.

Also, the operation estimation apparatus (for example, the operation estimation apparatus 20) of the present embodiment includes: a control unit (for example, the control unit 102) configured to output a signal indicating a prompt for a person to start or end the hand raising and control behavior of the robot on the basis of the estimated reaction of the person.

Through this configuration, the operation estimation apparatus 20 of the present embodiment can reduce erroneous detection of hand-raising detection even when a parent and a child between whom there is a height difference, etc. are close to each other. As a result, the operation estimation apparatus 20 of the present embodiment can improve the precision of detection of hand raising.

Also, in the operation estimation apparatus (for example, the operation estimation apparatus 20) of the present embodiment, the situation estimation unit (for example, the situation estimation unit 220) calculates a hand-raising threshold value set on the basis of an average value or a maximum value of the human data heights in a second period in which no person performs the hand raising for each person and human physique data, extracts a person for which the number of times that the human data height exceeding the hand-raising threshold value is measured is greater than the predetermined number of times in the first period, and estimates the reaction of the extracted person.

Also, in the operation estimation apparatus (for example, the operation estimation apparatus 20) of the present embodiment, the situation estimation unit (for example, the situation estimation unit 220) determines the predetermined number of times (for example, the determination threshold value) on the basis of the number of times that the human data height exceeding the hand-raising threshold value is measured and information indicating a distribution associated with whether the hand raising is performed.

Through this configuration, the operation estimation apparatus 20 of the present embodiment can reduce erroneous detection of hand-raising detection even when a parent and a child, etc. are close to or away from each other while the hand raising is prompted. As a result, the operation estimation apparatus 20 of the present embodiment can improve the precision of detection of hand raising.

Also, in the operation estimation apparatus (for example, the operation estimation apparatus 20) of the present embodiment, the distance measurement unit (for example, the LRF sensor 2) includes: a plurality of distance measurement units (for example, the LRF sensors 2-1 to 2-$n$) configured to measure distances for different predetermined ranges, and the human-body processing unit (for example, the human-body processing unit 210) includes: a plurality of clustering units (for example, the clustering units 211-1 to 211-$n$) configured to generate human cluster data by clustering the distances measured by the distance measurement units; and a cluster data integration unit (for example, the cluster data integration unit 212) configured to integrate the human cluster data generated by the plurality of clustering units.

Through this configuration, in the operation estimation apparatus 20 of the present embodiment, each clustering unit 211 performs the clustering process on ranging points measured by the plurality of LRF sensors 2. In the present embodiment, the cluster data integration unit 212 integrates human cluster data generated in the clustering process. In the present embodiment, the tracking process and the estimation of whether the person raises his/her hand are performed using human cluster data generated as described above. Thereby, in the present embodiment, it is possible to improve the precision of detection of hand raising because measurement can be performed using a ranging point of another LRF sensor 2 even for a person for which measurement cannot be performed using one LRF sensor 2.

Also, although an example in which the determination threshold value is pre-stored in the storage unit 230 has been described in the present embodiment, the present invention is not limited thereto. For example, the operation estimation apparatus 20 may be configured to perform a dry run before the question according to the scenario is performed, set the determination threshold value by performing a clustering process and histogram processing on information of a ranging point acquired at that time and cause the storage unit 230 to store the set determination threshold value or select a determination threshold value from among determination threshold values stored in the storage unit 230.

Second Embodiment

An example in which erroneous estimation can be reduced even when persons between whom there is a height difference are close to each other has been described in the first embodiment. In the present embodiment, an example in which erroneous estimation can be reduced even when a raised hand is placed above another person and the separation of a cluster fails will be described.

Also, a schematic block diagram of the robot 1 according to the present embodiment is similar to FIG. 1.

<Description of Erroneous Detection Examples>

First, the case in which two persons are adjacent to each other and a hand raised by one person is placed above the other person will be described using FIGS. 12 and 13.

FIG. 12 is a diagram for describing a situation in which two persons are adjacent and an example in which a clustering process is performed using a conventional technique. FIG. 13 is a diagram for describing an example of a change in human data height information of two persons for each measurement time when a tracking process is performed after the clustering process is performed using a conventional technique. Also, the example illustrated in FIG. 12 is an example in which there are two persons hu1 and hu2. The person hu1 is a mother, and the person hu2 is her child.

Figure 13:
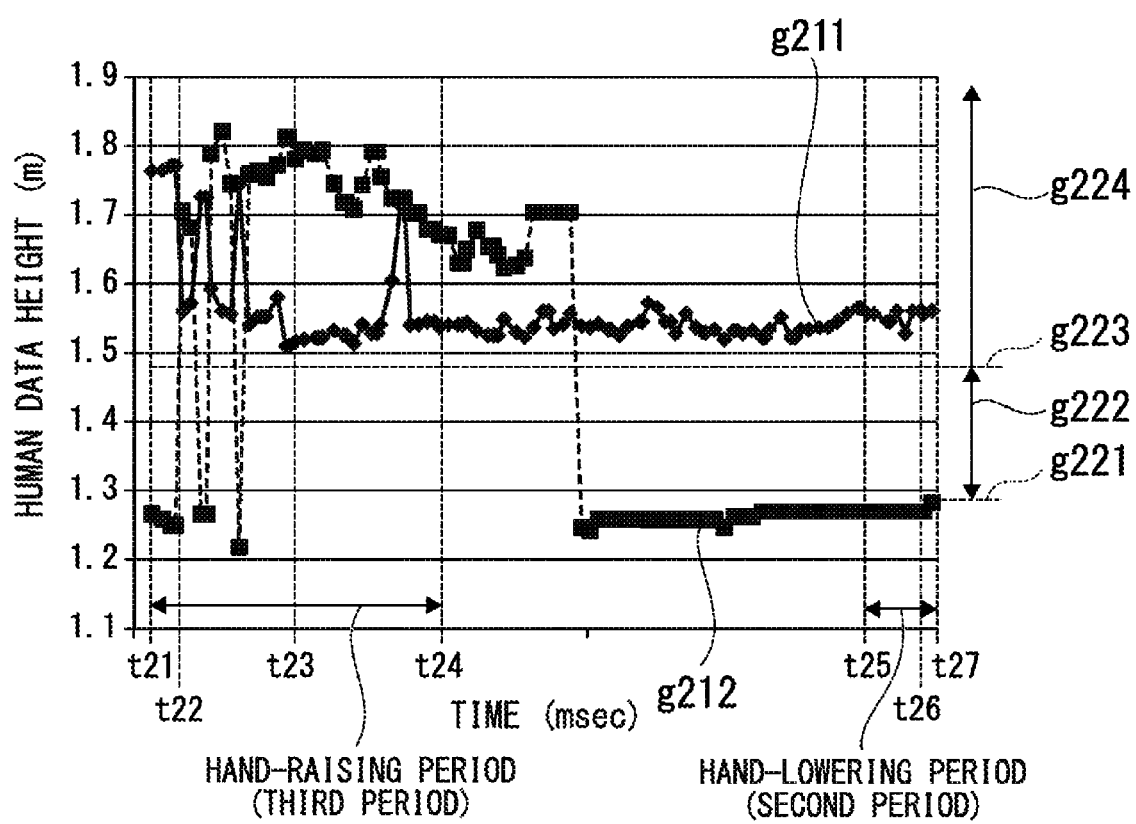
FIG. 13 is a diagram for describing an example of a change in human data height information of two persons for each measurement time when a tracking process is performed after the clustering process is performed using a conventional technique.

In FIG. 13, the horizontal axis represents time (msec) and the vertical axis represents human data height (m). A curve g211 indicates a change in a human data height corresponding to the person hu1 for a measurement time and a curve g212 indicates a change in the human data height corresponding to the person hu2 for a measurement time. Also, FIGS. 12 and 13 are examples of actually measured data and a result of processing the data. As in the first embodiment, the hand-raising period (time period t21 to t24) is the third period and the hand-lowering period (time period t25 to t27) is the second period.

A diagram indicated by reference sign g131 of FIG. 12 is a diagram for describing the states of the person hu1 and the person hu2 at time t23 of FIG. 13. A diagram indicated by reference sign g132 is a diagram for describing the states of the person hu1 and the person hu2 at time t26 of FIG. 13.

A diagram indicated by reference sign g140 of FIG. 12 is a diagram for describing a result of performing the clustering process using a conventional technique at time t23 (FIG. 13). A diagram indicated by reference sign g150 is a diagram for describing a result of performing the clustering process using a conventional technique at time t26 (FIG. 13). Also, the diagrams indicated by reference signs g140 and g150 are diagrams after ranging points are projected onto the xy plane (FIG. 2) and the clustering process is performed.

First, time t23 (FIG. 13) will be described.

In the example illustrated in the diagram indicated by reference sign g131 of FIG. 12, a position of the top of a head of the person hu1 and a position of the top of a head of the person hu2 are separated about 31 (cm) as indicated by an arrow g133. In the diagram indicated by reference sign g140 of FIG. 12, a region indicated by reference sign g141 is human cluster data classified as the person hu1 and a region indicated by reference sign g142 is human cluster data classified as the person hu2. Also, in the diagram indicated by reference signs g140, a point g143 indicates a position of a maximum value of the z-axis direction in the human cluster data classified as the person hu1 and a point g144 indicates a position of a maximum value of the z-axis direction in the human cluster data classified as the person hu2. The point g143 corresponds to a position of the top of the head of the person hu1 and the point g144 does not correspond to a position of the top of the head of the person hu2, but corresponds to a position of a hand of the person hu1. Thus, in the diagram indicated by reference sign g140, a region indicated by reference sign g145 is a ranging point corresponding to the arm of the person hu1. That is, hand raising of the person hu1 is not performed immediately above herself, but her raised hand is placed above the head or the like of the person hu2. Thus, the ranging point corresponding to the arm of the person hu1 is clustered to the side of the person hu2 and the point g144 is detected as a maximum value of the z-axis direction of the person hu2.

Next, time t26 (FIG. 13) will be described.

In the example indicated by reference sign g132 of FIG. 12, the hand or arm of the person hu1 is not placed above the head or the like of the person hu2 because the person hu1 has lowered his/her hand (this is also referred to as hand lowering). In the diagram indicated by reference sign g150, a region indicated by reference sign g151 is human cluster data classified as the person hu1 and a region indicated by reference sign g152 is human cluster data classified as the person hu2. Also, in the diagram indicated by reference sign g150, the point g153 corresponds to a position of the top of the head of the person hu1 and the point g154 corresponds to a position of the top of the head of the person hu2. Thus, at time t26 at which the person hu1 has lowered his/her hand, a maximum value of the z-axis direction of each cluster is correctly detected.

Next, temporal changes in the states of the person hu1 and the person hu2 and the human data heights will be described using FIG. 13.

At a time before time t21, the control unit 102 starts an output from the voice output unit 103 for a voice signal "People who want to hear about A, please raise your hands." Accordingly, the person hu1 raises her hand.

A time period t21 to t24 is a hand-raising period (third period).

Between times t21 and t22, as indicated by a curve g211, a maximum value of the z-axis direction by the hand raising of the person hu1 is detected as the human data height of the person hu1. For times t21 to t22, as indicated by the curve g211 of FIG. 13, a value of the human data height of the person hu1 is about 1.78 (m). Also, as indicated by the curve g212 of FIG. 13, a value of the human data height of the person hu2 is about 1.27 (m).

Between times t22 and t24, as indicated by the curve g211, the maximum value of the z-axis direction due to the hand raising of the person hu1 is detected as the human data height of the person hu2 because the raised hand is placed above the person hu2. Between times t22 and t24, as indicated by the curve g211 of FIG. 13, the value of the human data height of the person hu1 is about 1.51 to 1.73 (m). Also, as indicated by the curve g212 of FIG. 13, the value of the human data height of the person hu2 is about 1.21 to 1.82 (m).

The hand-lowering period (second period) is a period after hand lowering is prompted. In this period, the person hu1 lowers her hand as in FIG. 12. Thus, as indicated by the curve g211 of FIG. 12, the value of the human data height of the person hu1 is, for example, about 1.55 (m) at time t26. Also, as indicated by the curve g212 of FIG. 12, the value of the human data height of the person hu2 is about 1.28 (m) at time t26.

The average value of the human data heights in time series between times t25 and t27 corresponds to a height of each person. According to this measurement result, when the person hu2 of the height of 1.28 (m) raises his/her hand between times t21 and t24, the maximum value of the human data height becomes 1.82 (m).

A measurement result in which a difference between the maximum value of the third period and the average value of the second period is 54 (cm) is not realistic when a human physique is considered.

Thus, in the present embodiment, during the second period, the situation estimation unit 220 calculates an average value of human data heights for each person. In the example of the person hu2, in FIG. 13, a broken line g221 indicates an average value of the human data heights of time series in the second period of the person hu2. Also, an arrow g222 is an upper-limit value which is a predetermined value for determining the hand raising, for example, 20 (cm). Also, a broken line g223 indicates an upper-limit value (hereinafter, referred to as an upper-limit threshold value) for determining the hand raising of the person hu2. Further, because a range indicated by an arrow g224 is greater than the upper-limit threshold value, the range is a range of a human data height which is not obtained when the person hu2 raises his/her hand.

Also, the upper-limit value is a value which is greater than a predetermined value (for example, 10 (cm)) for calculating the hand-raising threshold value. The upper-limit value may be set according to a human height. For example, the human height and the upper-limit value may be associated and stored in the storage unit 230.

Also, even in the present embodiment, the maximum value of the human data height during the second period may be regarded to be the human height.

In the example of FIG. 13, the situation estimation unit 220 adopts only human data heights which are less than or equal to the upper-limit threshold value from human data heights of the person hu2 during the third period. Further, the situation estimation unit 220 estimates that the person hu2 raises his/her hand when height information of the human data heights less than or equal to the upper-limit threshold value as the human data height of the person hu2 exceeds the hand-raising threshold value.

Figure 14:
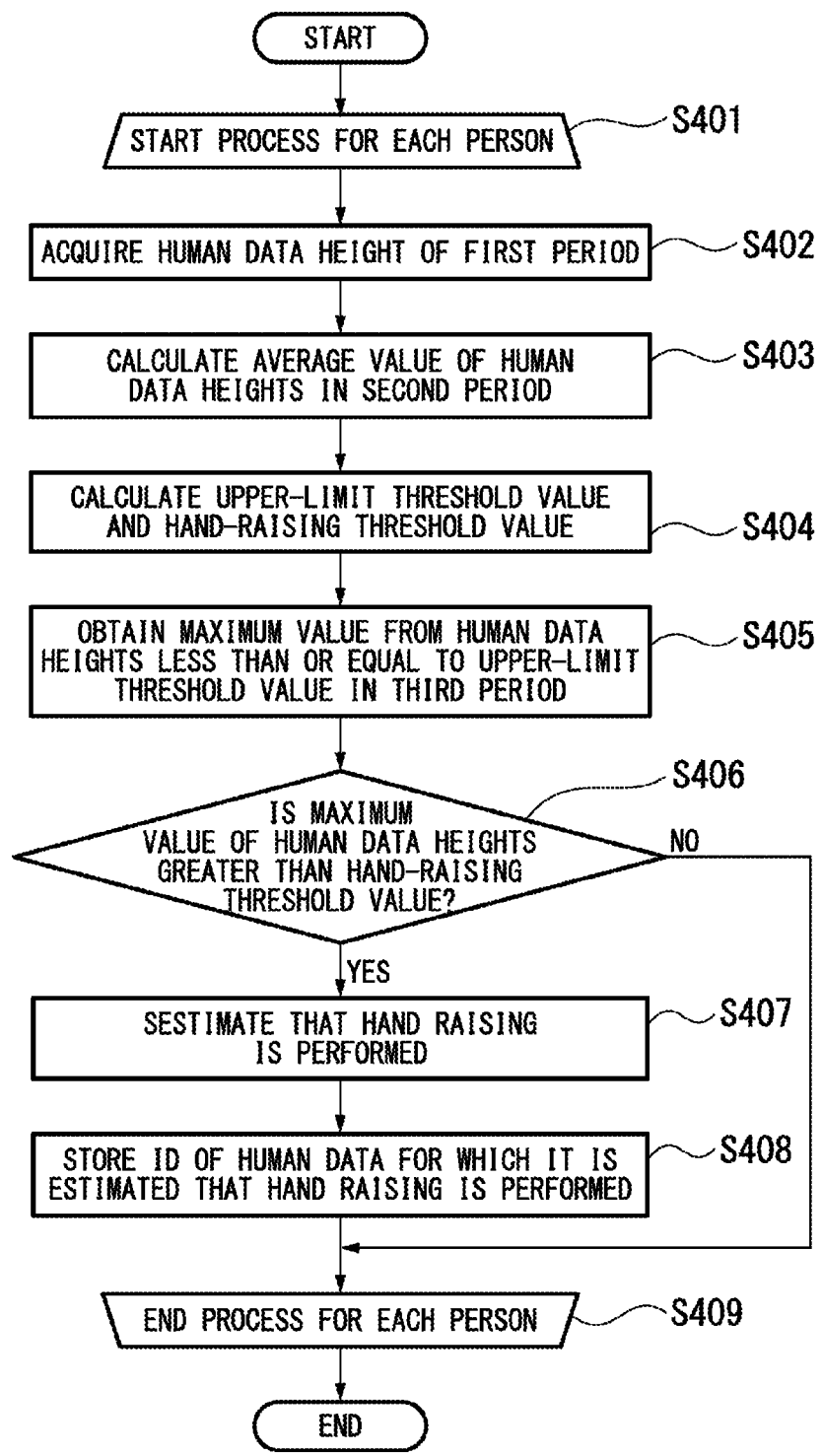
FIG. 14 is a flowchart of a processing procedure which is performed by a histogram processing unit according to a second embodiment.

FIG. 14 is a flowchart of a processing procedure which is performed by the histogram processing unit 221 according to the present embodiment.

(Step S401) The histogram processing unit 221 performs the processes of steps S404 to S408 for each person.

(Step S402) The histogram processing unit 221 acquires a human data height of the first period.

(Step S403) The histogram processing unit 221 calculates an average value of human data heights in the second period.

(Step S404) The histogram processing unit 221 calculates the upper-limit threshold value and the hand-raising threshold value. Also, the upper-limit threshold value is obtained by adding the upper-limit value to the average value calculated in step S403.

(Step S405) The histogram processing unit 221 obtains a maximum value of human data heights less than or equal to the upper-limit threshold value in the third period.

(Step S406) The histogram processing unit 221 determines whether the maximum value of the human data heights obtained in step S405 is greater than the hand-raising threshold value. The histogram processing unit 221 moves the process to step S407 when it is determined that the maximum value of the human data heights is greater than the hand-raising threshold value (step S406; YES). The histogram processing unit 221 moves the process to step S409 when it is determined that the maximum value of the human data heights is not greater than the hand-raising threshold value (step S406; NO).

(Step S407) The histogram processing unit 221 estimates that the hand raising is performed for a person for whom it is determined that the maximum value of the human data heights is greater than the hand-raising threshold value.

(Step S408) The histogram processing unit 221 causes the storage unit 230 to store an ID of human data for which it is estimated that hand raising is performed in step S407.

(Step S409) The histogram processing unit 221 ends the process when the processes of steps S405 to S408 for all persons end.

Also, the histogram processing unit 221 iteratively performs the above-described process whenever the first period, the second period, and the third period occur.

Also, although an example in which the histogram processing unit 221 performs the processes of steps S401 to S409 in the above-described example has been described in the above-described example, the situation estimation unit 220 may perform the processes.

For example, when two persons are adjacent to each other, a raised hand may be placed above an adjacent person if a person raising his/her hand does not raise his/her hand immediately above himself/herself as described using FIG. 12. In this case, in the conventional technology, as described using FIGS. 12 and 13, a measurement value of the height of the person raising his/her hand may be measured as a measurement value of the height of the other person. In this case, in the conventional technology, it is erroneously determined that the person not raising his/her hand has raised his/her hand. On the other hand, according to the present embodiment, it is possible to reduce the erroneous detection of the hand raising only when there is a height difference between two persons close to each other even when a raised hand is placed above the other person because the upper-limit threshold value and the height information are compared.

As described above, in the operation estimation apparatus (for example, the operation estimation apparatus 20) of the present embodiment, the second period is a period set by prompting the person to end the hand raising, and the situation estimation unit (for example, the situation estimation unit 220) calculates an upper-limit threshold value for determining the hand raising on the basis of the height information for each piece of human data in the second period, extracts human data for which the number of times that the height information greater than the hand-raising threshold value and less than the upper-limit threshold value is measured is greater than the predetermined number of times in a third period in which the person performs the hand raising, and estimates the reaction of the person corresponding to the extracted human data.

Through this configuration, the operation estimation apparatus 20 of the present embodiment calculates the upper-limit threshold value of height information for each person by adding the upper-limit value to the average value of the height information of the second period. In the present embodiment, an erroneous determination in which hand raising is determined to be performed when no hand raising is performed is prevented by excluding a measurement value of the height exceeding the upper-limit threshold value calculated from the measurement result of the height information for each person in the third period. As a result, according to the present embodiment, it is possible to reduce the erroneous detection of hand raising even when a hand is placed above the other person by the hand raising.

Also, according to the present embodiment, it is possible to reduce the erroneous detection of the hand raising even when the top of the head, the face, or the like of one person is placed above the other person when a parent and a child between whom there is a height difference, etc. are close to each other.

Example in which First Embodiment is Applied to Second Embodiment

Also, the technique of the first embodiment may be applied to a technique of the present embodiment. Hereinafter, the example in which the technique of the first embodiment may be applied to the technique of the present embodiment will be described.

The situation estimation unit 220 may be configured to estimate whether the person performs his/her hand on the basis of the number of human data heights exceeding the hand-raising threshold value. In this case, the situation estimation unit 220 may count the number of times that the height information in which the human data height is less than the upper-limit threshold value is greater than the hand-raising threshold value, for example, according to the technique described in the second embodiment. The situation estimation unit 220 may be configured to use the technique of the first embodiment in which it is determined that hand raising is performed when the counted value is greater than or equal to a predetermined determination threshold value.

Third Embodiment

In the present embodiment, an example in which the clustering unit performs a clustering process using a technique of hierarchical clustering will be described.

Figure 15:
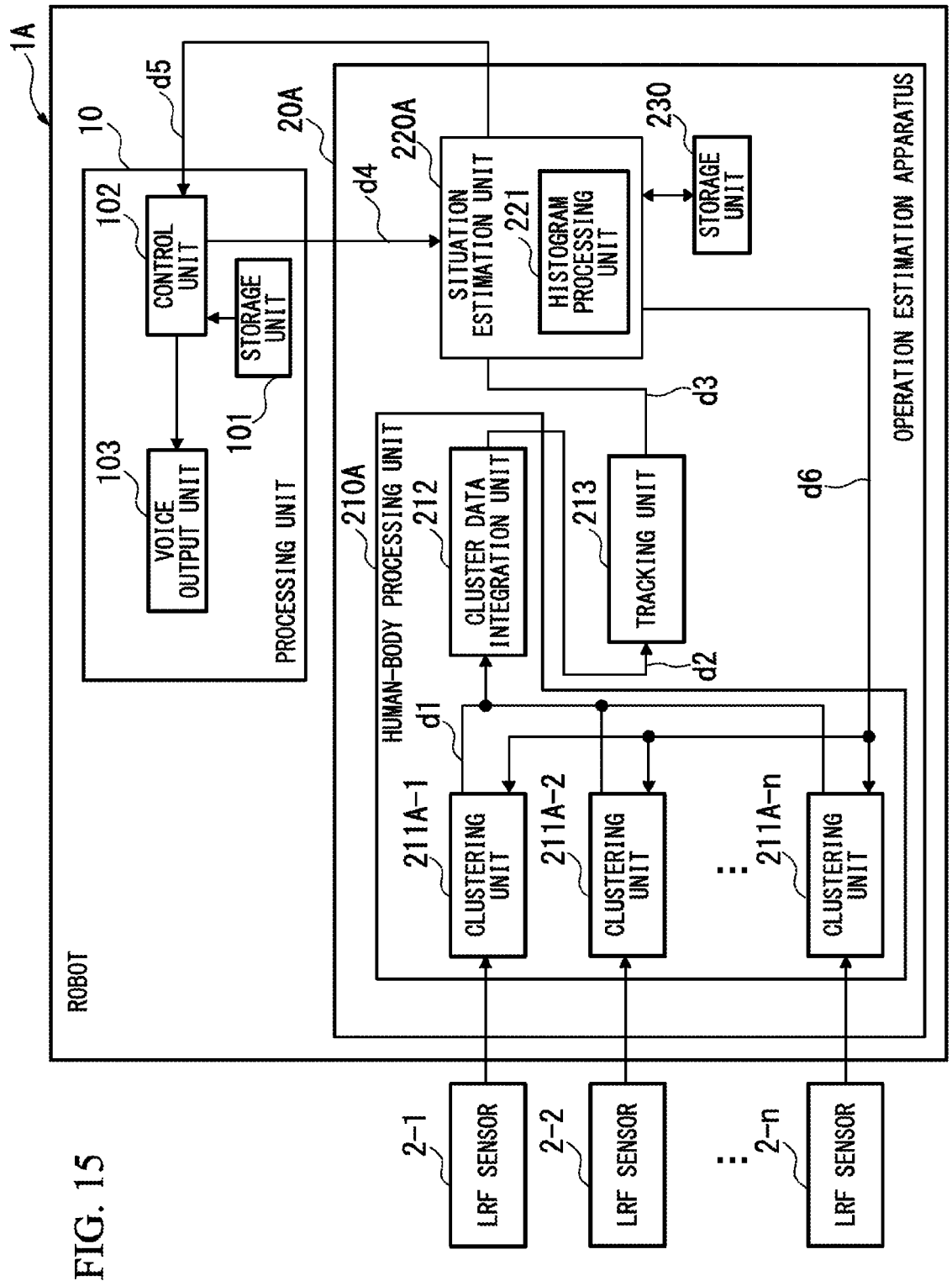
FIG. 15 is a schematic block diagram of a robot according to a third embodiment.

FIG. 15 is a schematic block diagram of a robot 1A according to the present embodiment.

As illustrated in FIG. 15, the robot 1A is configured to include a processing unit 10 and an operation estimation apparatus 20A. The robot 1A is connected to n (n is an integer greater than or equal to 1) LRF sensors 2-1 to 2-$n$ (distance measurement units) wirelessly or by wire. Also, the configuration of the processing unit 10 is the same as the configuration of FIG. 1 of the first embodiment. Also, functional units having functions similar to those of the robot 1 (FIG. 1) are assigned the same reference signs and description thereof will be omitted.

The operation estimation apparatus 20A includes a human-body processing unit 210A, a tracking unit 213, a situation estimation unit 220A, and a storage unit 230. The human-body processing unit 210A includes n clustering units 211A-1 to 211A-n, and a cluster data integration unit 212. Also, the situation estimation unit 220A includes a histogram processing unit 221. When none of the clustering units 211A-1 to 211A-n are specified, the clustering units 211A-1 to 211A-n are referred to as a clustering unit 211A.

The clustering unit 211A classifies ranging points as a cluster, for example, in each predetermined cycle, using a detection result input from the LRF sensor 2. The clustering unit 211A calculates a center of gravity for each classified cluster and designates the calculated center of gravity as a human cluster position. The clustering unit 211A extracts a maximum value of heights for each classified cluster and designates the extracted maximum value as a human cluster data height. The clustering unit 211A generates human cluster data d1 by associating the human cluster data position with the human cluster data height for each cluster and outputs the generated human cluster data d1 to the cluster data integration unit 212.

The clustering unit 211A obtains a distance (similarity) between clusters using a Ward method in the clustering process. Here, the Ward method is a technique of performing merging so that a sum of squares of distances from values within the cluster to a center of the cluster is minimized. Further, the clustering unit 211A selects a threshold value of the Ward method according to a preset region. Alternatively, the clustering unit 211A selects a threshold value of the Ward method for each region on the basis of region information input from the situation estimation unit 220A. Here, the region is a grid-like region with predetermined equal intervals. Also, the region may be a region of a first row, a center, a rear, or the like. Also, as the size of the grid, each of the length and width is, for example, 50 cm.

The tracking unit 213 performs a similar process to the operation estimation apparatus 20.

The situation estimation unit 220A estimates a density of spectators for each region using the human data d3 input from the tracking unit 213. The situation estimation unit 220A calculates an area of the cluster corresponding to each person during a tracking period and changes in an area of the tracked cluster after the tracking unit 213 tracks the person, for example, for a predetermined time. The situation estimation unit 220A estimates that the spectators are crowded when an area of a unit cluster is greater than a predetermined value. Alternatively, the situation estimation unit 220A estimates that the spectators are crowded when the change in the area is greater than a predetermined ratio or a difference as in a region indicated by reference sign g421 of the diagram indicated by reference sign g420 from a region indicated by reference sign g411 in the diagram indicated by reference sign g410 of FIG. 17 to be described below. Alternatively, the situation estimation unit 220A may be configured to determine a density from a distance between human data obtained using a conventional technique. The situation estimation unit 220A outputs region information d6 indicating an estimated state of spectators to the clustering unit 211A.

Example of Process of Third Embodiment

Figure 16:
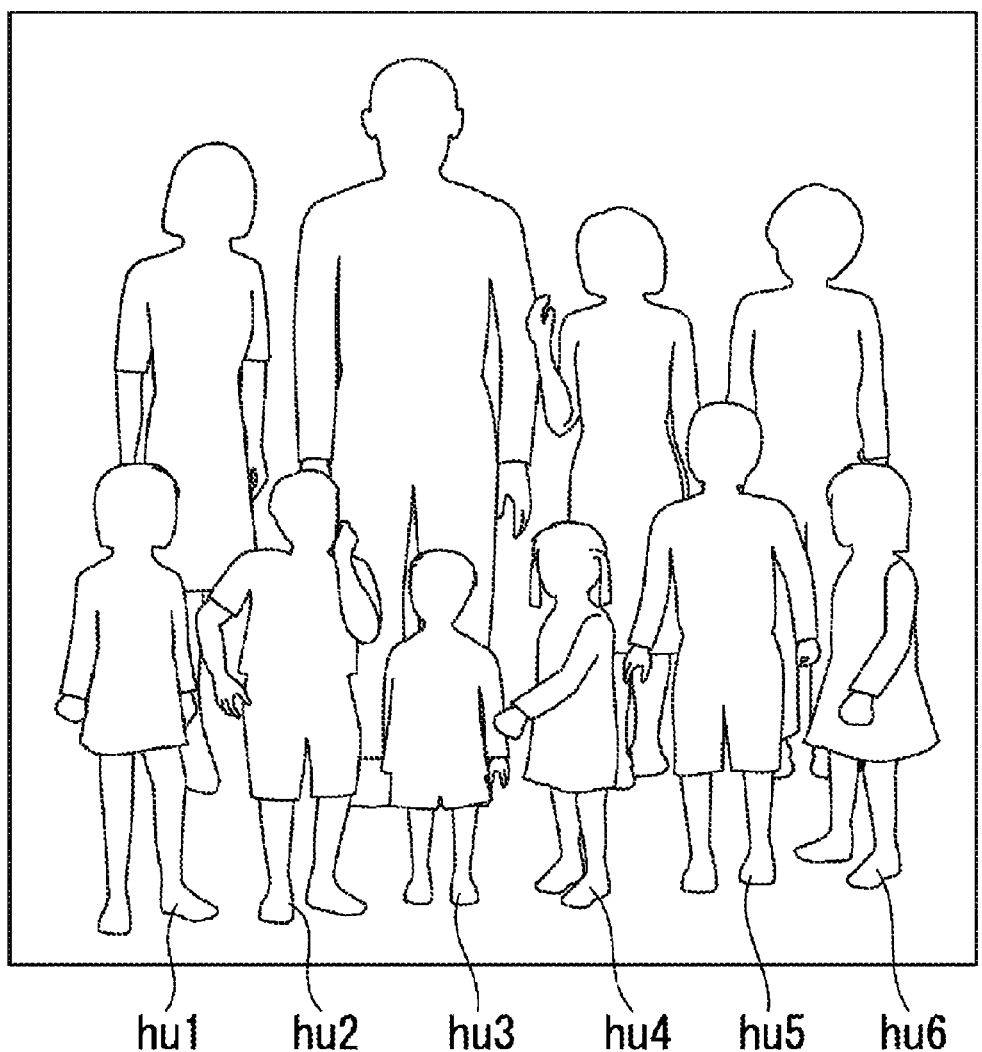
FIG. 16 is an image diagram of an image captured in an actual venue.

Reference sign g401 of FIG. 16 indicates a diagram for describing a state of spectators in a first row of a venue. Also, FIG. 16 is an image diagram of an image captured in an actual venue. In the example illustrated in FIG. 16, persons hu1 to hu6 are in the first row. Also, in the example illustrated in FIG. 16, the persons hu1 to hu6 are children.

As in the example illustrated in FIG. 16, children like persons hu1 to hu6 are in a region close to the stage, that is, the first row, in many cases. Also, as in the example illustrated in FIG. 16, adults are in second and subsequent rows in many cases. As described above, in the present embodiment, the venue is divided into some regions on the basis of an experimental rule and the clustering unit 211A selects a threshold value of a Ward method proper for each division region.

Figure 17:
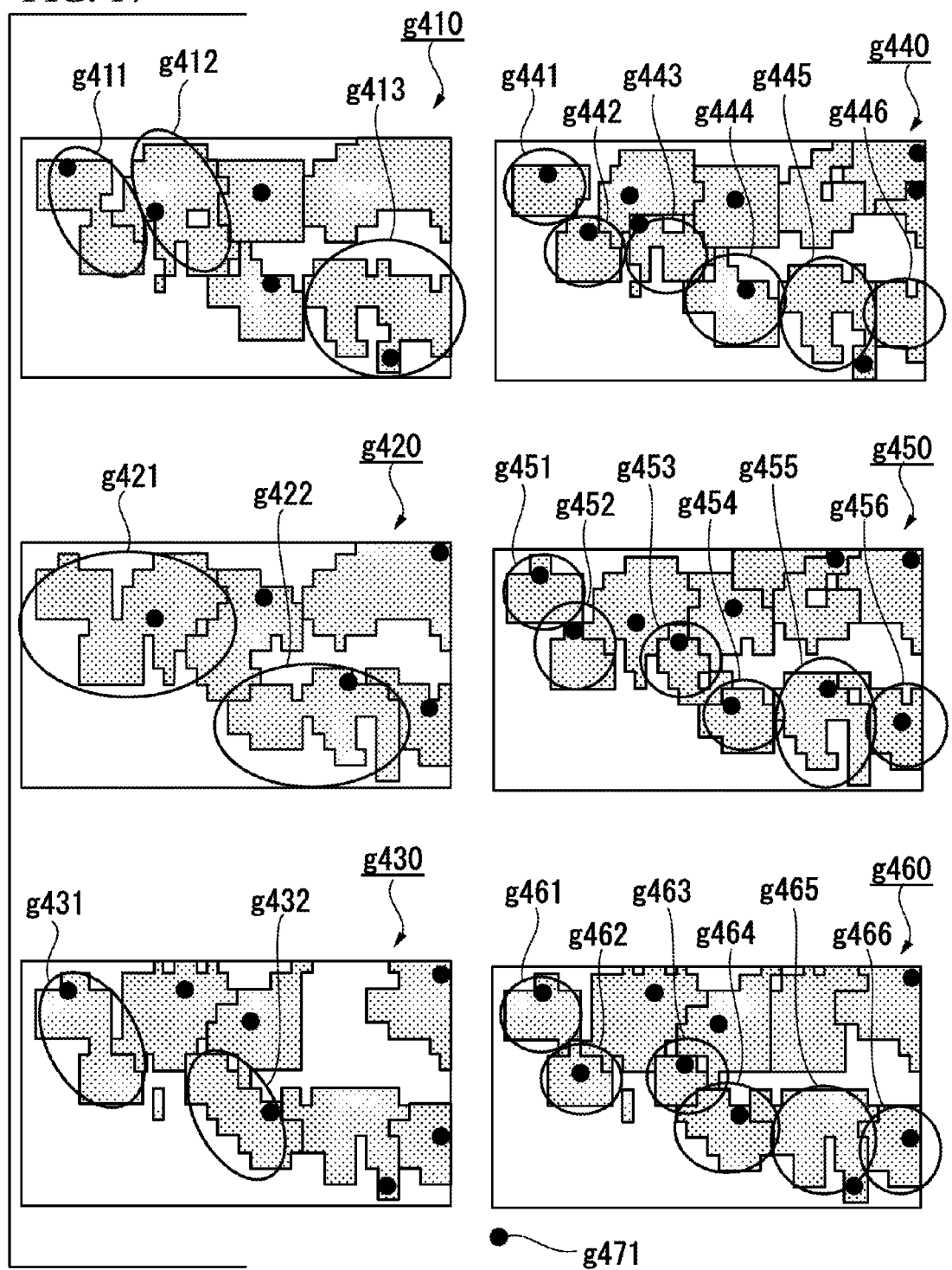
FIG. 17 is a diagram for describing an example of a tracking result of performing a clustering process on regions illustrated in FIG. 16 using different threshold values of a Ward method.

FIG. 17 is a diagram for describing an example of a tracking result of performing a clustering process on regions illustrated in FIG. 16 using different threshold values of a Ward method.

In FIG. 17, diagrams indicated by reference signs g410, g420, and g430 are results of performing a clustering process in which a threshold value of a Ward method is 2.0 ($m^2$). The diagram indicated by reference sign g410 is a diagram at time t31, the diagram indicated by reference sign g420 is a diagram at time t32 which is a time after time t31, and the diagram indicated by reference sign g430 is a diagram at time t33 which is a time after time t32.

Also, diagrams indicated by reference signs g440, g450, and g460 are results of performing a clustering process in which the threshold value of the Ward method is 0.6 ($m^2$). The diagram indicated by reference sign g440 is a diagram at time t31, the diagram indicated by reference sign g450 is a diagram at time t32, and the diagram indicated by reference sign g460 is a diagram at time t33.

Also, in FIG. 17, a point g471 indicates a position of a maximum value of the z-axis direction of each cluster.

First, the result of performing the clustering process in which the threshold value of the Ward method is 2.0 (m$^2$) will be described.

In the diagram indicated by reference sign g410, at time t31, in the region indicated by reference sign g411, the clusters of the person hu1 and the person hu2 illustrated in FIG. 16 are not separable. Also, in the region indicated by reference sign g412, the clusters of the person hu3 illustrated in FIG. 16 and a person behind the person hu3 are not separable.

Further, in the region indicated by reference sign g413, the clusters of the person hu5 and the person hu6 illustrated in FIG. 16 are not separable. Thus, in the example of the diagram illustrated in reference sign g410, it is not possible to correctly perform human tracking.

In the diagram indicated by reference sign g420, at time t32, in a region indicated by reference sign g421, clusters of the persons hu1, hu2, and hu3 and a person behind the person hu3 illustrated in FIG. 16 are not separable. Also, in the region indicated by reference sign g422, the clusters of the persons hu4 and hu5 illustrated in FIG. 16 are not separable. In this manner, in the example of the diagram indicated by reference sign g420, the separation of the clusters fails. Thus, in the example of the diagram indicated by reference sign g420, it is not possible to correctly perform human tracking.

In the diagram indicated by reference sign g430, at time t33, in the region indicated by reference sign g431, the clusters of the persons hu1 and hu2 illustrated in FIG. 16 are not separable. Further, in the region indicated by reference sign g432, the clusters of the persons hu3 and hu4 illustrated in FIG. 16 are not separable. In this manner, in the example of the diagram indicated by reference sign g430, the separation of the clusters fails. Thus, in the example of the diagram indicated by reference sign g430, it is not possible to correctly perform human tracking.

Next, the result of performing the clustering process in which the threshold value of the Ward method is 0.6 (m$^2$) will be described.

In the diagram indicated by reference sign g440, at time t31, the region indicated by reference sign g441 is a cluster of the person hu1 illustrated in FIG. 16 and the region indicated by reference sign g442 is a cluster of the person hu2 illustrated in FIG. 16. Also, the region indicated by reference sign g443 is a cluster of the person hu3 illustrated in FIG. 16 and the region indicated by reference sign g444 is a cluster of the person hu4 illustrated in FIG. 16. Further, the region indicated by reference sign g445 is a cluster of the person hu5 illustrated in FIG. 16 and the region indicated by reference sign g446 is a cluster of the person hu6 illustrated in FIG. 16. In this manner, in the example of the diagram indicated by reference sign g440, the clusters of the persons hu1 to hu6 are appropriately separable. Thus, it is possible to correctly perform human tracking.

Even in the diagram indicated by reference sign g450, at time t32, it is possible to appropriately separate the clusters of the persons hu1 to hu6 as in the regions indicated by reference signs g451 to g456. In this manner, in the example of the diagram indicated by reference sign g450, the separation of the clusters succeeds and the human tracking can be correctly performed.

Even in the diagram indicated by reference sign g460, at time t33, it is possible to appropriately separate the clusters of the persons hu1 to hu6 as in the regions indicated by reference signs g461 to g466. In this manner, in the example of the diagram indicated by reference sign g460, the separation of the clusters succeeds and the human tracking can be correctly performed.

As described above, it is possible to reduce the failure of the clustering and the human tracking by appropriately selecting the threshold value of the Ward method for each region.

Next, an example in which the venue is divided into regions will be described.

(I) Dividing technique 1: the venue is divided into a plurality of regions on the basis of an experimental rule.

For example, as described above using FIG. 16, the venue is divided into a first row of the venue and the other region. Here, information related to dividing of a region is pre-stored in the clustering unit 211A. Also, the information related to the dividing of the region may be stored in the storage unit 230.

(II) Dividing technique 2: the venue is divided into a plurality of regions according to a value of a human height.

For example, as described in the second embodiment, the histogram processing unit 221 may estimate the value of the human height for each piece of human data in the second period and divide the venue into the plurality of regions on the basis of the estimated value of the human height.

(III) Dividing technique 3: the region is divided into a plurality of divisions according to a state of the region.

As described above, the situation estimation unit 220A divides the region according to a state such as a human density in the region.

In this manner, in the operation estimation apparatus (for example, the operation estimation apparatus 20A) of the present embodiment, the human-body processing unit (for example, the clustering unit 211A and the clustering integration unit 212) may divide each of a plurality of predetermined ranges into two or more regions, select a threshold value of a distribution of distances at which the person is detected on the basis of human physique data for each division region, and detect the person on the basis of the distribution of the distances which are measured.

Also, in the operation estimation apparatus (for example, the operation estimation apparatus 20A) of the present embodiment, the human-body processing unit (for example, the human-body processing unit 210A) may select physique data of a child as the human physique data for a region close to a robot (for example, the robot 1A) which outputs a signal indicating a prompt for the person to start or end the hand raising for each division region.

Through this configuration, in the present embodiment, for example, according to each region such as a region in which children are crowded or a region in which adults are crowded, it is possible to select an appropriate threshold value of the Ward method. As a result, according to the present embodiment, it is possible to reduce erroneous integration of the clusters and further reduce the failure of tracking for each person.

Also, although an example in which 0.6 (m$^2$) and 2.0 (m$^2$) are used as examples of the threshold value of the Ward method has been described in the present embodiment, the preset invention is not limited thereto. The threshold values of the Ward method may be selected on the basis of physique data containing a gender, an age, a country, and a region. These threshold values may be pre-stored in the clustering unit 211A or the storage unit 230. Also, although an example in which the threshold value of the Ward method is selected has been described in the present embodiment, a threshold value of another technique having the threshold value may be selected in the clustering process.

Also, even in the present embodiment, the histogram processing unit 221 may use at least one of a technique using a histogram described in the first embodiment and a technique of setting a threshold value for determining a height of hand raising described in the second embodiment.

Thereby, it is possible to reduce an erroneous determination of hand raising even when persons adjacent to each other are close or a raised hand is placed above another person when there is a person having a height difference behind or beside the child.

Fourth Embodiment

In the first to third embodiments, an example in which each of the plurality of clustering units 211 (or 211A) generates the human cluster data by performing the clustering process and the cluster data integration unit 212 integrates the generated human cluster data has been described. In the present embodiment, an example in which the detection result input from the LRF sensor 2 is first integrated and the clustering process (human detection) is performed on the integrated information will be described.

Figure 18:
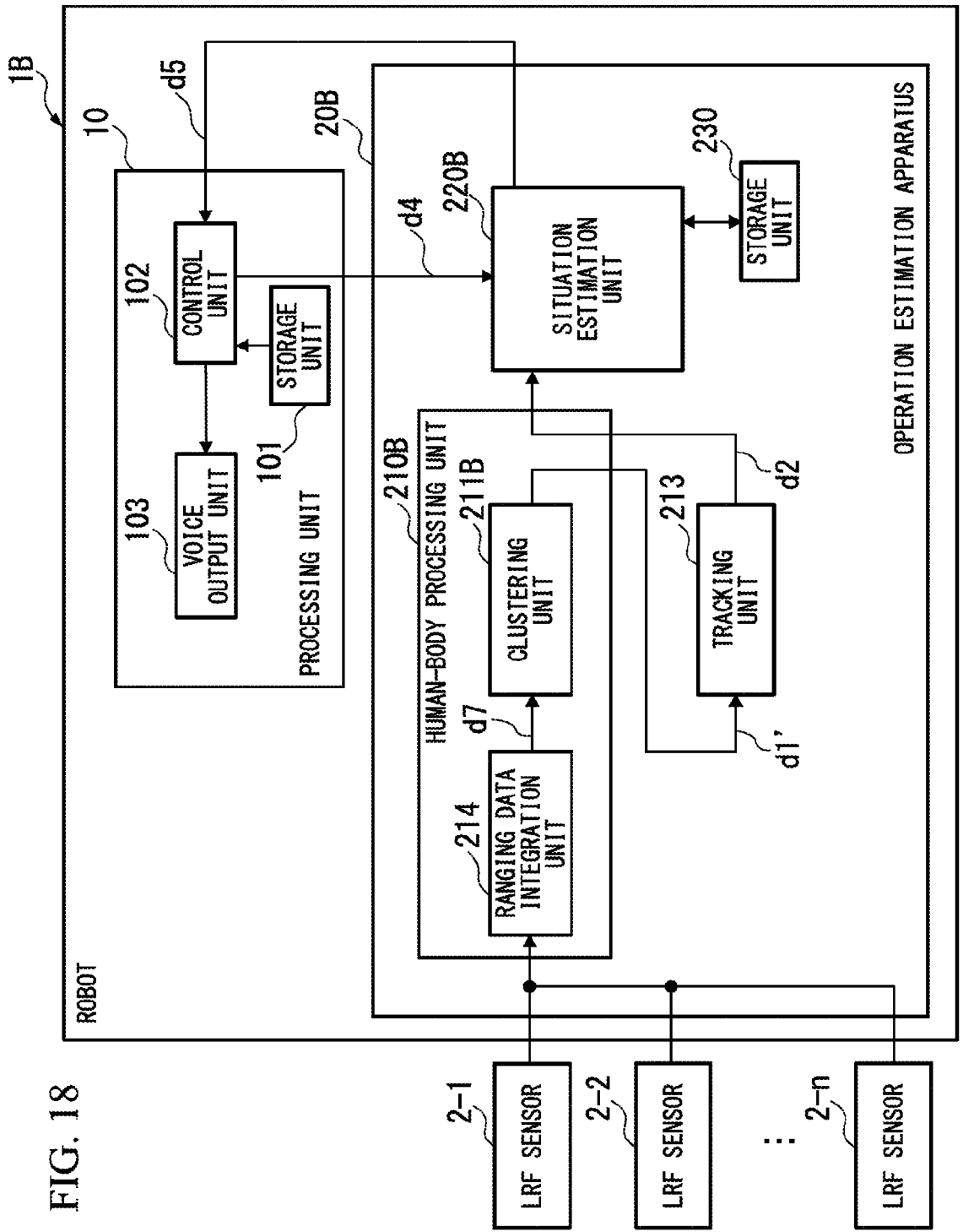
FIG. 18 is a schematic block diagram of a robot according to a fourth embodiment.

FIG. 18 is a schematic block diagram of a robot 1B according to the present embodiment.

As illustrated in FIG. 18, the robot 1B is configured to include a processing unit 10 and an operation estimation apparatus 20B. The robot 1B is connected to n (n is an integer greater than or equal to 1) LRF sensors 2-1 to 2-n (distance measurement units) wirelessly or by wire. Also, the configuration of the processing unit 10 is the same as the configuration of FIG. 1 of the first embodiment. Also, functional units having functions similar to those of the robot 1 (FIG. 1) are assigned the same reference signs and description thereof will be omitted.

The operation estimation apparatus 20B includes a human-body processing unit 210B, a tracking unit 213, a situation estimation unit 220B, and a storage unit 230. The human-body processing unit 210B includes a ranging data integration unit 214 and a clustering unit 211B.

The ranging data integration unit 214 integrates ranging values input from the n LRF sensors 2 and outputs integrated integration information d7 to the clustering unit 211B. The integration information d7 is integration information obtained by integrating information of a ranging point at which the entire venue serving as a measurement target is designated as one region.

The clustering unit 211B classifies the integration information d7 input from the ranging data integration unit 214 at the ranging point, for example, for each predetermined cycle. The clustering unit 211B calculates a center of gravity of each classified cluster and designates the calculated center of gravity as a human cluster data position. The clustering unit 211B extracts a maximum value of heights of ranging points included in the cluster for each classified cluster and designates the extracted maximum value as a human cluster data height. The clustering unit 211B generates cluster-specific human cluster data d1' in which the human cluster data position and the human cluster data height are associated and outputs the generated cluster-specific human cluster data d1' to the tracking unit 213.

The cluster-specific human cluster data d1' in which the human cluster data position and the human cluster data height are associated is input to the tracking unit 213. For each piece of input human cluster data, the tracking unit 213 performs the tracking process at each predetermined time interval in time series. The tracking unit 213 generates human data d2 by associating an ID obtained as a result of performing the tracking process with the human data position and the human data height for each person. The tracking unit 213 outputs the generated person-specific human data d2 to the situation estimation unit 220B. Also, the same ID is assigned to the same person in time series as a result of performing the tracking process and therefore information indicating human movement is obtained. Also, the tracking unit 213 deletes human data corresponding to an ID for which tracking is impossible when the person cannot be tracked due to movement out of a measurement range of the LRF sensor 2.

The situation estimation unit 220B detects a maximum value of the z-axis direction of a hand-raising period (third period) (FIG. 5) using the human data d2 input from the tracking unit 213. The situation estimation unit 220B calculates an average value of the z-axis direction of the hand-lowering period (second period) (FIG. 5) using the human data d2. The situation estimation unit 220B calculates a difference between the detected maximum value of the third period and the calculated average value of the second period and estimates whether hand raising is performed for each person on the basis of whether the calculated difference is greater than or equal to a hand-raising threshold value.

Also, the situation estimation unit 220B performs the above-described estimation a predetermined number of times according to a trigger signal d4 and finds a majority decision by estimating when the number of persons raising their hands is largest. The situation estimation unit 220B outputs a majority decision result as information d5 indicating a detection result to the processing unit 10.

Figure 19:
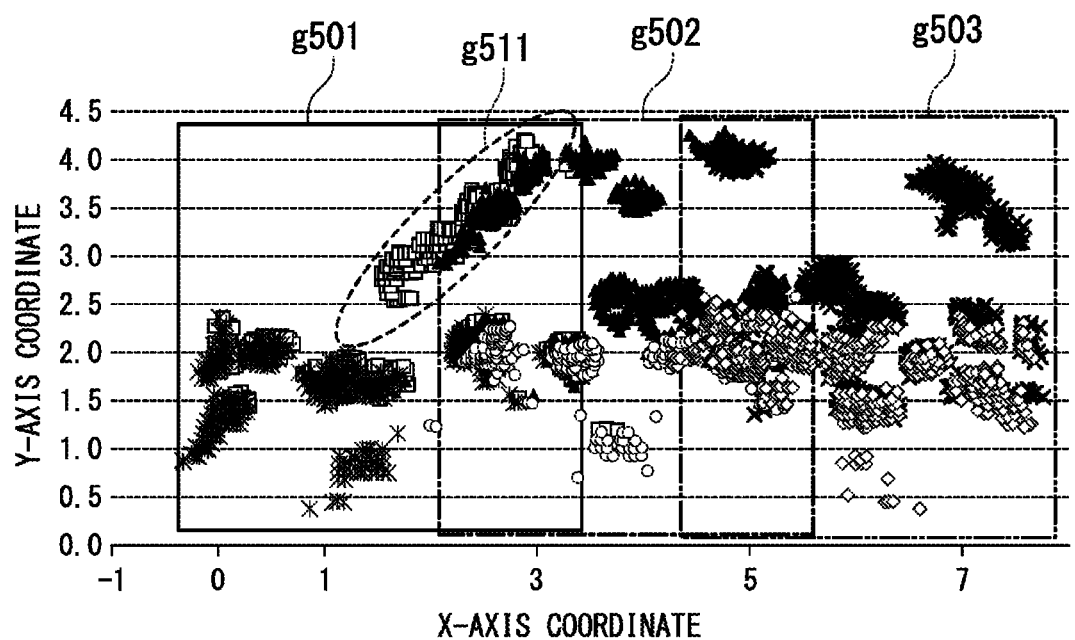
FIG. 19 is a diagram for describing measurement ranges and ranging points of laser range finder (LRF) sensors.

FIG. 19 is a diagram for describing measurement ranges and ranging points of LRF sensors 2. Also, an example illustrated in FIG. 19 is an example in which the entire venue is measured using three LRF sensors 2-1 to 2-3. In the example illustrated in FIG. 19, a size of a region which is measured by one LRF sensor 2 is about 4 (m)×4 (m). In FIG. 19, the horizontal axis represents an x-axis coordinate and the vertical axis represents a y-axis coordinate. A region indicated by reference sign g501 is a region measured by the LRF sensor 2-1 and a region indicated by reference sign g502 is a region measured by the LRF sensor 2-2. Also, a region indicated by reference sign g503 is a region measured by the LRF sensor 2-3.

A region in which the region indicated by reference sign g501 and the region indicated by reference sign g502 overlap is included in a region in which a broken-line ellipse g511 is shown. Ranging points are sparse in the periphery of a region capable of being measured by the LRF sensor 2. Because ranging light is radiated to a person obliquely from above, one LRF sensor 2 can measure some ranging points, for example, only ranging points of one side of the body among ranging points for one person, as in a region indicated by reference sign g511 in the periphery of a region capable of being measured by the LRF sensor 2. For these reasons, human cluster data deviated from an actual position of a person may be generated when the clustering process is performed for each LRF sensor 2.

When the cluster data integration unit 212 (FIG. 1) integrates the above-described created human cluster data and the tracking unit 213 (FIG. 1) performs tracking using the integrated and generated human data, the tracking may fail. When the tracking fails, for example, another ID may be erroneously assigned to human data recognized with ID1.

Figure 20:
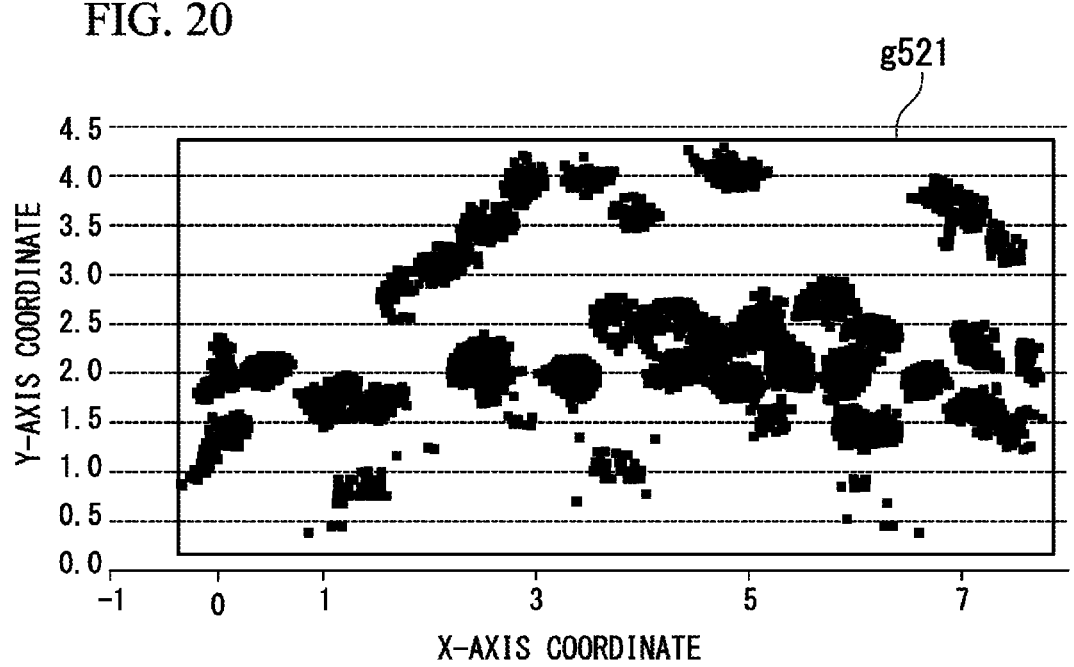
FIG. 20 is a diagram for describing an example in which ranging points of a plurality of LRF sensors are integrated according to the fourth embodiment.

FIG. 20 is a diagram for describing an example in which ranging points of a plurality of LRF sensors 2 are integrated according to the present embodiment. In FIG. 20, the horizontal axis represents an x-axis coordinate and the vertical axis represents a y-axis coordinate.

A region indicated by reference sign g521 is a region in which measurement results of the LRF sensors 2-1 to 2-3 are integrated.

In the present embodiment, as illustrated in FIG. 20, a clustering process is performed using measurement results of all LRF sensors 2 after the measurement results of the plurality of LRF sensors 2 are integrated.

Figure 21:
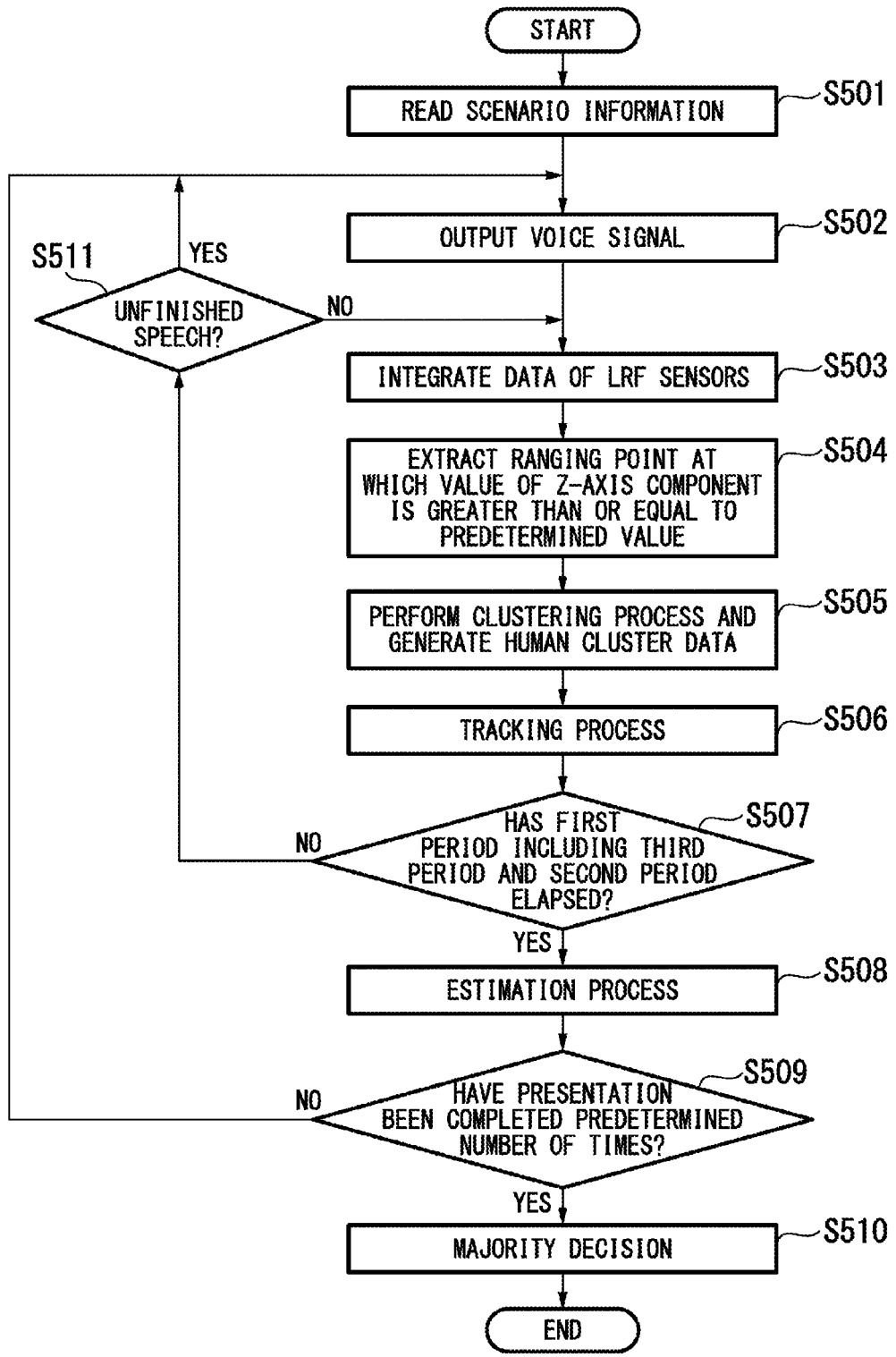
FIG. 21 is a flowchart of a processing procedure of hand-raising detection by the robot according to the fourth embodiment.

FIG. 21 is a flowchart of a processing procedure of hand-raising detection by the robot 1B according to the present embodiment.

(Steps S501 and S502) The control unit 102 performs processes of steps S501 and S502 similar to the processes of steps S301 and S302 (FIG. 11). After the processes, the control unit 102 moves the process to step S503.

(Step S503) The ranging data integration unit 214 integrates ranging values input from the n LRF sensors 2 and outputs integrated integration information d7 to the clustering unit 211B. The ranging data integration unit 214 moves the process to step S504.

(Step S504) In the clustering process, the clustering unit 211B extracts a ranging point at which a value of a z-axis component is greater than or equal to a predetermined value from among the integration information d7 input from the ranging data integration unit 214. The clustering unit 211B moves the process to step S505.

(Step S505) The clustering unit 211B generates human cluster data d1' for each person by performing the clustering process of classifying the ranging point extracted in step S504, for example, in each predetermined cycle. Next, the clustering unit 211B outputs the generated human cluster data d1' to the tracking unit 213. The clustering unit 211B moves the process to step S506.

(Step S506) The tracking unit 213 performs a tracking process at each predetermined time interval for each piece of human cluster data using information d1' input from the clustering unit 211B. The tracking unit 213 first assigns an ID to each piece of input human cluster data. Next, the tracking unit 213 assigns the same ID as that first assigned to human cluster data regarded to be that of the same person as a result of performing the tracking process. Next, the tracking unit 213 generates human data d2 by associating an ID obtained as a result of performing the tracking process in time series with the position information and the height information for each person. The tracking unit 213 moves the process to step S507.

(Step S507) The situation estimation unit 220B determines whether the first period including the third period (FIG. 5) and the second period (FIG. 5) has elapsed. The situation estimation unit 220B proceeds to step S508 when it is determined that the first period including the third period and the second period has elapsed (step S507; YES), and proceeds to the process of step S511 when it is determined that the first period including the third period and the second period has not elapsed (step S507; NO).

(Step S511) The situation estimation unit 220B determines whether or not the speech has not been finished.

The situation estimation unit 220B returns to step S502 when it is determined that the speech has not been finished (step S511; YES) and returns to step S503 when it is determined that the speech is finished (step S511; NO).

(Step S508) The situation estimation unit 220B detects a maximum value of human data heights of the third period. Next, the situation estimation unit 220B calculates an average value of human data heights of the second period. Next, the situation estimation unit 220B calculates a difference between the detected maximum value of the third period and the calculated average value of the second period and estimates that hand raising is performed when the calculated difference is greater than or equal to a hand-raising threshold value. Also, the situation estimation unit 220B estimates that no hand raising is performed when the calculated difference is less than the hand-raising threshold value.

(Step S509) The situation estimation unit 220B determines whether question presentation has been completed a predetermined number of times on the basis of scenario information. The situation estimation unit 220B proceeds to step S510 when it is determined that the question presentation has been completed a predetermined number of times (step S509; YES) and returns to step S502 when it is determined that the question presentation has not been completed a predetermined number of times (step S509; NO).

(Step S510) The situation estimation unit 220B finds a majority decision on the basis of an estimation result for each question estimated in step S508 after a predetermined question is presented a predetermined number of times on the basis of the scenario information. The situation estimation unit 220B performs a comparison with the number of persons raising their hands for each question estimated in step S508 and selects a question for which the number of persons is largest.

The process of hand-raising detection ends.

Also, although an example in which the situation estimation unit 220B estimates that hand raising is performed when a difference between human data heights of the third period and the second period is greater than or equal to the hand-raising threshold value has been described in the present embodiment, the present invention is not limited thereto. For example, the situation estimation unit 220B includes a histogram processing unit 221 similar to that of the first embodiment and may be configured to perform histogram processing on human data.

As described above, in the operation estimation apparatus (for example, the operation estimation apparatus 20B) of the present embodiment, the distance measurement unit (for example, the LRF sensor 2) includes: a plurality of distance measurement units (for example, the LRF sensors 2-1 to 2-$n$) configured to measure distances for different predetermined ranges, the human-body processing unit (for example, human-body processing unit 201B) includes: a ranging data integration unit (for example, the ranging data integration unit 214) configured to integrate the distances measured by the plurality of distance measurement units for two or more predetermined ranges; and a clustering unit (for example, the clustering unit 211B) configured to classify the measured distances as a cluster on the basis of a result of integration by the ranging data integration unit and detect the person on the basis of the classified cluster, and the tracking unit assigns an identifier to each person detected by the clustering unit.

Through this configuration, in the present embodiment, it is possible to supplement a measurement result in the periphery of a region capable of being measured by each LRF sensor 2 using a measurement result of another LRF sensor 2.

Thereby, in the present embodiment, it is possible to improve the precision of the clustering process for the measurement result in the periphery of the region capable of being measured by the LRF sensor 2. Also, according to the present embodiment, it is possible to suppress the shift of the position of the cluster in the cluster data integration process because the clustering unit 211B performs the clustering process after ranging values are integrated by the ranging data integration unit 214.

As a result, according to the present embodiment, it is possible to reduce erroneous integration between persons adjacent to each other. Also, in the present embodiment, it is possible to reduce the generation of two clusters not correctly integrated for one person. In this manner, according to the present embodiment, it is possible to reduce an erroneous operation by the clustering process.

Also, even in the present embodiment, the situation estimation unit 220B includes the histogram processing unit 221 and the histogram processing unit 221 may use at least one of a technique using a histogram described in the first embodiment, a technique of setting an upper-limit threshold value for determining a height of hand raising described in the second embodiment, and a technique described in the third embodiment.

Thereby, it is possible to reduce an erroneous determination of hand raising even when adjacent persons between whom there is a height difference are close to each other or a raised hand is placed above another person such as when there is an adult behind or beside the child.

Fifth Embodiment

An example in which the clustering process is performed after measurement results of all the LRF sensors 2 are integrated has been described in the fourth embodiment. In the present embodiment, the measurement results are re-divided after the measurement results of all the LRF sensors 2 are integrated. An example in which the clustering process is performed on each re-divided data and the cluster data is re-integrated after the clustering process will be described.

Figure 22:
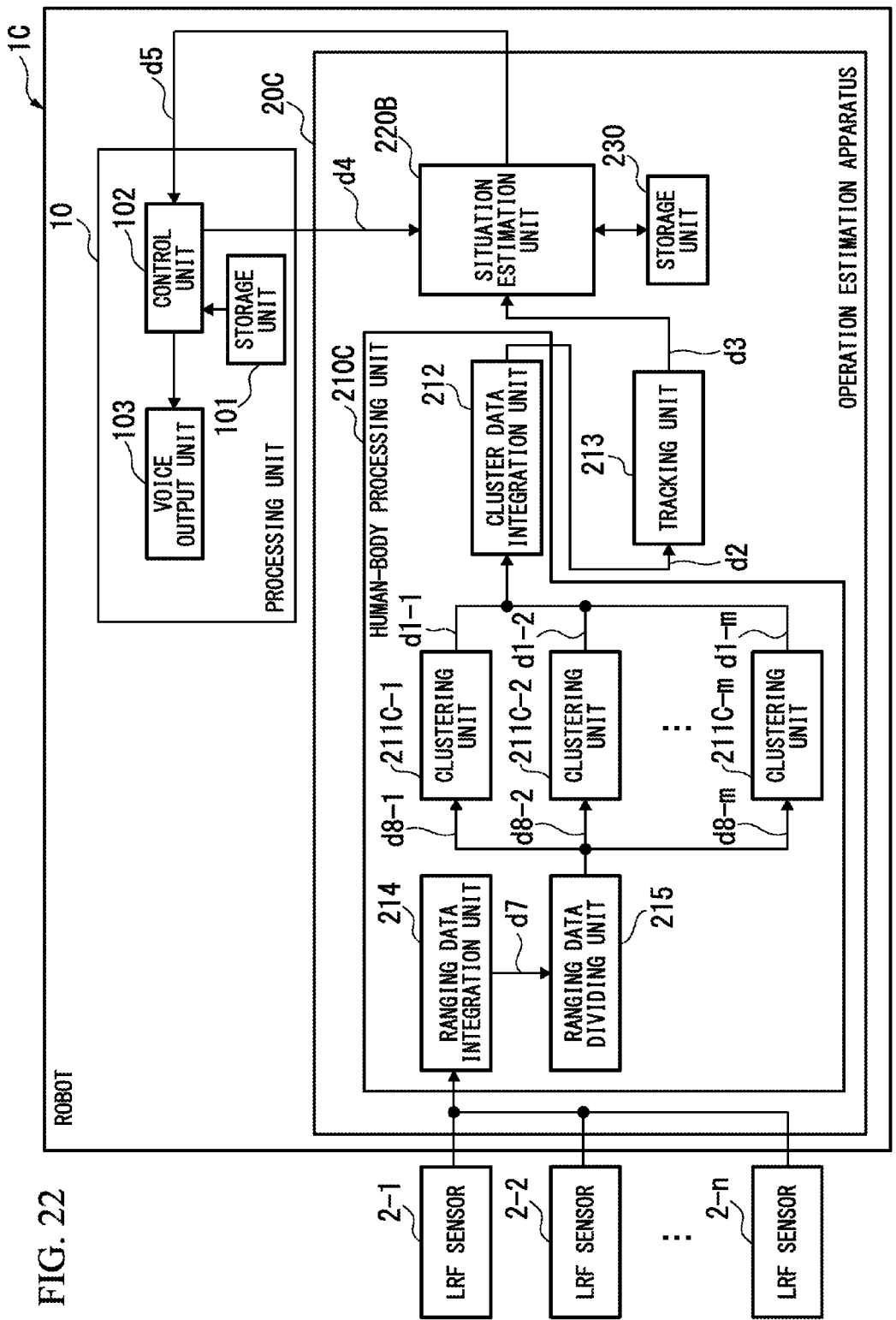
FIG. 22 is a schematic block diagram of a robot according to a fifth embodiment.

FIG. 22 is a schematic block diagram of a robot 1C according to the present embodiment.

As illustrated in FIG. 22, the robot 1C is configured to include a processing unit 10 and an operation estimation apparatus 20C. The robot 1C is connected to n (n is an integer greater than or equal to 1) LRF sensors 2-1 to 2-$n$ (distance measurement units) wirelessly or by wire. Also, the configuration of the processing unit 10 is the same as the configuration of FIG. 1 of the first embodiment. Also, functional units having functions similar to those of the robot 1 (FIG. 1) are assigned the same reference signs and description thereof will be omitted.

The operation estimation apparatus 20C includes a human-body processing unit 210C, a tracking unit 213, a situation estimation unit 220B, and a storage unit 230. The human-body processing unit 210C includes a ranging data integration unit 214, a ranging data dividing unit 215, clustering units 211C-1 to 211C-m (m is an integer greater than or equal to 1), and a cluster data integration unit 212. When none of the clustering units 211C-1 to 211C-m are specified, the clustering units 211C-1 to 211C-m are referred to as a clustering unit 211C.

The ranging data integration unit 214 integrates ranging values input from the n LRF sensors 2 and outputs integrated integration information d7 to the ranging data dividing unit 215.

The ranging data dividing unit 215 divides the integration information d7 input from the ranging data integration unit 214 into m (m is an integer greater than or equal to 1) regions each having a predetermined area. During the division, the ranging data dividing unit 215 may set the regions so that the regions overlap. The number of division regions may be greater than, less than, or equal to the number of LRF sensors 2. In this manner, the divided region is defined as a virtual region by a virtual sensor. Also, the ranging point included in the virtual region is defined to be a ranging point measured by the virtual sensor (not illustrated). Virtual regions are set to overlap to be a supplement when a human shape cannot be correctly clustered as a result of performing the clustering process in the periphery of the virtual sensor.

The ranging data dividing unit 215 outputs information d8-1 to d8-$m$ of ranging points for each virtual region to the corresponding clustering units 211C-1 to 211C-m.

The clustering units 211C-1 to 211C-m generate human cluster data d1-1 to d1-$m$ by performing the clustering process on the information d8-1 to d8-$m$ of the ranging points for each virtual region input from the ranging data dividing unit 215. Specifically, the clustering unit 211C calculates a center of gravity for each cluster in each virtual region and designates the calculated center of gravity as a human cluster data position. Also, the clustering unit 211C extracts a maximum value of heights of ranging points included in the cluster for each cluster in each virtual region and designates the extracted maximum value as a human cluster data height. The clustering unit 211C generates cluster-specific human cluster data d1-1 to d1-$m$ in which the human cluster data position and the human cluster data height are associated and outputs the generated cluster-specific human cluster data d1-1 to d1-$m$ to the cluster data integration unit 212.

For example, the clustering unit 211C-1 performs the clustering process on information d8-1 of the ranging point of the first virtual region and the clustering unit 211C-m performs the clustering process on information d8-$m$ of the ranging point of an $m^{th}$ virtual region.

The cluster data integration unit 212 generates cluster-specific human cluster data d2 by integrating the human cluster data d1-1 to d1-$m$ input from the clustering units 211C-1 to 211C-m. The cluster data integration unit 212 outputs the generated cluster-specific human cluster data d2 to the tracking unit 213. Specifically, the cluster data integration unit 212 calculates a center of gravity of the human cluster data position of the cluster to be integrated when the cluster derived from the same person redundantly detected by a plurality of clustering units is integrated and designates the calculated center of gravity as the human cluster data position after the integration. Also, the cluster data integration unit 212 extracts the maximum value of the human cluster data heights of the cluster to be integrated and designates the extracted maximum value as the human cluster height after the integration. The cluster data integration unit 212 generates the cluster-specific human cluster data d2 in which the human cluster data position and the human cluster data height are associated and outputs the generated cluster-specific human cluster data d2 to the tracking unit 213.

The tracking unit 213 performs a process similar to that of the operation estimation apparatus 20.

The situation estimation unit 220B detects a maximum value of human data heights of the hand-raising period (third period) (FIG. 5) using human data d3 input from the tracking unit 213. The situation estimation unit 220B calculates an average value of human data heights of the hand-lowering period (second period) (FIG. 5) using human data d10. The situation estimation unit 220B calculates a difference of the detected maximum value of the third period and the calculated average value of the second period and estimates whether hand raising is performed for each person on the basis of whether the calculated difference is greater than or equal to the hand-raising threshold value.

Also, the situation estimation unit 220B performs the above-described estimation a predetermined number of times according to a trigger signal d4 and finds a majority decision by estimating when the number of persons raising their hands is largest. The situation estimation unit 220B outputs a majority decision result as information d5 indicating a detection result to the processing unit 10.

Next, the virtual region will be described.

Figure 23:
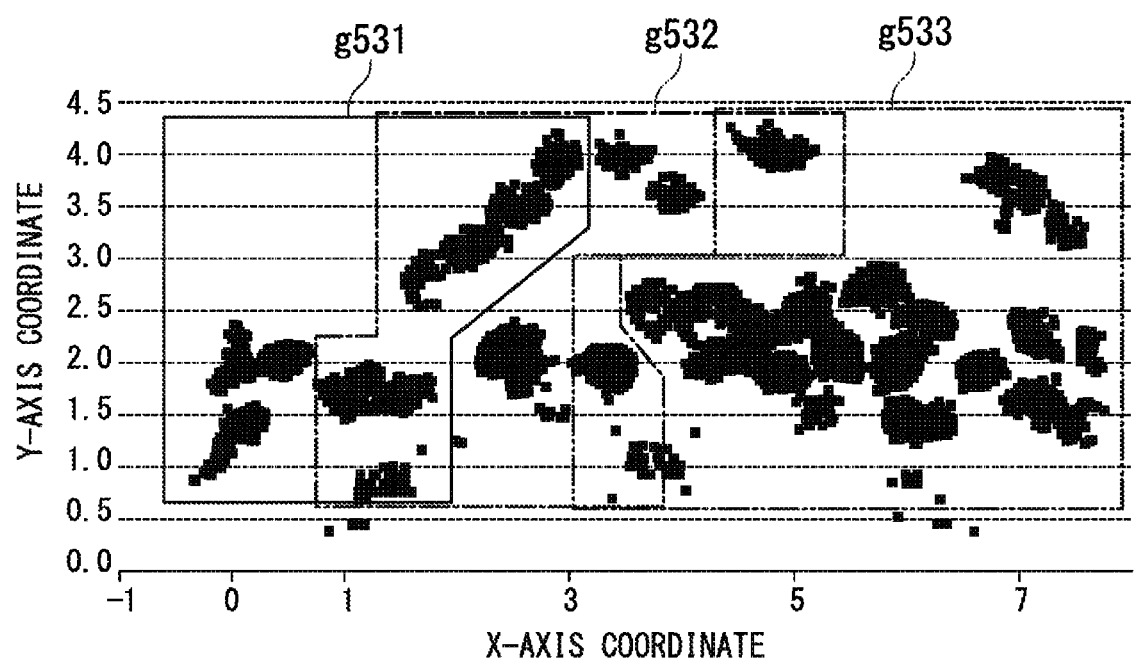
FIG. 23 is a diagram for describing an example of a virtual region according to the fifth embodiment.

FIG. 23 is a diagram for describing an example of the virtual region according to the present embodiment. In FIG. 23, the horizontal axis represents an x-axis coordinate and the vertical axis represents a y-axis coordinate. A region indicated by reference sign g531 is a first virtual region, a region indicated by reference sign g532 is a second virtual region, and a region indicated by reference sign g533 is a third virtual region.

Each virtual region of the example illustrated in FIG. 23 is based on a distribution of human data. It is desirable for each virtual region to be a region in which a set of ranging points obtained from one person is not divided as in regions indicated by reference signs g531 to g533. Thus, the shape of the virtual region may not be limited to a square and may be a shape of a circle, an ellipse, or a polygon as long as the shape is based on the distribution of human data. Even in this case, the size of the virtual region may be a size divided according to the number of clustering units 211C.

Next, the processing procedure of the hand-raising detection will be described.

Figure 24:
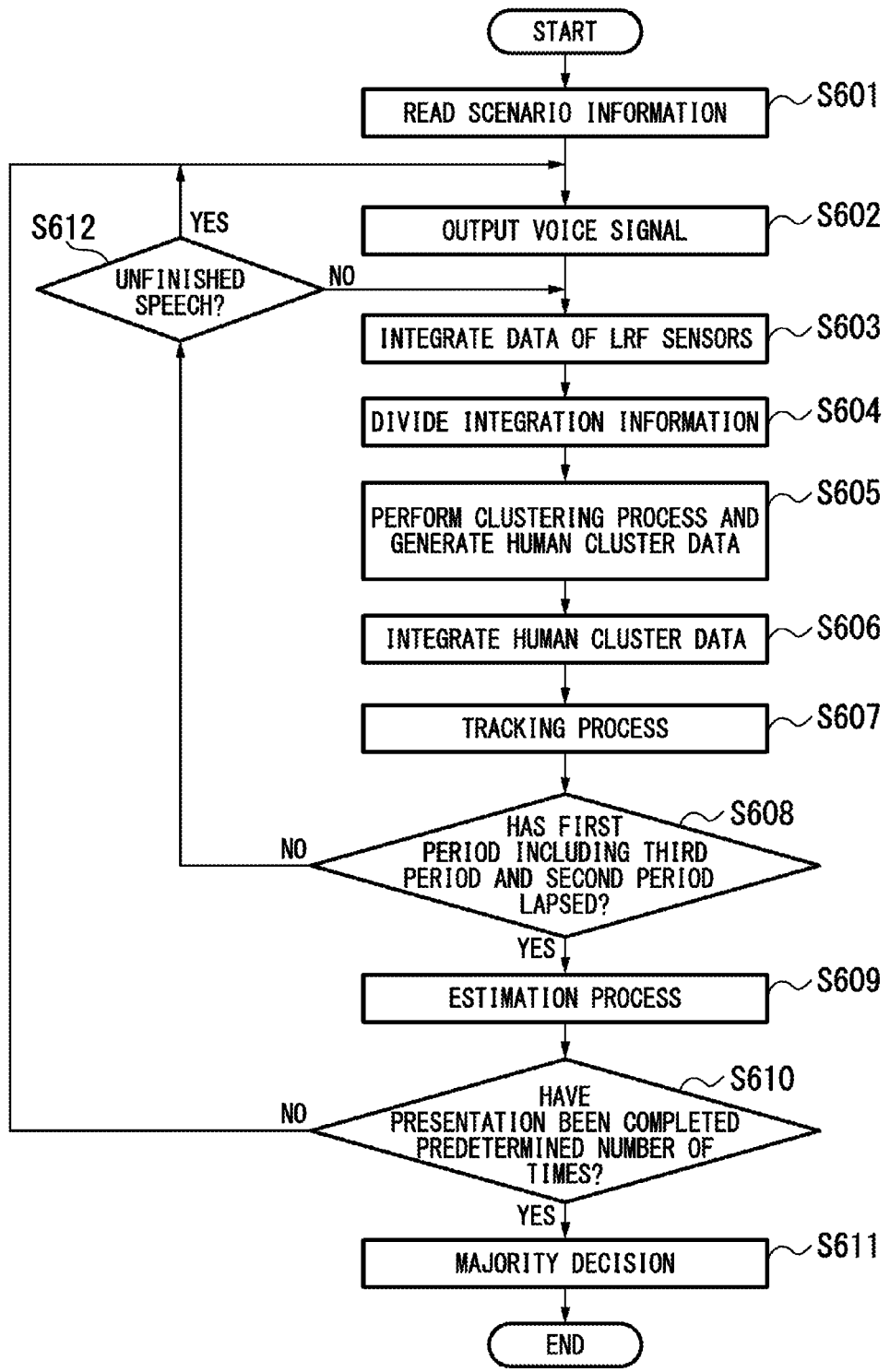
FIG. 24 is a flowchart of a processing procedure of hand-raising detection by the robot according to the fifth embodiment.

FIG. 24 is a flowchart of a processing procedure of hand-raising detection by the robot 1C according to the present embodiment.

(Steps S601 and S602) The control unit 102 performs processes of steps S601 and S602 similar to the processes of steps S301 and S302 (FIG. 11). After the processes, the control unit 102 moves the process to step S603.

(Step S603) The ranging data integration unit 214 integrates ranging values input from the n LRF sensors 2, generates integration information d7, and outputs integrated integration information d7 to the data dividing unit 215. The ranging data integration unit 214 moves the process to step S604.

(Step S604) The ranging data dividing unit 215 divides the integration information d7 input from the ranging data integration unit 214 into m virtual regions each having a predetermined area and outputs information d8-1 to d8-m of ranging points of virtual regions of divisions to the corresponding clustering units 211C-1 to 211C-m. The ranging data dividing unit 215 moves the process to step S605.

(Step S605) The clustering units 211C-1 to 211C-m generate human cluster data d1-1 to d1-m by performing the clustering process using information d8-1 to d8-m of ranging points of each virtual region input from the ranging data dividing unit 215. Next, the clustering units 211C-1 to 211C-m output the generated human cluster data d1-1 to d1-m to the cluster data integration unit 212. The clustering unit 211C moves the process to step S606.

(Step S606) The cluster data integration unit 212 integrates human cluster data d1-1 to d1-m input from the clustering units 211C-1 to 211C-m and generates cluster-specific human cluster data d2. Next, the cluster data integration unit 212 outputs the generated cluster-specific human cluster data d2 to the tracking unit 213. The cluster data integration unit 212 moves the process to step S607.

(Step S607) The tracking unit 213 performs a tracking process at each predetermined time interval for each piece of input human cluster data. The tracking unit 213 generates human data d3 by associating an ID obtained as a result of performing the tracking process with the human data position and the human data height for each person and outputs the generated human data d3 for each person to the situation estimation unit 220B. The tracking unit 213 moves the process to step S608.

(Step S608) The situation estimation unit 220B determines whether the first period including the third period and the second period has elapsed. The situation estimation unit 220B proceeds to step S609 when it is determined that the first period including the third period and the second period has elapsed (step S608; YES), and proceeds to the process of step S612 when it is determined that the first period including the third period and the second period has not elapsed (step S608; NO).

(Step S612) The situation estimation unit 220B determines whether or not the speech has not been finished.

The situation estimation unit 220B returns to step S602 when it is determined that the speech has not been finished (step S612; YES) and returns to step S603 when it is determined that the speech is finished (step S612; NO).

(Step S609) The situation estimation unit 220B performs the process of step S609 similar to the process of step S309 (FIG. 11).

(Step S610) The situation estimation unit 220B determines whether question presentation has been completed a predetermined number of times on the basis of scenario information. The situation estimation unit 220B proceeds to step S611 when it is determined that the question presentation has been completed a predetermined number of times (step S610; YES) and returns to step S602 when it is determined that the question presentation has not been completed a predetermined number of times (step S610; NO).

(Step S611) The situation estimation unit 220B performs the process of step S611 similar to the process of step S311 (FIG. 11).

The process of hand-raising detection ends.

Also, although an example in which the situation estimation unit 220B estimates that the hand raising is performed when a difference between human data heights of the third period and the second period is greater than or equal to a hand-raising threshold value has been described in the present embodiment, the present invention is not limited thereto. The situation estimation unit 220B includes a histogram processing unit 221 as in the first embodiment, and the histogram processing unit 221 (FIG. 1) may perform histogram processing on human data.

As described above, in the operation estimation apparatus (for example, the operation estimation apparatus 20C) of the present embodiment, the distance measurement unit (for example, the LRF sensor 2) includes: a plurality of distance measurement units (for example, the LRF sensors 2-1 to 2-n) configured to measure distances for different predetermined ranges, the human-body processing unit (for example, the human integration unit 210C) includes: a ranging data integration unit (for example, the ranging data integration unit 214) configured to integrate the distances measured by the plurality of distance measurement units for two or more predetermined ranges; a dividing unit (for example, the ranging data dividing unit 215) configured to re-divide each of two or more predetermined ranges which are integrated into m (m is an integer greater than or equal to 2) regions which are equal to or different from predetermined regions in shape and number; m clustering units (for example, the clustering units 211C) configured to classify the measured distances included in each of the m regions as a cluster for each of the m regions and detect the person on the basis of the classified cluster; and a cluster data integration unit (for example, the cluster data integration unit 212) configured to integrate results of detections by the m clustering units, and the tracking unit (for example, the tracking unit 213) assigns an identifier to each person detected by the clustering unit on the basis of the integrated results.

Through this configuration, according to the present embodiment, it possible to distribute a calculation process because a plurality of clustering units 211C are configured to perform a process of generating human cluster data in addition to effects of the fourth embodiment. As a result, according to the present embodiment, it is possible to reduce a load applied to the process of generating the human cluster data.

Also, through this configuration, as in the fourth embodiment, according to the present embodiment, it is possible to reduce erroneous integration between persons close to each other. Also, in the present embodiment, it is possible to reduce the generation of two clusters not correctly integrated for one person. As described above, according to the present embodiment, it is possible to reduce an erroneous operation by the clustering process.

Also, when the situation estimation unit 220B includes the histogram processing unit 221 (FIG. 1) even in the present embodiment, the histogram processing unit 221 may use at least one of a technique using a histogram described in the first embodiment, a technique of setting an upper-limit threshold value for determining a height of hand raising described in the second embodiment, and a technique described in the third embodiment.

Thereby, it is possible to reduce an erroneous determination of hand raising even when adjacent persons between whom there is a height difference are close to each other or a raised hand is placed above another person such as when there is an adult behind or beside the child.

Sixth Embodiment

First, problems occurring in the case in which the clustering process is performed using a conventional technique will be described.

As described using FIG. 17 in the third embodiment, the dividing position of the cluster may change in a state in which people are crowded, resulting in the failure of the clustering process when the clustering process is performed using the conventional technique.

Figure 25:
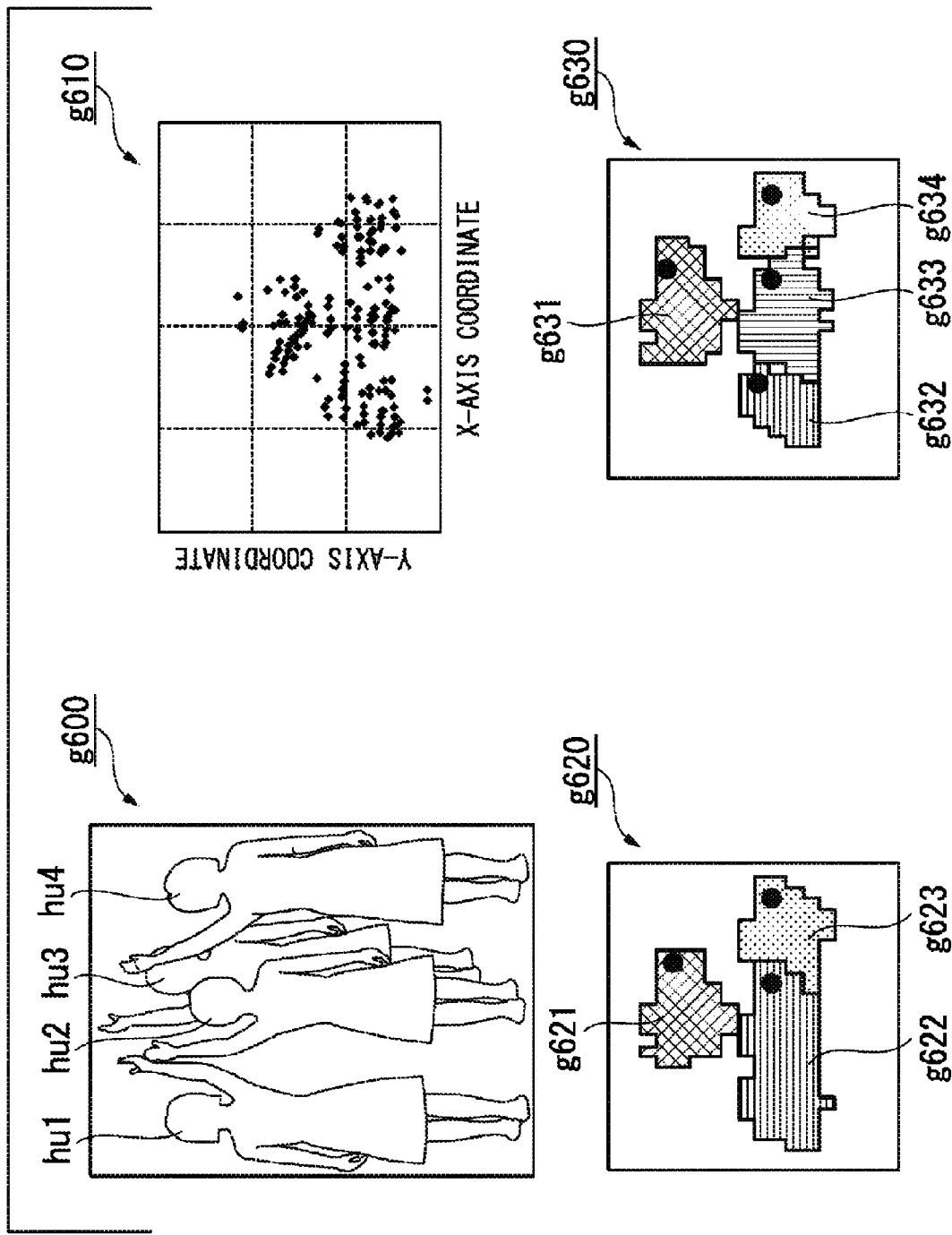
FIG. 25 is a diagram for describing an example in which a result of performing the clustering process between frames changes.

FIG. 25 is a diagram for describing an example in which a result of performing the clustering process between frames changes. In FIG. 25, a diagram indicated by reference sign g600 is a diagram for describing a state of spectators in some region of a venue. In the example of the diagram indicated by reference sign g600, there are persons hu1 to hu4.

A diagram indicated by reference sign g610 of FIG. 25 is a diagram illustrating ranging points at the time of a frame f1. In the diagram indicated by reference sign g610, the horizontal axis represents an x-axis coordinate and the vertical axis represents a y-axis coordinate. The frame is a detection timing of any time interval.

A diagram indicated by reference sign g620 of FIG. 25 is a diagram of a result of performing the clustering process using a conventional technique for ranging points at the time of a frame f2 and a diagram indicated by reference sign g630 is a diagram of a result of performing the clustering process using a conventional technique for ranging points at the time of a frame f3. Also, the frames f2 and f3 are frames having mutually different times.

In the diagram indicated by reference sign g620, reference sign g621 indicates a cluster of a person hu3 in the diagram indicated by reference sign g600. Reference sign g622 indicates a cluster of persons hu1 and hu2 in the diagram indicated by reference sign g600. Reference sign g623 indicates a cluster of a person hu4 in the diagram indicated by reference sign g600. In this manner, the example illustrated in the diagram indicated by reference sign g620 is an example in which two persons are estimated as one cluster without separation.

In the diagram indicated by reference sign g630, reference signs g631 to g634 indicate the clusters of the persons hu1 to hu4 in the diagram indicated by reference sign g600. That is, in the frame f3, the four spectators can be correctly separated.

As illustrated in FIG. 25, the tracking process becomes unstable when a result of separating the cluster for each frame changes.

Next, the configuration of a robot 1D according to the present embodiment will be described.

Figure 26:
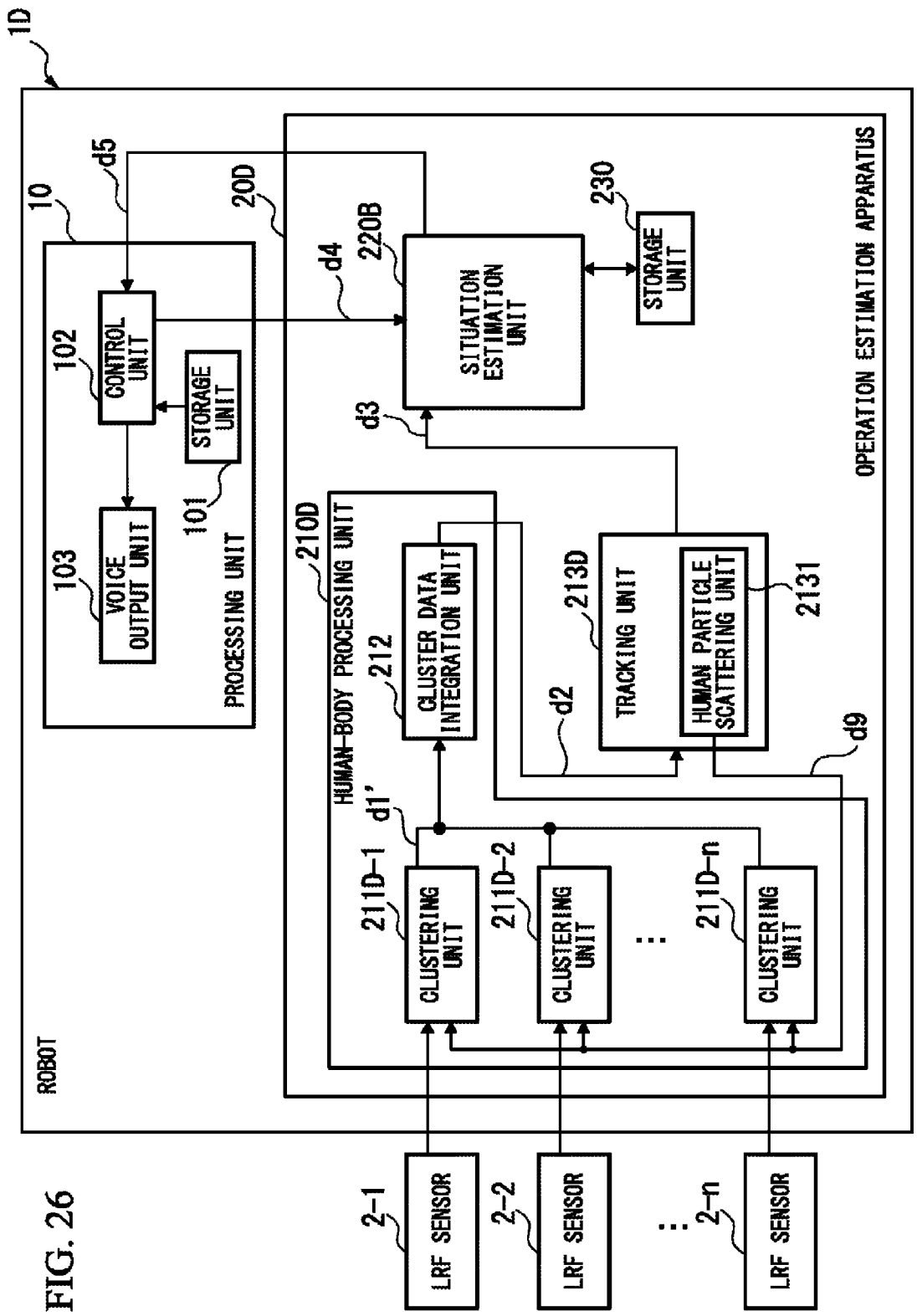
FIG. 26 is a schematic block diagram of a robot according to a sixth embodiment.

FIG. 26 is a schematic block diagram of the robot 1D according to the present embodiment.

As illustrated in FIG. 26, the robot 1D is configured to include a processing unit 10 and an operation estimation apparatus 20D. The robot 1D is connected to n (n is an integer greater than or equal to 1) LRF sensors 2-1 to 2-$n$ (distance measurement units) wirelessly or by wire. Also, the configuration of the processing unit 10 is the same as the configuration of FIG. 1 of the first embodiment. Also, functional units having functions similar to those of the robot 1 (FIG. 1) are assigned the same reference signs and description thereof will be omitted.

The operation estimation apparatus 20D includes a human-body processing unit 210D, a tracking unit 213D, a situation estimation unit 220B, and a storage unit 230. The human-body processing unit 210D includes n clustering units 211D-1 to 211D-n, and a cluster data integration unit 212. The tracking unit 213D includes a human particle scattering unit 2131. When none of the clustering units 211D-1 to 211D-n are specified, the clustering units 211D-1 to 211D-n are referred to as a clustering unit 211D.

The clustering unit 211D classifies ranging points as a cluster, for example, in each predetermined cycle, using information of a ranging point input from input from the LRF sensor 2 and scattered human particles d9 input from the human particle scattering unit 2131. The clustering unit 211D calculates a center of gravity for each classified cluster and designates the calculated center of gravity as a human cluster data position. The clustering unit 211D extracts a maximum value of heights in the cluster for each classified cluster and designates the extracted maximum value as a human cluster data height. The clustering unit 211D generates human cluster data d1' by associating the human cluster data position with the human cluster data height for each cluster and outputs the generated human cluster data d1' to the cluster data integration unit 212.

The cluster data integration unit 212 integrates the human cluster data d1' input from the clustering units 211D-1 to 211D-n. The cluster data integration unit 212 designates the center of gravity of a human cluster data position of the cluster to be integrated when the cluster derived from the same person redundantly detected by a plurality of clustering units is integrated as the human cluster data position after the integration. Also, the cluster data integration unit 212 designates the maximum value of human cluster data heights of the cluster to be integrated as the human cluster data height after the integration. The cluster data integration unit 212 generates cluster-specific human cluster data d2 in which the human cluster data position and the human cluster data height are associated and outputs the generated human cluster data d2 to the tracking unit 213D.

The cluster-specific human cluster data d2 in which the human cluster data position and the human cluster data height are associated is input from the cluster data integration unit 212 to the tracking unit 213D. For each piece of input human cluster data, the tracking unit 213D performs the tracking process at each predetermined time interval. The tracking unit 213D generates human data d3 by associating an ID obtained as a result of performing the tracking process with the human data position and the human data height for each person. The tracking unit 213D outputs the generated person-specific human data d3 to the situation estimation unit 220B. The tracking unit 213D deletes human data corresponding to an ID for which tracking is impossible when the person cannot be tracked due to movement out of a measurement range of the LRF sensor 2.

The human particle scattering unit 2131 calculates positions and the number of seed particles scattered around the human data position to which the ID is assigned and outputs the calculated seed particles d9 to the clustering unit 211D corresponding to the human data position at which the seed particles are calculated. The human particle scattering unit 2131 is configured to increase the number of seed particles to be calculated, for example, according to a human presence time, as will be described below. Also, the seed particles will be described below.

Also, the above-described seed particles do not have z-coordinate information, only xy coordinates. The seed particles are used only in the clustering. Also, in the height information of the cluster data, a highest height among ranging points is used by neglecting the seed particles.

Next, the seed particles and a scattering example of the seed particles will be described.

Figure 27:
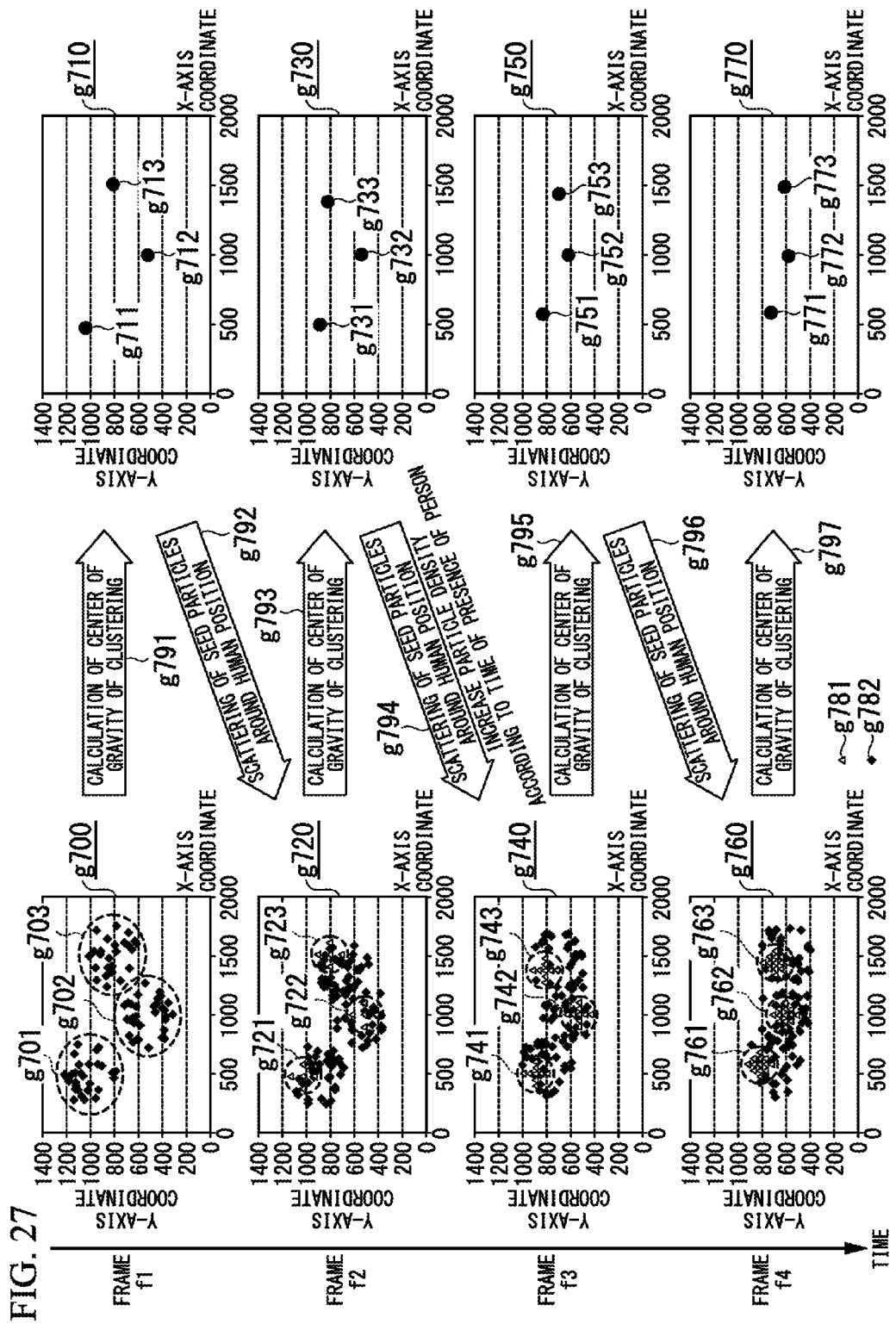
FIG. 27 is a diagram for describing seed particles and an example of scattering of the seed particles according to the sixth embodiment.

FIG. 27 is a diagram for describing the seed particles and the scattering example of the seed particles according to the present embodiment. In images indicated by reference signs g700 to g770, the horizontal axis represents an x-axis coordinate and the vertical axis represents a y-axis coordinate. Also, in the example illustrated in FIG. 27, there are three spectators in a region to be detected. Also, in FIG. 27, a frame f2 is the next frame after the frame f1, a frame f3 is the next frame after the frame f2, and a frame f4 is the next frame after the frame f3. Also, in diagrams indicated by reference signs g700, g720, g740, and g760, a point g781 is a ranging point and a triangular mark g782 indicates a seed particle.

An image indicated by reference sign g700 of FIG. 27 is a diagram of ranging points at the time of the frame f1. In the diagram indicated by reference sign g700, regions indicated by reference signs g701, g702, and g703 are collections (clusters) of ranging points classified by the clustering unit 211D.

An image indicated by reference sign g710 of FIG. 27 is an image indicating a position of each generated human cluster data when the clustering unit 211D generates a cluster by performing the clustering process on all ranging points of an image indicated by reference sign g700 as indicated by an arrow g791 and the cluster data integration unit 212 further integrates the cluster. In the image indicated by reference sign g710, the point g711 indicates a center of gravity of the human cluster data to which ID1 is assigned by the tracking unit 213D, that is, a position of a person to which ID1 is assigned. In the diagram indicated by reference sign g710, a point g712 indicates the center of gravity of the human cluster data to which ID2 is assigned by the tracking unit 213D and a point g713 indicates the center of gravity of the human cluster data to which ID3 is assigned by the tracking unit 213D.

As indicated by an arrow g792, the human particle scattering unit 2131 calculates a position at which seed particles are scattered around a position indicated by position information of each piece of human data to which an ID is assigned (a center of gravity of the cluster). The human particle scattering unit 2131 scatters seed particles at ranging points of the frame f2 on the basis of a position calculated at the time of the frame f1 as in the diagram indicated by reference sign g720.

An image indicated by reference sign g720 of FIG. 27 is an image in which seed particles are scattered at ranging points at the time of the frame f2. In the image indicated by reference sign g720, a region indicated by reference sign g721 is, for example, a region in which seed particles corresponding to a person to whom ID1 is assigned are scattered. A region indicated by reference sign g722 is, for example, a region in which seed particles corresponding to a person to whom ID2 is assigned are scattered. A region indicated by reference sign g723 is, for example, a region in which seed particles corresponding to a person to whom ID3 is assigned are scattered.

In this manner, the seed particles are ranging points which are virtual to be scattered around the center of gravity of each cluster (hereinafter, also referred to as virtual ranging points) after the clustering process is performed on actually measured ranging points.

An image indicated by reference sign g730 of FIG. 27 is an image indicating a position of each generated human cluster data when the clustering unit 211D performs the clustering process on all ranging points of an image indicated by reference sign g720 and all scattered seed particles as indicated by an arrow g793 and the cluster data integration unit 212 further integrates the cluster. In the image indicated by reference sign g730, a point g731 indicates a center of gravity of the human cluster data (a position of a person) to which ID1 is continuously assigned by the tracking unit 213D. In the image indicated by reference sign g730, a point g732 indicates a center of gravity of the human cluster data (a position of a person) to which ID2 is continuously assigned by the tracking unit 213D. A point g733 indicates a center of gravity of the human cluster data (a position of a person) to which ID3 is continuously assigned by the tracking unit 213D.

As indicated by an arrow g794, the human particle scattering unit 2131 calculates a position at which seed particles are scattered around a position indicated by position information of each piece of human data to which an ID is assigned. Also, the human particle scattering unit 2131 may increase a density of seed particles according to a time in which the person is in a predetermined range.

That is, when a person of the ID is in the predetermined range as a result of performing tracking by the tracking unit 213D, the human particle scattering unit 2131 determines that the person corresponding to the ID does not move or does not move too much. The human particle scattering unit 2131 scatters seed particles for which a density increases at ranging points of the frame f3 on the basis of a position calculated at the time of the frame f2 as in an image indicated by reference sign g740. For example, when the number of seed particles for ID1 at the time of the frame f2 is, for example, 5, the human particle scattering unit 2131 increases the number of seed particles for ID1 at the time of the frame f3 to 9.

Alternatively, the human particle scattering unit 2131 may be configured to weight a scattering density according to elapsed time after human data to which each ID is assigned is generated within a venue. For example, the human particle scattering unit 2131 may increase the number of human particles to 5 in one frame, 7 in two frames, or 9 in three or more frames.

An image indicated by reference sign g740 of FIG. 27 is a diagram in which seed particles are scattered at ranging points at the time of the frame f3. In the image indicated by reference sign g740, a region indicated by reference sign g741 is, for example, a region in which seed particles corresponding to a person to whom ID1 is assigned are scattered. A region indicated by reference sign g742 is, for example, a region in which seed particles corresponding to a person to whom ID2 is assigned are scattered. A diagram of a region indicated by reference sign g743 is, for example, a region in which seed particles corresponding to a person to whom ID3 is assigned are scattered.

An image indicated by reference sign g750 of FIG. 27 is an image indicating a position of each generated human cluster data when the clustering unit 211D performs the clustering process on all ranging points of an image indicated by reference sign g740 and all scattered seed particles as indicated by an arrow g795 and the cluster data integration unit 212 further integrates the cluster. In the image indicated by reference sign g750, a point g751 indicates a center of gravity of the human cluster data to which ID1 is continuously assigned by the tracking unit 213D. In the image indicated by reference sign g750, a point g752 indicates a center of gravity of the human cluster data to which ID2 is continuously assigned by the tracking unit 213D. A point g753 indicates a center of gravity of the human cluster data to which ID3 is continuously assigned by the tracking unit 213D.

As indicated by an arrow g796, the human particle scattering unit 2131 calculates a position at which seed particles are scattered around a position indicated by position information of each piece of human data to which an ID is assigned. The human particle scattering unit 2131 may further increase a density of seed particles according to a time in which the person is in a predetermined range. The human particle scattering unit 2131 scatters seed particles for which a density increases at ranging points of the frame f4 on the basis of a position calculated at the time of the frame f3 as in an image indicated by reference sign g760. For example, when the number of seed particles at the time of the frame f3 is, for example, 9, for each ID, the human particle scattering unit 2131 increases the number of seed particles for each ID at the time of the frame f4 to, for example, 13.

An image indicated by reference sign g760 of FIG. 27 is a diagram in which seed particles are scattered at ranging points at the time of the frame f4. In the image indicated by reference sign g760, a region indicated by reference sign g761 is, for example, a region in which seed particles corresponding to a person to whom ID1 is assigned are scattered. A region indicated by reference sign g762 is, for example, a region in which seed particles corresponding to a person to whom ID2 is assigned are scattered. A region indicated by reference sign g763 is, for example, a region in which seed particles corresponding to a person to whom ID3 is assigned are scattered.

Also, in images indicated by reference signs g740 and g760, seed particles are arranged so that a density increases toward a human data position, that is, the center of gravity of a ranging point included in each cluster.

An image indicated by reference sign g770 of FIG. 27 is an image indicating a position of each generated human cluster data when the clustering unit 211D performs the clustering process on all ranging points of a diagram indicated by reference sign g760 and all scattered seed particles as indicated by an arrow g797 and the cluster data integration unit 212 further integrates the cluster. In the image indicated by reference sign g770, a point g771 indicates a center of gravity of the human cluster data to which ID1 is continuously assigned by the tracking unit 213D. In the image indicated by reference sign g770, a point g772 indicates a center of gravity of the human cluster data to which ID2 is continuously assigned by the tracking unit 213D. A point g773 indicates a center of gravity of the human cluster data to which ID3 is continuously assigned by the tracking unit 213D.

Also, although an example in which the human particle scattering unit 2131 increases the number of seed particles to 5, 9, or 13 is shown in an example using FIG. 27, the increasing number is not limited thereto. It is only necessary to increase a density of seed particles according to a human presence time.

Also, although an example in which a density of seed particles increases according to a human presence time and seed particles are scattered at a position indicated by position information in a previous frame has been described in an example using FIG. 27, the present invention is not limited thereto.

The human particle scattering unit 2131 may be configured to scatter seed particles at a particle density weighted according to a human presence time for a position indicated by position information of several previous frames. That is, the human particle scattering unit 2131 may scatter seed particles according to a previous movement history so that 13 seed particles are scattered at a position in a frame f3, 9 seed particles are scattered at a position in a frame f2, and 5 seed particles are scattered at a position in a frame f1, for example, with respect to ranging data of a frame f4. In this manner, the scattering density may be weighted to further decrease when elapsed time further increases at a position in a previous frame.

Next, a processing procedure of hand-raising detection will be described.

Figure 28:
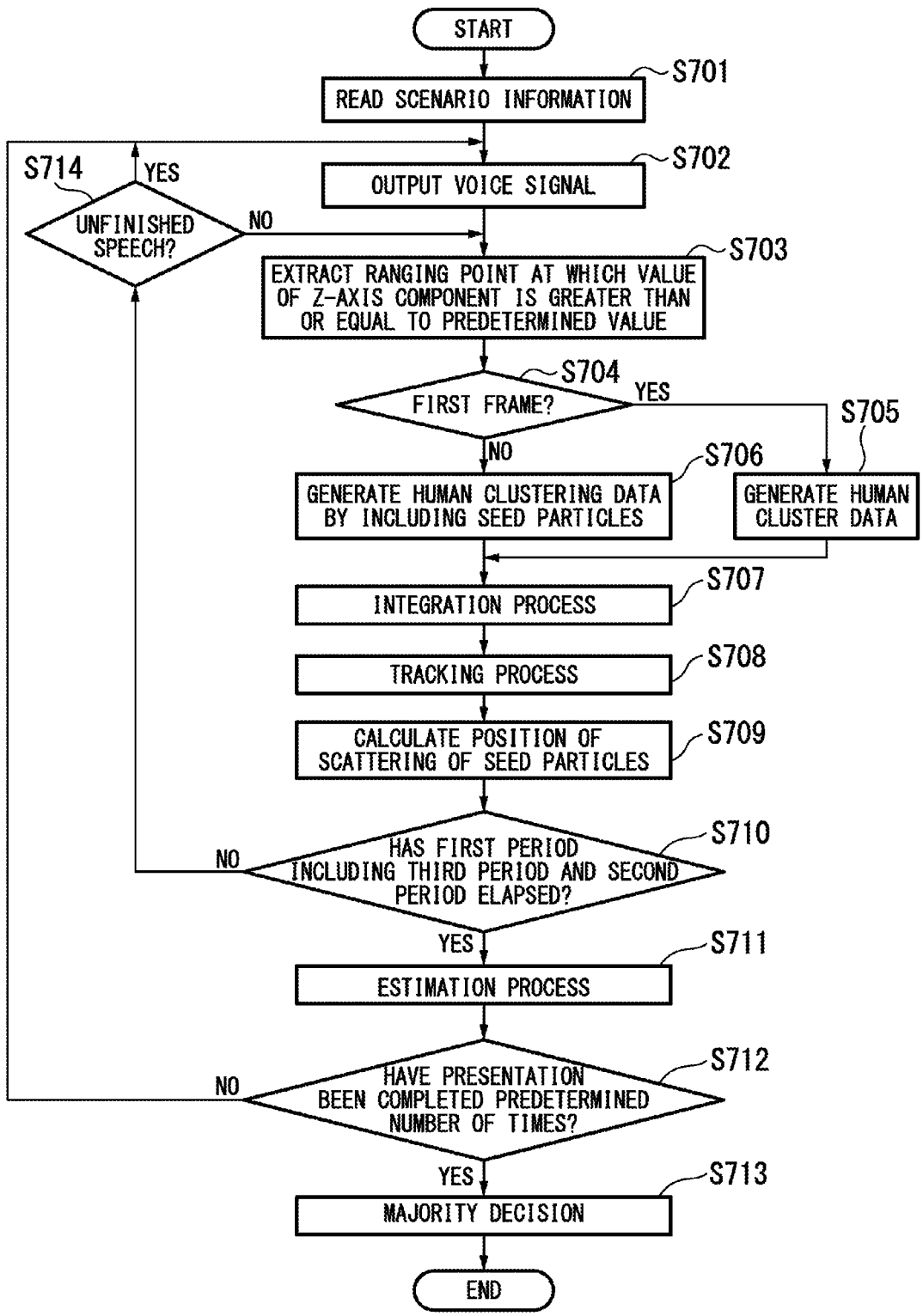
FIG. 28 is a flowchart of a processing procedure of hand-raising detection by the robot according to the sixth embodiment.

FIG. 28 is a flowchart of a processing procedure of hand-raising detection by the robot 1D according to the present embodiment.

(Steps S701 to S703) The control unit 102 performs processes of steps S701 to S703 similar to the processes of steps S301 to S303 (FIG. 11). After the processes, the control unit 102 moves the process to step S704.

(Step S704) The clustering unit 211D determines whether the frame is a first frame. The clustering unit 211D proceeds to step S705 when it is determined that the frame is the first frame (step S704; YES) and proceeds to step S706 when it is determined that the frame is not the first frame (step S704; NO).

(Step S705) The clustering unit 211D generates human cluster data using information of a ranging point extracted in step S703. The clustering unit 211D moves the process to step S707.

(Step S706) The clustering unit 211D generates the human cluster data using the information of the ranging point extracted in step S703 and the seed particles scattered by the human particle scattering unit 2131 in the case of second and subsequent frames. The clustering unit 211D moves the process to step S707.

(Step S707) The cluster data integration unit 212 performs a process of integrating human cluster data d1' generated by the clustering unit 211D in S705 or S706. Next, the cluster data integration unit 212 generates the integrated human cluster data d2 and outputs the generated human cluster data d2 to the tracking unit 213D. The cluster data integration unit 212 moves the process to step S708.

(Step S708) The tracking unit 213D performs a tracking process at each predetermined time interval for each piece of human data using the human cluster data d2 input from the cluster data integration unit 212. The tracking unit 213D first assigns an ID to each piece of input human data. Next, the tracking unit 213D assigns the same ID as that assigned in a previous frame to human cluster data regarded to be that of the same person as a result of performing the tracking process in time series on the basis of a human cluster data position. Next, the tracking unit 213D generates human data d3 by associating the ID obtained as a result of performing the tracking process with the human data position and the human data height for each person and outputs the generated human data d3 to the situation estimation unit 220B. The tracking unit 213D moves the process to step S709.

(Step S709) The human particle scattering unit 2131 calculates a position at which seed particles are scattered and the number of seed particles for each ID so that a density increases according to a human presence time in which the tracking process is continuously performed.

Next, the human particle scattering unit 2131 outputs information d9 indicating the calculated position at which the seed particles are scattered and the calculated number of seed particles to the corresponding clustering unit 211D. The human particle scattering unit 2131 moves the process to step S710.

(Step S710) The situation estimation unit 220B determines whether the first period including the third period and the second period has elapsed. The situation estimation unit 220B proceeds to step S711 when it is determined that the first period including the third period and the second period has elapsed (step S710; YES), and proceeds to the process of step S714 when it is determined that the first period including the third period and the second period has not elapsed (step S710; NO).

(Step S714) The situation estimation unit 220B determines whether or not the speech has not been finished.

The situation estimation unit 220B returns to step S702 when it is determined that the speech has not been finished (step S714; YES) and returns to step S703 when it is determined that the speech is finished (step S714; NO).

(Step S711) The situation estimation unit 220B estimates the number of persons raising their hands using the human data generated by the tracking unit 213D in step S708 and the determination threshold value stored in the storage unit 230. The situation estimation unit 220B moves the process to step S712.

(Step S712) The situation estimation unit 220B determines whether question presentation has been completed a predetermined number of times on the basis of scenario information. The situation estimation unit 220B proceeds to step S713 when it is determined that the question presentation has been completed a predetermined number of times (step S712; YES) and returns to step S702 when it is determined that the question presentation has not been completed a predetermined number of times (step S712; NO).

(Step S713) The situation estimation unit 220B performs the process of step S713 similar to the process of step S311 (FIG. 11).

The process of hand-raising detection ends.

Also, in the present embodiment, the ranging data integration unit 214 (FIG. 18) and the clustering unit 211B (FIG. 18) described in the fourth embodiment may be included in place of the clustering unit 211D and the cluster data integration unit 212. In this case, the clustering unit 211B may classify, for example, ranging points in each predetermined cycle, using integration information input from the ranging data integration unit 214 and seed particles calculated by the human particle scattering unit 2131 provided in the tracking unit 213D.

Further, the ranging data integration unit 214, the ranging data dividing unit 215, the clustering unit 211C, and the cluster data integration unit 212 may be provided as illustrated in FIG. 22 in place of the clustering unit 211D and the cluster data integration unit 212. Even in this case, the human particle scattering unit 2131 provided in the tracking unit 213D inputs the generated human particles to the clustering unit 211C-n.

As described above, in the operation estimation apparatus (for example, the operation estimation apparatus 20D) of the present embodiment, the tracking unit (for example, the tracking unit 213D) detects the person at a time subsequent to a predetermined time on the basis of a position of human data detected at the predetermined time.

Also, in the operation estimation apparatus (for example, the operation estimation apparatus 20D) of the present embodiment, the tracking unit (for example, the tracking unit 213D and the human particle scattering unit 2131) generates virtual distance information (for example, seed particles) indicating distance information virtually measured around a position of human data corresponding to the person detected at a predetermined time in information of the distance measured at a time subsequent to the predetermined time, the clustering unit (for example, the clustering unit 211D) which generates human cluster data by clustering the distances generates mixed distance information in which the virtual distance information is mixed with the information of the distance measured at the subsequent time, the human-body processing unit (for example, the human-body processing unit 210D) detects the person at the subsequent time on the basis of the mixed distance information, and the tracking unit assigns an identifier (for example, an ID) to each person detected by the human processing.

Also, in the operation estimation apparatus (for example, the operation estimation apparatus 20D) of the present embodiment, the tracking unit (for example, the tracking unit 213D and the human particle scattering unit 2131) changes a density of the virtual distance information (for example, seed particles) around the position of the human data detected at the predetermined time according to a time period in which the person is in a predetermined range from the position.

Also, in the operation estimation apparatus (for example, the operation estimation apparatus 20D) of the present embodiment, the tracking unit (for example, the tracking unit 213D and the human particle scattering unit 2131) scatters the virtual distance information (for example, seed particles) around a position of the human data detected at the predetermined time at virtual points according to a time period in which the person is in a predetermined range from the position so that a center is dense.

Through this configuration, according to the present embodiment, seed particles according to a human position history are generated and a clustering process is also performed using the seed particles. Thereby, it is possible to reduce an error of the clustering process. Also, according to the present embodiment, it is possible to improve the precision of tracking because the center of gravity (human position) of the cluster can be stabilized.

As a result, according to the present embodiment, it is possible to reduce an error of the tracking process caused when adjacent persons approach each other, a plurality of persons are erroneously integrated as one cluster, and the position of the cluster changes. Further, according to the present embodiment, it is possible to reduce erroneous detection of hand-raising detection caused by changing the height of the cluster according to erroneous integration or erroneous division of the cluster when there was a height difference between persons close to each other in the previous term.

Also, although an example in which a human position is calculated on the basis of measured ranging points and the seed particles are scattered around the calculated position has been described in the present embodiment, the present invention is not limited thereto.

When it is estimated that the person moves as a result of tracking the person, the human particle scattering unit 2131 may be configured to estimate a position to which the person moves at the time of the next frame and scatter the seed particles around the estimated position.

Also, even in the present embodiment, the situation estimation unit 220B includes the histogram processing unit 221 (FIG. 1), and the histogram processing unit 221 may use at least one of a technique using a histogram described in the first embodiment, a technique of setting a threshold value for determining a height of hand raising described in the second embodiment, a technique described in the third embodiment, a technique described in the fourth embodiment, and a technique described in the fifth embodiment.

Thereby, it is possible to reduce an erroneous determination of hand raising even when adjacent persons between whom there is a height difference are close to each other or a raised hand is placed above another person such as when there is an adult behind or beside the child.

Seventh Embodiment

In the present embodiment, an operation estimation apparatus capable of improving the precision of determination of hand raising even when the spectator performs low hand raising will be described.

Figure 29:
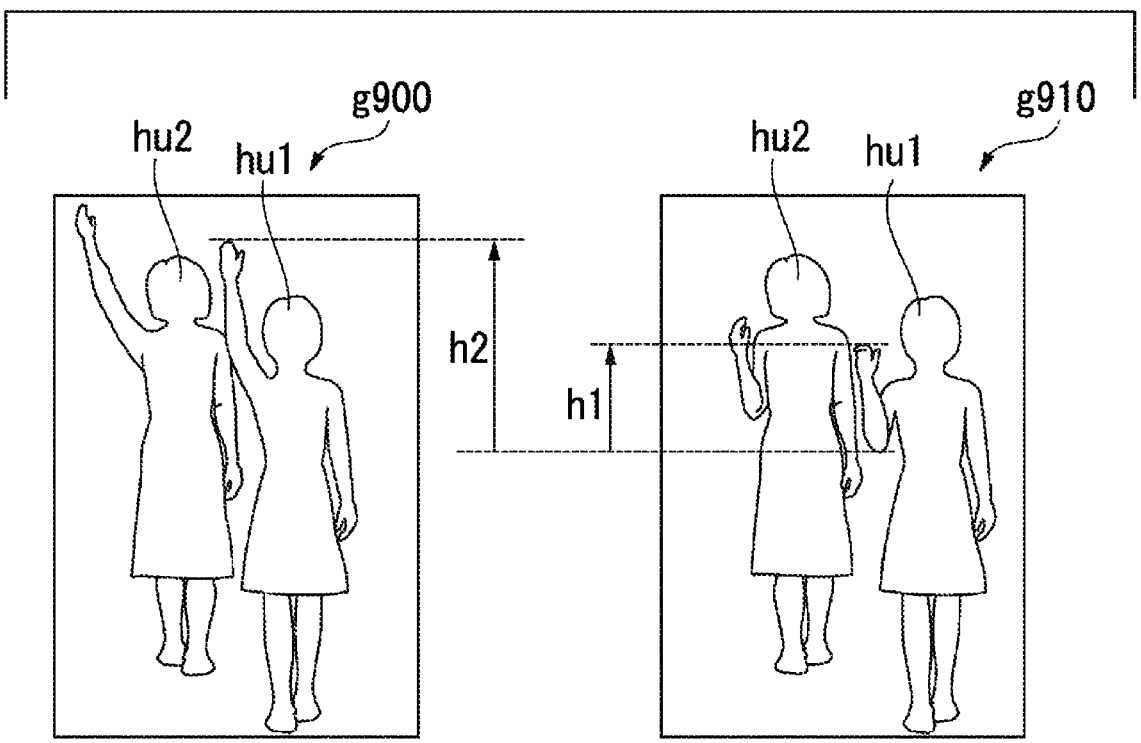
FIG. 29 is a diagram for describing a state of hand raising of a spectator.

FIG. 29 is a diagram for describing a state of hand raising of the spectator. In the example illustrated in FIG. 29, there are persons hu1 and hu2. A diagram indicated by reference sign g900 of FIG. 29 is a diagram of an example in which the person hu1 raises his/her hand by raising the upper arm, the forearm, and the hand from the shoulder to the height h2. Also, a diagram indicated by reference sign g910 is a diagram of an example in which the person hu1 raises his/her hand by raising the forearm and the hand from the shoulder to the height h1. Also, the height h1 is lower than the height h2. When the height of the hand raising is lower as in the diagram indicated by reference sign g910, a difference between the maximum value of the human data heights in the hand-raising period (third period) and the average value of the human data heights in the hand-lowering period (second period) may not be greater than or less than the hand-raising threshold value, for example, as described in the first embodiment. In this case, the operation estimation apparatus 20 may erroneously estimate that the person hu1 does not raise his/her hand.

Figure 30:
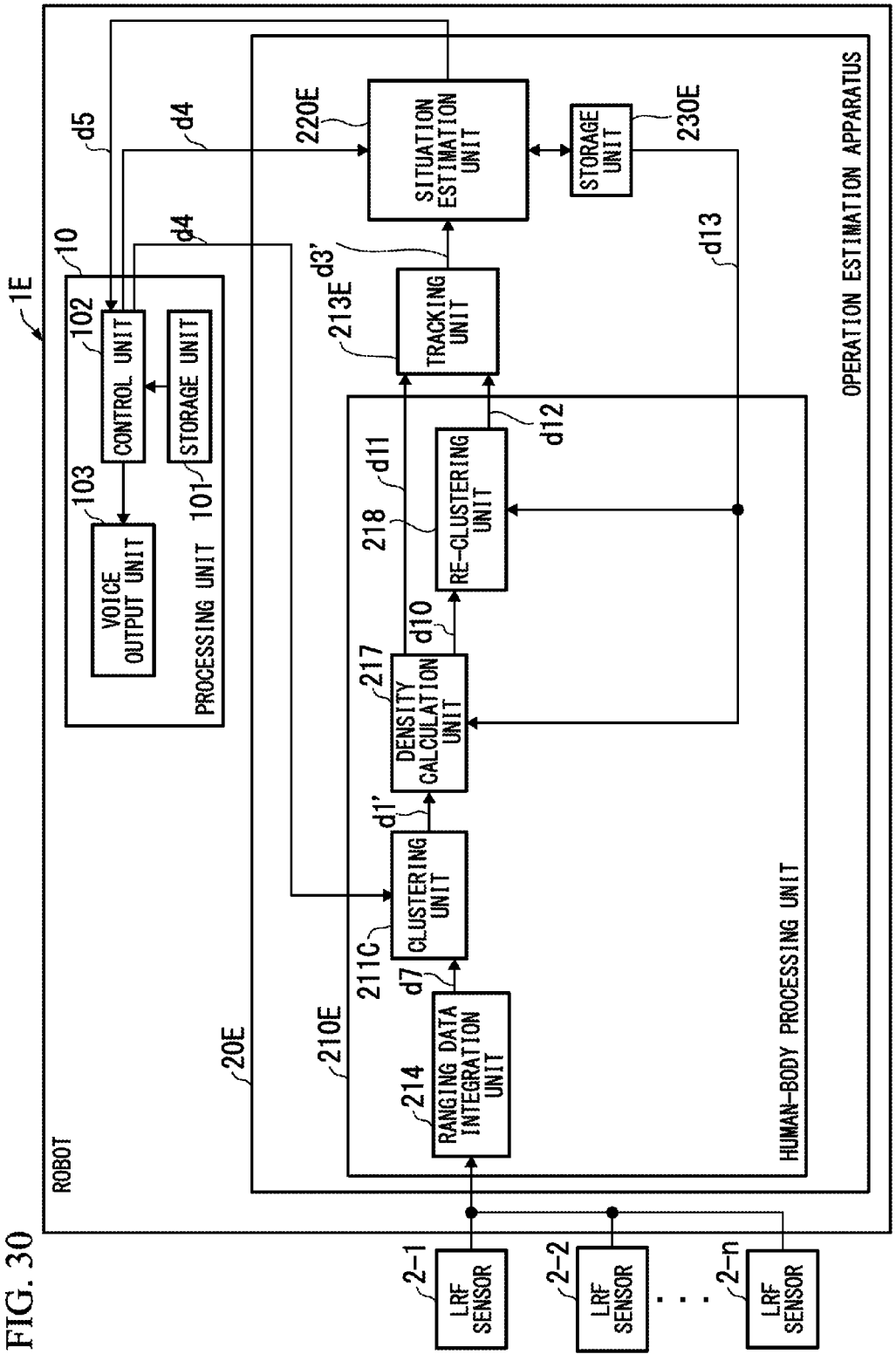
FIG. 30 is a schematic block diagram of a robot according to a seventh embodiment.

FIG. 30 is a schematic block diagram of a robot 1E according to the present embodiment.

As illustrated in FIG. 30, the robot 1E is configured to include a processing unit 10 and an operation estimation apparatus 20E. The robot 1E is connected to n (n is an integer greater than or equal to 1) LRF sensors 2-1 to 2-$n$ (distance measurement units) wirelessly or by wire. Also, the configuration of the processing unit 10 is the same as the configuration of FIG. 1 of the first embodiment. Also, functional units having functions similar to those of the robot 1 (FIG. 1) are assigned the same reference signs and description thereof will be omitted.

The control unit 102 outputs a trigger signal d4 to the clustering unit 211C.

The operation estimation apparatus 20E includes a human-body processing unit 210E, a tracking unit 213E, a situation estimation unit 220E, and a storage unit 230E. The human-body processing unit 210E includes a ranging data integration unit 214, a clustering unit 211C, a density calculation unit 217, and a re-clustering unit 218.

The ranging data integration unit 214 generates integration information d7 by integrating ranging points input from n LRF sensors 2 and outputs the integrated integration information d7 to the clustering unit 211C.

The clustering unit 211C performs a clustering process on information d7 of integrated range points input from the ranging data integration unit 214 and generates human cluster data. Also, the human cluster data position and the human cluster data height are included for each cluster in the human cluster data. The clustering unit 211C obtains an average value of heights of each cluster in the second period on the basis of a trigger signal d4 input from the control unit 102 and designates the obtained average value as a height of each person derived from each cluster. Thereafter, the clustering unit 211C obtains a threshold value (for example, an acromion height) on the basis of a height of each person and human physique data. The clustering unit 211C extracts a ranging point higher than or equal to the acromion height within ranging points included in the cluster. The clustering unit 211C outputs human cluster data d1' obtained by adding the extracted ranging point higher than or equal to the acromion height to the generated human cluster data to the density calculation unit 217.

The storage unit 230E stores a predetermined value for calculating a hand-raising threshold value and a determination threshold value. A density threshold value is stored in the storage unit 230E. Also, the storage unit 230E pre-stores statistical data (human physique data) such as the human height and the acromion height.

The density calculation unit 217 calculates the density of each cluster according to a well-known technique using the human cluster data d1' input from the clustering unit 211C. The density calculation unit 217 determines that the density of the cluster is low in the case of the cluster in which the calculated density is greater than a density determination threshold value d13 stored in the storage unit 230E. Also, the user pre-sets the density determination threshold value, for example, according to actual measurement. When it is determined that the density is low, the density calculation unit 217 outputs the input human cluster data d1' as the human cluster data d10 to the re-clustering unit 218. When it is determined that the density is high, the density calculation unit 217 excludes ranging point data from the input human cluster data d1' and outputs human cluster data d11 to which the number of small clusters of 0 is further added to the tracking unit 213E. That is, the human cluster data d11 input to the tracking unit 213E includes the number of small clusters of 0, the human cluster data position, and the human cluster data height.

The re-clustering unit 218 re-performs a clustering process (hereinafter, referred to as a re-clustering process) on the human cluster data d10 input from the density calculation unit 217 for human cluster data and generates reproduced human cluster data d12. In the re-clustering process, for example, the threshold value is reduced, the Ward method is used, and the re-clustering unit 218 generates a small cluster by re-classifying the cluster. The re-clustering unit 218 adds the number of small clusters generated in the re-clustering process to the human cluster data d1' generated by the clustering unit 211C. Here, the number of small clusters within the human cluster is a value greater than or equal to 1. The re-clustering unit 218 outputs the generated reproduced cluster data d12 to the tracking unit 213E. The reproduced cluster data d12 includes the number of small clusters which is a value greater than or equal to 1, a human cluster data position, and a human cluster data height.

Either the human cluster data d11 from the density calculation unit 217 or the reproduced human cluster data d12 from the re-clustering unit 218 is input to the tracking unit 213E for each cluster. That is, either the human cluster data processed in a re-clustering process or the human cluster data not processed in the re-clustering process is input to the tracking unit 213E for each cluster. Also, whether human cluster data of a certain person is detected as the human cluster data d11 or detected as the reproduced human cluster data d12 may be different according to each frame. When no re-clustering process is performed, the number of small clusters within the human cluster data d11 is 0. When the re-clustering process is performed, the number of small clusters within the human cluster data d12 is a value greater than or equal to 1. The tracking unit 213E performs a tracking process at each predetermined time interval using the human cluster data d11 and the reproduced human cluster data d12. The tracking unit 213E first assigns an ID to each piece of input human cluster data. Next, the tracking unit 213E assigns the same ID as that assigned in a previous frame to human cluster data regarded to be that of the same person as a result of performing the tracking process in time series on the basis of a position of the human cluster data. The tracking unit 213E generates human data d3' by associating the number of small clusters, an ID obtained as a result of performing the tracking process, the position information, and the height information for each person and outputs the generated human data d3' to the situation estimation unit 220E.

A trigger signal d4 based on scenario information is input from the control unit 102 to the situation estimation unit 220E.

The situation estimation unit 220E detects the number of small clusters for each piece of human data using human data d3' input from the tracking unit 213E during the third period. The situation estimation unit 220E estimates whether hand raising is performed for each piece of human data on the basis of the number of small clusters for each piece of detected human data. Here, human data for which the number of small clusters is 0 is generated from the human cluster data for which no re-clustering is performed because the density is high. In this case, the situation estimation unit 220E determines hand raising by comparing a maximum value of height information of the third period with an average value of height information of the second period. On the other hand, because human data for which the number of small clusters is greater than or equal to 1 is generated from human cluster data obtained by executing re-clustering because the density is low. In this case, the situation estimation unit 220E determines that the hand raising is performed when the number of small clusters is greater than or equal to 2 in the third period.

The situation estimation unit 220E finds a majority decision by performing the above-described estimation a predetermined number of times according to a trigger signal d4 and estimating when the number of persons raising their hands is largest. The situation estimation unit 220E outputs a majority decision result as information d5 indicating a detection result to the processing unit 10.

<Technique of Re-Clustering all Clusters within Region>

Also, although an example in which re-clustering is performed for each cluster has been described in the above-described example, the present invention is not limited thereto. The density calculation unit 217 may calculate densities for all clusters included in each region capable of being measured by a plurality of LRF sensors 2. The re-clustering unit 218 may re-cluster clusters within the region according to a density of each region.

In this case, the density calculation unit 217 calculates a density of spectators for each region capable of being measured by the plurality of LRF sensors 2 using human cluster data d1' input from the clustering unit 211C. The density calculation unit 217 calculates a distance between closest spectators in each region and determines that the density in the region is low when the calculated distance is greater than the density determination threshold value stored in the storage unit 230E. Also, the user pre-sets a density determination threshold value, for example, according to actual measurement. When it is determined that the density is low, the density calculation unit 217 outputs information obtained by adding ranging point data other than that of a ranging point higher than or equal to the acromion height to the input human cluster data d1' as the human cluster data d10 to the re-clustering unit 218.

In the operation estimation apparatus (for example, the operation estimation apparatus 20E) of the present embodiment, the human-body processing unit (for example, the human-body processing unit 210E) includes: a density calculation unit (for example, the density calculation unit 217) configured to calculate a density with a peripheral cluster for each cluster on the basis of a distance between clusters classified by the clustering unit (for example, the clustering unit 211C) configured to generate human cluster data obtained by clustering the distances; and a re-clustering unit (for example, the re-clustering unit 218) configured to calculate a threshold value set on the basis of human physique data from a measurement value of a height included in a region of a cluster for each cluster with respect to the cluster in which the density calculated by the density calculation unit is low, extract a measurement point having a measurement value of the height greater than the calculated threshold value, and generate one or more small clusters smaller than the cluster among clusters by performing a re-clustering process on the extracted measurement point, and the situation estimation unit (for example, the situation estimation unit 220E) estimates the reaction of the person on the basis of the number of small clusters among the clusters.

Through this configuration, according to the present embodiment, a ranging point higher than or equal to the acromion height of each person is extracted from ranging points included in each cluster when the density is low and the ranging point is re-clustered. Thereby, according to the present embodiment, two small clusters of a human head cluster and a hand cluster can be obtained when the person raises his/her hand. As a result, according to the present embodiment, it is possible to estimate that the person raises his/her hand even when the hand is slightly raised.

Also, according to the present embodiment, the re-clustering unit 218 can perform separation into two clusters even when the hand is raised in a forward direction, a lateral direction, an oblique direction, or the like and the height of hand raising is not sufficiently high. As a result, according to the present embodiment, it is possible to estimate that the person raises his/her hand even when the hand is raised in a forward direction, a lateral direction, an oblique direction, or the like and the height of hand raising is not sufficiently high.

<Modified Example of FIG. 30>

Next, the modified example of FIG. 30 will be described.

Figure 31:
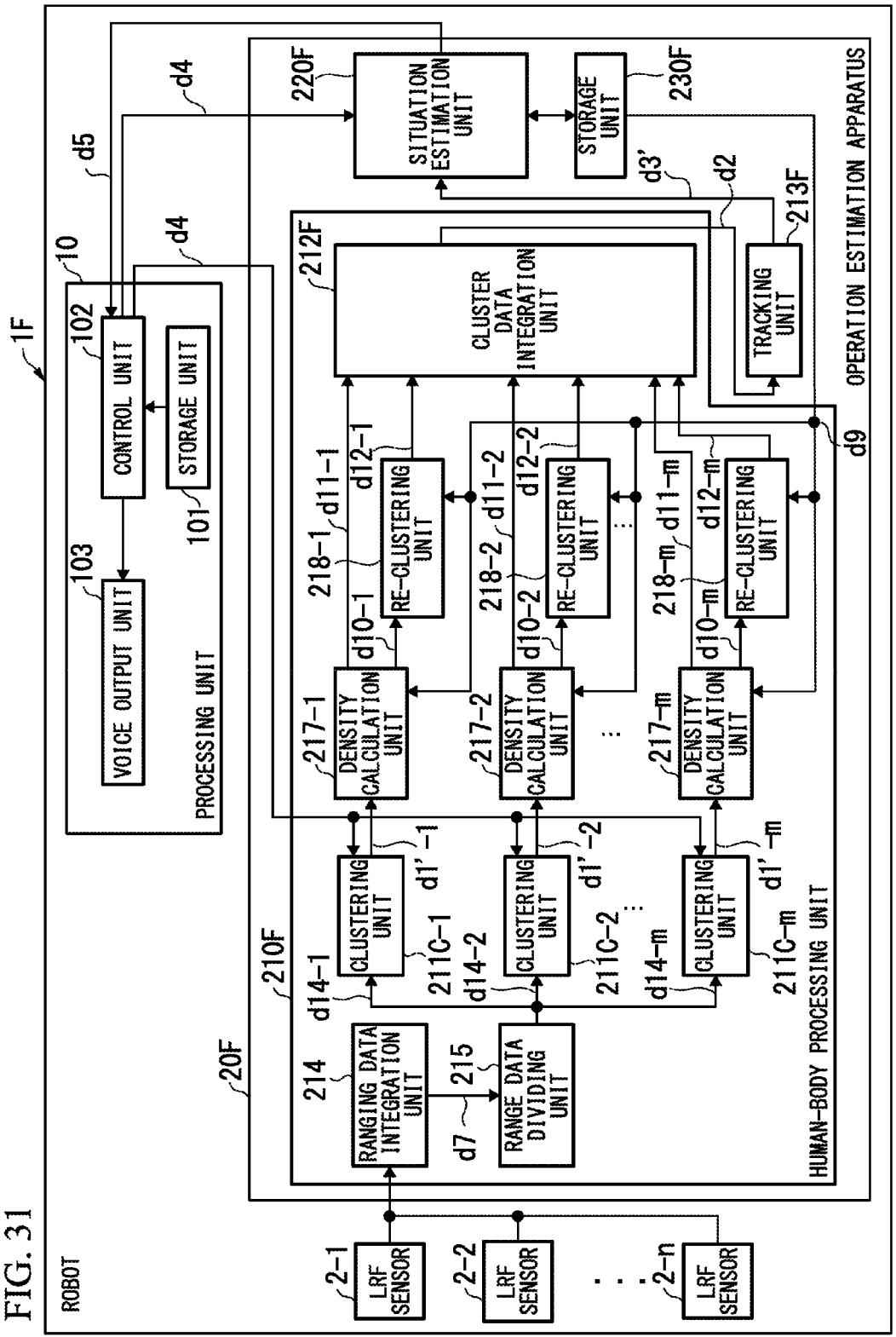
FIG. 31 is a schematic block diagram of a modified example of the robot according to the seventh embodiment.

FIG. 31 is a schematic block diagram of a modified example of the robot 1F according to the present embodiment.

As illustrated in FIG. 31, the robot 1E is configured to include a processing unit 10 and an operation estimation apparatus 20F. The robot 1E is connected to n (n is an integer greater than or equal to 1) LRF sensors 2-1 to 2-n (distance measurement units) wirelessly or by wire. Also, the configuration of the processing unit 10 is the same as the configuration of FIG. 1 of the first embodiment. Also, functional units having functions similar to those of the robot 1 (FIG. 1) are assigned the same reference signs and description thereof will be omitted.

The control unit 102 outputs a trigger signal d4 to the clustering units 211C-1 to 211C-m.

The operation estimation apparatus 20F includes a human-body processing unit 210F, a tracking unit 213F, a situation estimation unit 220F and a storage unit 230F. The human-body processing unit 210F includes a ranging data integration unit 214, a ranging data dividing unit 215, clustering units 211C-1 to 211C-m (m is an integer greater than or equal to 1), density calculation units 217-1 to 217-m, re-clustering units 218-1 to 218-m, and a cluster data integration unit 212F.

Also, when none of the clustering units 211C-1 to 211C-m are specified, the clustering units 211C-1 to 211C-m are referred to as a clustering unit 211C. When none of the density calculation units 217-1 to 217-m are specified, the density calculation units 217-1 to 217-m are referred to as a density calculation unit 217. When none of the re-clustering units 218-1 to 218-m are specified, the re-clustering units 218-1 to 218-m are referred to as a re-clustering unit 218. Also, when none of input cluster data d1-1 to d1-m are specified, the input cluster data d1-1 to d1-m is referred to as input cluster data d1. Also, when none of reproduced human cluster data d11-1 to d11-m are specified, the reproduced human cluster data d11-1 to d11-m is referred to as reproduced human cluster data d11.

An operation of the ranging data integration unit 214 is similar to that of the operation estimation apparatus 20C described using FIG. 22.

The ranging data dividing unit 215 divides the integration information d7 input from the ranging data integration unit 214 into m virtual regions each having a predetermined area and outputs information d14-1 to d14-m of ranging points for virtual region divisions to the corresponding clustering units 211C-1 to 211C-m.

The clustering units 211C-1 to 211C-m generate human cluster data d1'-1 to d1'-m by performing a clustering process on information d14-1 to d14-m of ranging points of virtual regions input from the ranging data dividing unit 215. Also, the human cluster data includes a human cluster position and a human cluster data height for each cluster.

For example, the clustering unit 211C-1 obtains an average value of heights of each cluster for information d14-1 of a ranging point of a first virtual region in the second period on the basis of the trigger signal d4 input from the control unit 102 for each cluster and designates the obtained average value as a height of each person derived from each cluster. Thereafter, the clustering unit 211C-1 obtains a threshold value (for example, an acromion height) on the basis of a height of each person and human physique data. The clustering unit 211C-1 extracts a ranging point higher than or equal to the acromion height within ranging points included in the cluster. Also, the clustering unit 211C-m obtains an average value of heights of each cluster for information d14-m of a ranging point of an $m^{th}$ virtual region in the second period on the basis of the trigger signal d4 and designates the obtained average value as a height of each person derived from each cluster. Thereafter, the clustering unit 211C-m obtains a threshold value (for example, an acromion height) on the basis of a height of each person and human physique data. The cluster unit 211C-m extracts a ranging point higher than or equal to the acromion height within ranging points included in the cluster.

Each clustering unit 211C outputs cluster data d1' obtained by adding the extracted ranging point higher than or equal to the acromion height to the generated human cluster data to the density calculation unit 217.

The storage unit 230F stores a predetermined value for calculating a hand-raising threshold value and a determination threshold value. A density threshold value is stored in the storage unit 230F. Also, the storage unit 230F pre-stores statistical data (human physique data) such as a ratio of the human height and the acromion height.

The density calculation unit 217 calculates the density of each cluster according to a well-known technique in each division region using the human cluster data d1' input from the corresponding clustering unit 211C. The density calculation unit 217 determines that the density of the cluster is low when the calculated density is greater than the density determination threshold value stored in the storage unit 230F. Also, the user pre-sets a density determination threshold value, for example, according to actual measurement. When it is determined that the density is low, the density calculation unit 217 outputs the input human cluster data d1' as the human cluster data d10 to the re-clustering unit 218. That is, data of a ranging point higher than or equal to the acromion height is included in the human cluster data d10. When it is determined that the density is high, the density calculation unit 217 excludes ranging point data from the input human cluster data d1' and outputs human cluster data d11 to which the number of small clusters of 0 is further added to the cluster data integration unit 212F. That is, the human cluster data d11 input to the cluster data integration unit 212F includes the number of small clusters of 0, the human cluster data position, and the human cluster data height.

Figure 32:
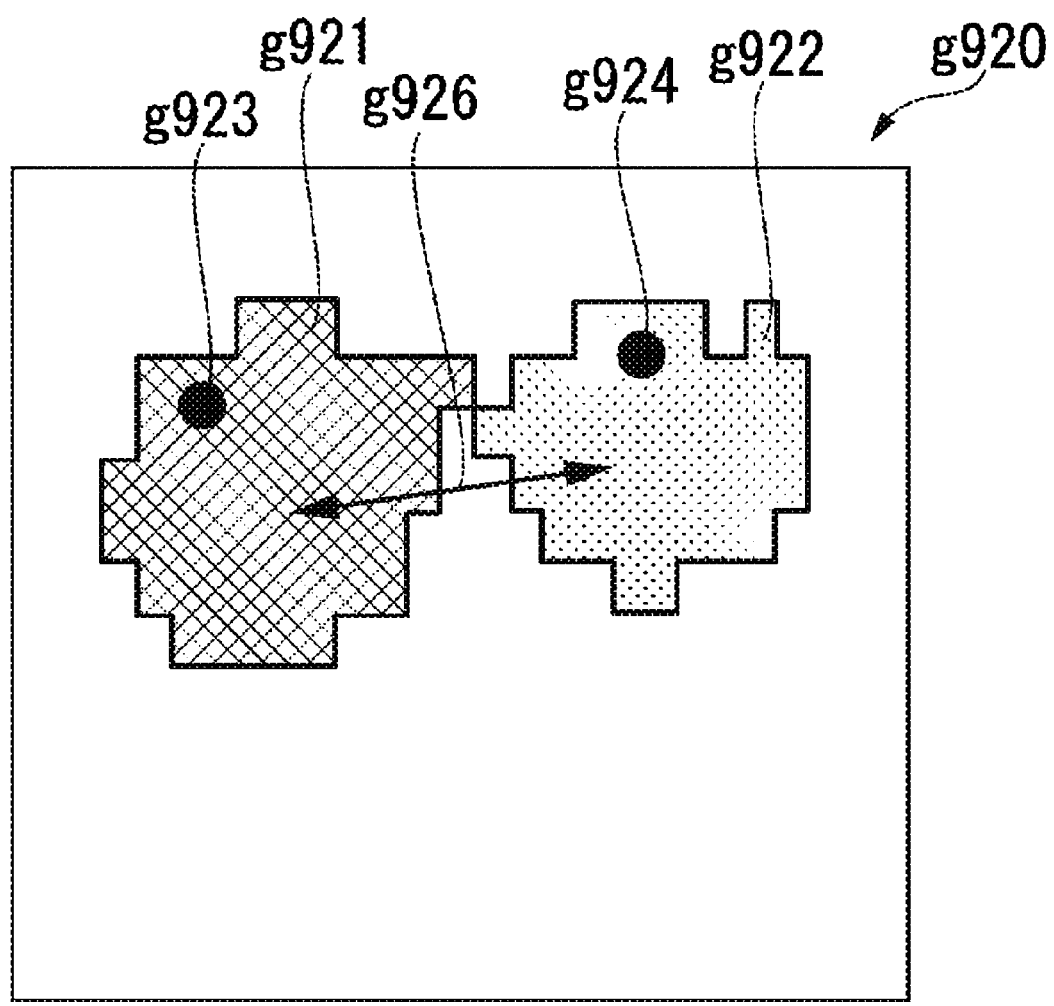
FIG. 32 is a diagram for describing a density according to the seventh embodiment.

FIG. 32 is a diagram for describing a density according to the present embodiment. Also, FIG. 32 is a diagram in which the ranging point is projected onto an xy plane (FIG. 2). In FIG. 32, a diagram indicated by reference sign g920 is a diagram of an example in which persons hu1 and hu2 are in a division region. Also, a region indicated by reference sign g922 is first human cluster data corresponding to the person hu1 and a region indicated by reference sign g921 is second human cluster data corresponding to the person hu2. A point g924 is a point indicating a position of a maximum value of a z-axis direction in the human cluster data of the person hu1 and a point g923 is a point indicating a position of a maximum value of the z-axis direction in the human cluster data of the person hu2. An arrow g926 indicates a distance between centers of gravity of the persons hu1 and hu2.

The description of the operation estimation apparatus 20F will continue with referencing FIG. 31 again.

The re-clustering unit 218 performs a re-clustering process on the human cluster data d10 input from the corresponding density calculation unit 217 for human cluster data and generates reproduced human cluster data d12. Also, in the re-clustering process, for example, the re-clustering unit 218 uses the Ward method while reducing the threshold value, generates a small cluster by re-classifying the cluster, and adds the number of generated small clusters to the reproduced human cluster data d12. The re-clustering unit 218 outputs the generated reproduced human cluster data d12 to the cluster data integration unit 212F. The reproduced human cluster data d12 includes the number of small clusters, a human cluster data position, and a human cluster data height.

Also, even in the modified example illustrated in FIG. 31, the density calculation unit 217 may calculate the density for each of regions capable of being measured by a plurality of LRF sensors 2. The re-clustering unit 218 may be configured to perform re-clustering according to a density.

Either the human cluster data d11 from the density calculation unit 217 or the reproduced human cluster data d12 from the re-clustering unit 218 is input to the cluster data integration unit 212F for each cluster. The cluster data integration unit 212F performs an integration process using both the input human cluster data d11 and the reproduced human cluster data d12. At this time, the number of small clusters of post-integration cluster data becomes a maximum value of the number of small clusters provided in pre-integration cluster data. The cluster data integration unit 212F outputs the integrated human cluster data d2 to the tracking unit 213F.

The integrated human cluster data d2 is input from the cluster data integration unit 212F to the tracking unit 213F. The tracking unit 213F performs a tracking process at each predetermined time interval for each human cluster data using the human cluster data included in the integrated human cluster data d2. The tracking unit 213F first assigns the ID to each piece of input human cluster data. Next, the tracking unit 213F assigns the same ID as that assigned in a previous frame to human cluster data regarded to be that of the same person as a result of performing the tracking process in time series on the basis of a position of the human cluster data. Next, the tracking unit 213F generates human data d3' by associating an ID obtained as a result of performing the tracking process, the position information, and the height information for each person and outputs the generated human data d3' to the situation estimation unit 220F. The human data d3' includes the number of small clusters assigned by the re-clustering unit 218. Also, when no re-clustering process is performed, the number of small clusters is 0.

A trigger signal d4 based on scenario information is input from the control unit 102 to the situation estimation unit 220F.

The situation estimation unit 220F detects the number of small clusters for each piece of human data using the human data d3' input from the tracking unit 213F during the hand-raising period (third period). The situation estimation unit 220F estimates whether hand raising is performed for each piece of human data on the basis of the number of small clusters for each piece of detected human data. When the number of small clusters is 0 in the third period, the situation estimation unit 220F determines hand raising by comparing a maximum value of human data heights of the third period with an average value of human data heights of the hand-lowering period (second period). Also, when the number of small clusters is greater than or equal to 2 in the third period, the situation estimation unit 220F determines that the hand raising is performed on the basis of the number of small clusters of the third period.

The situation estimation unit 220F finds a majority decision by performing the above-described estimation a predetermined number of times according to a trigger signal d4 and estimating when the number of persons raising their hands is largest. The situation estimation unit 220F outputs a majority decision result as information d5 indicating a detection result to the processing unit 10.

Figure 33:
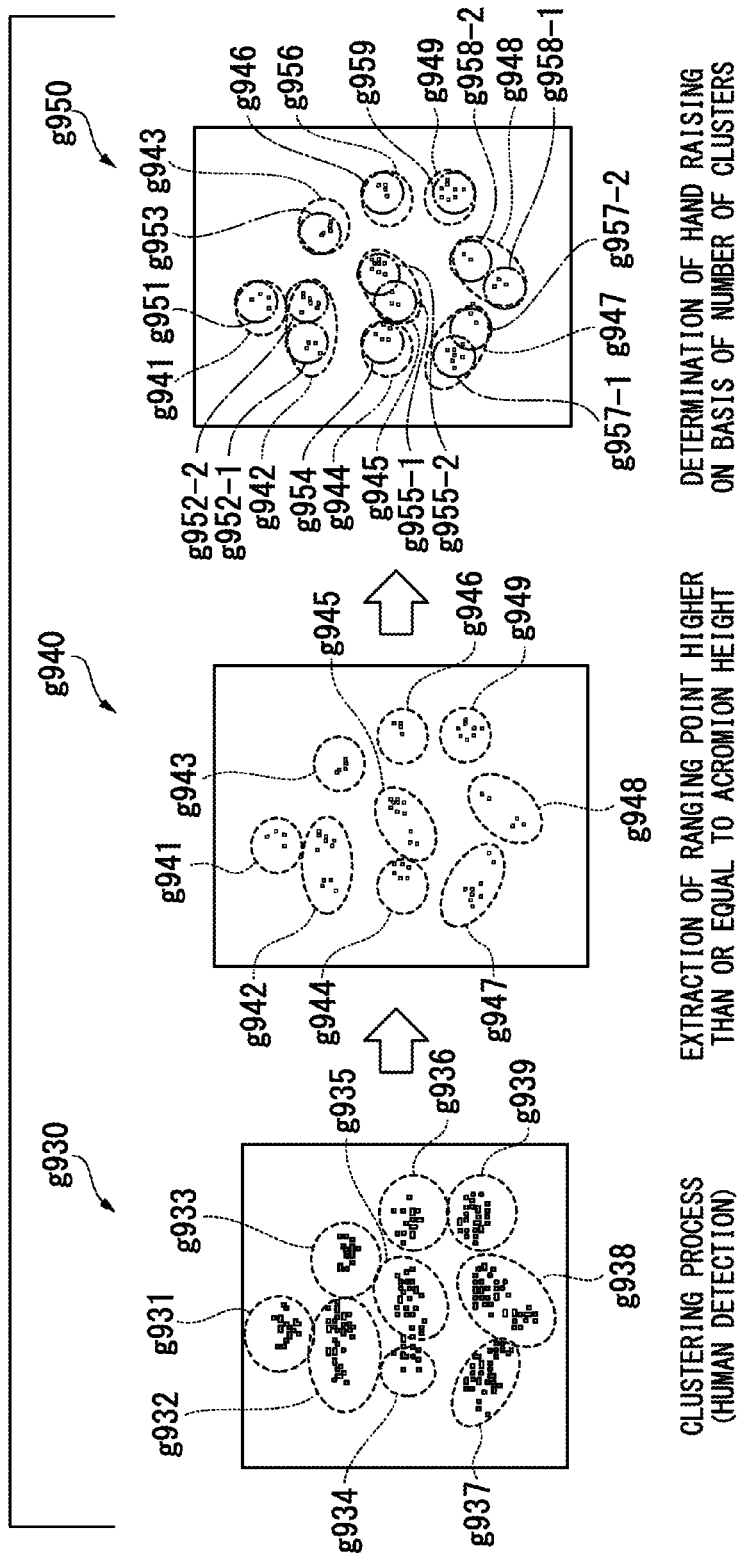
FIG. 33 is a diagram for describing an example of a re-clustering process according to the seventh embodiment.

FIG. 33 is a diagram for describing an example of a re-clustering process according to the present embodiment. Also, an example illustrated in FIG. 33 is an example in which the density of the illustrated region is low. Also, the example illustrated in FIG. 33 is an example in which 9 persons are in a region.

An image indicated by reference sign g930 of FIG. 33 is an image indicating a result of performing the clustering process by the clustering unit 211C. In the image indicated by reference sign g930, each of regions indicated by reference signs g931 to g939 is a cluster which is a collection of ranging points for one person.

An image indicated by reference sign g940 of FIG. 33 is an image in which the ranging points extracted by the re-clustering unit 218 higher than or equal to the acromion height are shown. In an image indicated by reference sign g940, each of the regions indicated by reference signs g941 to g949 is a region in which extracted raging points higher than or equal to the acromion height for each human cluster data are shown.

An image indicated by reference sign g950 of FIG. 33 is an image indicating a cluster after the re-clustering unit 218 performs the re-clustering process. In the image indicated by reference sign g950, each of regions indicated by reference signs g941 to g949 is a region in which extracted ranging points higher than or equal to the acromion height for each human cluster data are shown. In the image indicated by reference sign g950, each of regions indicated by reference signs g951 to g959 is a region in which ranging points on which the re-clustering process is performed for each human cluster data are shown.

In the image indicated by reference sign g950, the number of small clusters after the re-clustering process is performed is one in each of the regions indicated by reference signs g941, g943, g944, g946, and g949. On the other hand, the number of small clusters after the re-clustering process is performed is two in each of the regions indicated by reference signs g942, g945, g947, and g948. For example, a region indicated by reference sign g942 is separated into small clusters indicated by regions indicated by reference signs g952-1 and g952-2 after the re-clustering process.

In the image indicated by reference sign g950 of FIG. 33, a cluster is constituted of ranging points around a head when the number of small clusters is 1 in the reproduced human cluster data. On the other hand, when the number of small clusters of the reproduced human cluster data is greater than or equal to 2, two small clusters are a small cluster constituted of ranging points around the head and a small cluster constituted of ranging points of the hand. That is, when two or more small clusters are in one piece of reproduced human cluster data, this indicates that there are small clusters of the head and the hand. Thus, the situation estimation unit 220F determines whether a person raises his/her hand according to whether the number of small clusters in the one piece of reproduced human cluster data is 1 or 2 or more.

Also, in the image indicated by reference sign g950 of FIG. 33, a region in which human cluster data is shown and a region in which small cluster data is shown are shown on the same image to describe the re-clustering process and the small cluster.

Next, an example of a density when the re-clustering process is performed will be described.

Figure 34:
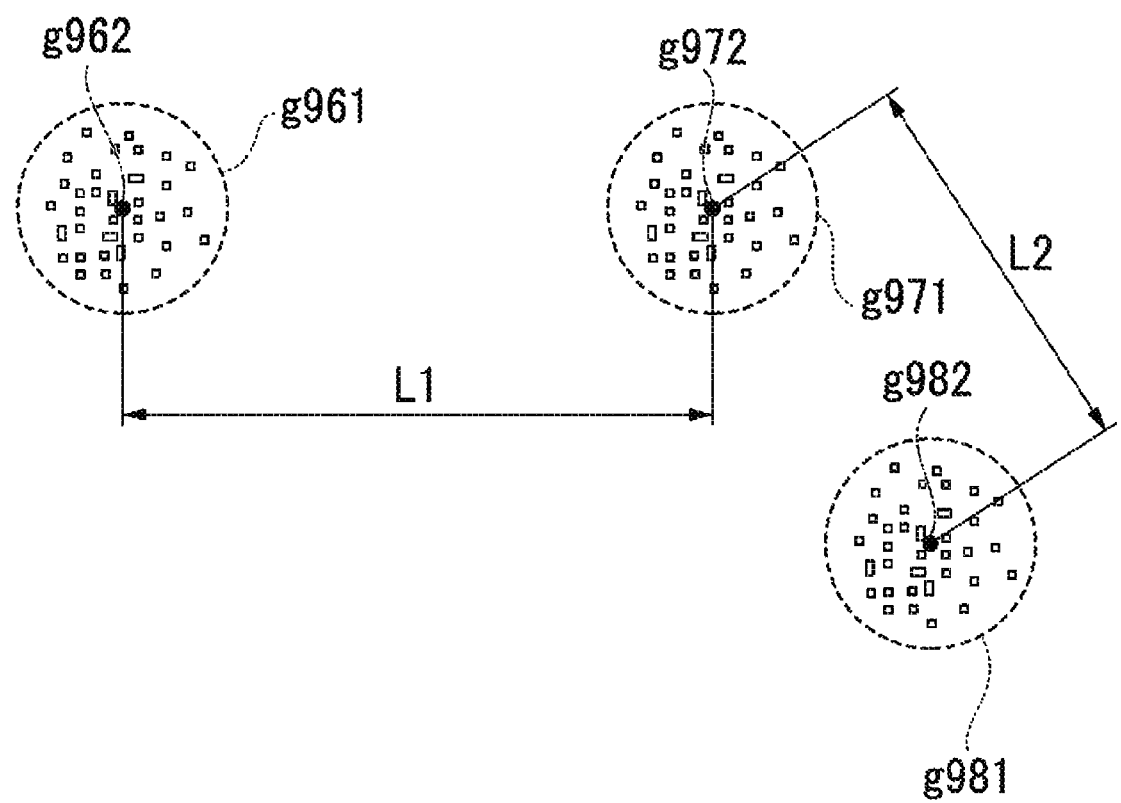
FIG. 34 is an image diagram for describing a density of a cluster according to the seventh embodiment.

FIG. 34 is an image diagram for describing a density of a cluster according to the present embodiment. In FIG. 34, regions surrounded by broken line ellipses g961, g971, and g981 are regions (hereinafter, simply referred to as clusters) in which cluster data is shown. Also, points g962, g972, and g982 indicate centers of the clusters g961, g971, and g981.

In the example illustrated in FIG. 34, a distance between the cluster g961 and the small cluster g971 is L1 and a distance between the cluster g971 and the small cluster g981 is L2. The distance L1 is greater than the distance L2 and is greater than a predetermined value. In this manner, in the present embodiment, a density is low when the distance between the centers of the clusters is greater than the predetermined value. Also, in the present embodiment, a density is high when the distance between the centers of the clusters is less than the predetermined value. That is, in the example illustrated in FIG. 34, the distance between the centers of the clusters g971 and g981 is shorter than the distance between the centers of the clusters g961 and g971.

Next, a processing procedure of hand-raising detection will be described.

Figure 35:
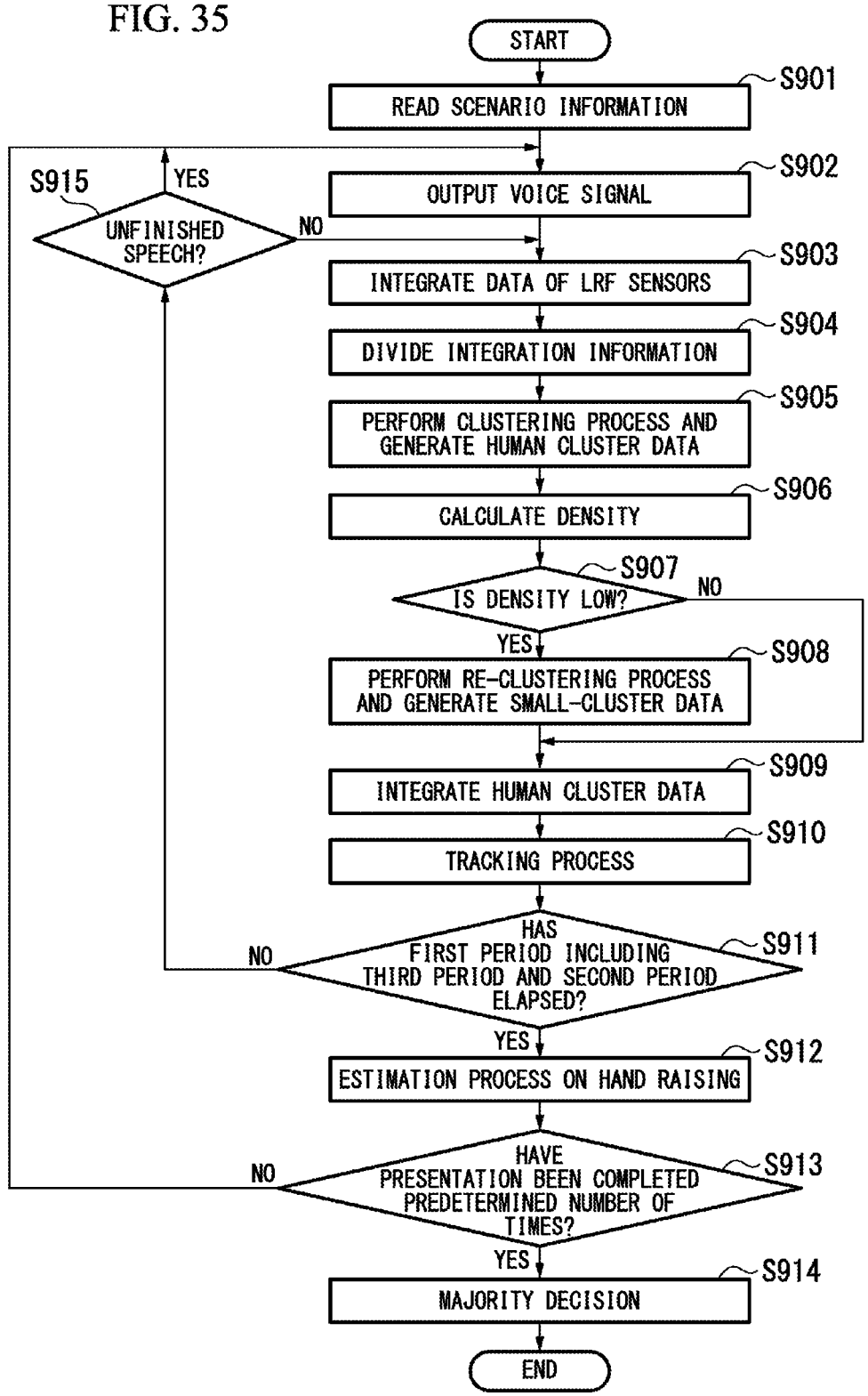
FIG. 35 is a flowchart of a processing procedure of hand-raising detection by the robot according to the seventh embodiment.

FIG. 35 is a flowchart of a processing procedure of hand-raising detection by the robot 1F according to the present embodiment.

(Steps S901 and S902) The control unit 102 performs processes of steps S901 and S902 similar to the processes of step S301 and S302 (FIG. 11). After the processes, the control unit 102 moves the process to step S903.

(Step S903) The ranging data integration unit 214 integrates detection results input from n LRF sensors 2 and outputs integrated integration information d7 to the ranging data dividing unit 215. The ranging data integration unit 214 moves the process to step S904.

(Step S904) The ranging data dividing unit 215 divides integration information d7 input from the ranging data integration unit 214 into m virtual regions each having a predetermined area and outputs ranging points d14-1 to d14-$m$ of virtual regions of divisions to the corresponding clustering units 211C-1 to 211C-m. The ranging data dividing unit 215 moves the process to step S905.

(Step S905) The clustering units 211C-1 to 211C-m generate human cluster data d1' by performing the clustering process in the second period on the basis of the trigger signal d4 input from the control unit 102 for information of ranging points d14-1 to d14-$m$ of virtual regions input from the ranging data dividing unit 215. Next, the clustering units 211C-1 to 211C-m output the generated human cluster data d1'-1 to d1'-$m$ to the corresponding density calculation units 217-1 to 217-$m$. The clustering unit 211C moves the process to step S906.

(Step S906) The density calculation units 217-1 to 217-$m$ calculate densities for clusters using the human cluster data d1'-1 to d1'-$m$ input from the corresponding clustering units 211C-1 to 211C-m. The density calculation unit 217 moves the process to step S907.

(Step S907) The density calculation unit 217 determines whether the calculated density is low. When it is determined that the density is low (step S907; YES), the density calculation unit 217 outputs the human cluster data d1' as the human cluster data d10 to the corresponding re-clustering unit 218 and moves the process to step S908. Alternatively, when it is determined that the density is not low (step S907; NO), the density calculation unit 217 excludes ranging point data from the human cluster data d1', outputs the human cluster data as human cluster data d11 to which the number of small clusters of 0 is further added to the cluster data integration unit 212F, and moves the process to step S909.

(Step S908) The re-clustering unit 218 generates a small cluster by performing a re-clustering process. Next, the re-clustering unit 218 generates reproduced cluster data d12 to which the number of pieces of generated small cluster data is added and outputs the generated reproduced human cluster data d12 to the cluster data integration unit 212F. The re-clustering unit 218 moves the process to step S909.

(Step S909) Either the human cluster data d11 from the density calculation unit 217 or the reproduced human cluster data d12 from the re-clustering unit 218 is input to the cluster data integration unit 212F for each cluster. The cluster data integration unit 212F performs an integration process using both the input human cluster data d11 and the reproduced human cluster data d12. When clusters derived from the same person redundantly detected by the plurality of clustering units are integrated, the number of small clusters of post-integration cluster data becomes a maximum value of the number of small clusters provided in pre-integration cluster data. Next, the cluster data integration unit 212F outputs the generated integrated human cluster data d2 to the tracking unit 213F. The cluster data integration unit 212F moves the process to step S910.

(Step S910) The tracking unit 213F performs a tracking process at each predetermined time interval for each piece of human data using human cluster data included in the input integrated human cluster data d2. Next, the tracking unit 213F generates human data d3' by associating the number of small clusters, an ID obtained as a result of performing the tracking process, position information, and height information for each person and outputs the generated human data d3' to the situation estimation unit 220F.

(Step S911) The situation estimation unit 220F determines whether the first period including the hand-raising period (the third period) (FIG. 5) and the hand-lowering period (the second period) (FIG. 5) has elapsed. The situation estimation unit 220F proceeds to step S912 when it is determined that the first period including the third period and the second period has elapsed (step S911; YES), and proceeds to the process of step S915 when it is determined that the first period including the third period and the second period has not elapsed (step S911; NO).

(Step S915) The situation estimation unit 220F determines whether or not the speech has not been finished.

The situation estimation unit 220F returns to step S902 when it is determined that the speech has not been finished (step S915; YES) and returns to step S903 when it is determined that the speech is finished (step S915; NO).

(Step S912) The situation estimation unit 220F detects the number of small clusters in the third period for each piece of human data. Next, when the number of small clusters of each piece of detected human data is 0, that is, when no re-clustering process is performed, the situation estimation unit 220F determines hand raising by comparing the maximum value of height information of the third period with the average value of height information of the second period. When the number of small clusters for each piece of detected human data is 1, the situation estimation unit 220F estimates that the person does not perform hand raising. Alternatively, when the number of small clusters of each piece of detected human data is 2 or more, the situation estimation unit 220F estimates that the person performs hand raising. Next, the situation estimation unit 220F estimates the number of persons raising their hands in the first period. The situation estimation unit 220F moves the process to step S913.

(Step S913) The situation estimation unit 220F determines whether question presentation has been completed a predetermined number of times on the basis of scenario information. The situation estimation unit 220F proceeds to step S914 when it is determined that the question presentation has been completed a predetermined number of times (step S913; YES) and returns to step S902 when it is determined that the question presentation has not been completed a predetermined number of times (step S913; NO).

(Step S914) The situation estimation unit 220F finds a majority decision on the basis of an estimation result for each question estimated in step S912 after a predetermined question is presented a predetermined number of times on the basis of the scenario information. The situation estimation unit 220F performs a comparison with the number of persons raising their hands for each question estimated in step S912 and selects a question for which the number of persons is largest.

The process of hand-raising detection ends.

According to the present embodiment, ranging points higher than or equal to the acromion height of each person are extracted for each cluster when the density is low and the ranging points are re-clustered. Thereby, according to the present embodiment, two small clusters of a human head cluster and a hand cluster can be obtained when the person raises his/her hand. As a result, according to the present embodiment, it is possible to estimate that the person raises his/her hand even when the hand is slightly raised.

Also, according to the present embodiment, the re-clustering unit 218 can perform separation into two clusters even when the hand is raised in a forward direction, a lateral direction, an oblique direction, or the like and the height of hand raising is not sufficiently high. As a result, according to the present embodiment, it is possible to estimate that the person raises his/her hand even when the hand is raised in a forward direction, a lateral direction, an oblique direction, or the like and the height of hand raising is not sufficiently high.

Also, because a person who captures an image by a portable phone or a digital camera captures an image while viewing a liquid crystal screen in many cases, a ranging point similar to that of hand raising in which his/her hand is slightly raised is obtained.

On the other hand, the operation estimation apparatus 20F is not limited to the first period and continuously observes the number of small clusters for each piece of human data by performing clustering and re-clustering. Next, the operation estimation apparatus 20F may prevent erroneous determination of hand raising by determining that the portable phone or the camera is used without hand raising in relation to human data for which the number of small clusters is 2 or more regardless of the third period and the second period.

Also, although an example in which the situation estimation unit 220F detects the number of small clusters during the third period has been described in the present embodiment, the present invention is not limited thereto. For example, the situation estimation unit 220F may be configured to detect the number of small clusters in a period including the third period and the second period.

Further, the situation estimation unit 220F may be configured to estimate whether the person performs hand raising on the basis of a change in the number of small clusters of each piece of human data of the third period and the second period.

Even in the present embodiment, the situation estimation unit 220F includes the histogram processing unit 221 (FIG. 1) and the histogram processing unit 221 may use at least one of a technique using a histogram described in the first embodiment, a technique described in the third embodiment, a technique described in the fourth embodiment, and a technique described in the fifth embodiment.

Also, the detection region described in the first to seventh embodiments is not limited to, for example, one venue. A plurality of detection regions may be used. In this case, the operation estimation apparatuses 20, 20A, 20B, 20C, 20D, 20E, and 20F may estimate the number of persons raising their hands, for example, in each venue, and the situation estimation units 220, 220A, 220B, 220E, and 220F may determine estimation results in all venues to perform a majority decision process. These venues may be separated. When the venues are separated, a plurality of operation estimation apparatuses 20, 20A, 20B, 20C, 20D, 20E, and 20F may transmit processing results to one operation estimation apparatus 20, 20A, 20B, 20C, 20D, 20E, or 20F, for example, via a wireless link, and the operation estimation apparatus 20, 20A, 20B, 20C, 20D, 20E, or 20F receiving all processing results may perform the process. The processing result received by the operation estimation apparatus 20, 20A, 20B, 20C, 20D, 20E, or 20F may be information of a ranging point, for example, by the LRF sensor 2 or human data and information of a ranging point processed by the operation estimation apparatus 20, 20A, 20B, 20C, 20D, 20E, or 20F installed in each venue.

In this manner, when the robots 1, 1A, 1B, 1C, 1D, 1E, and 1F are installed in a plurality of separated venues and performs a process by acquiring synchronization, voice signals output by the robots 1, 1A, 1B, 1C, 1D, 1E, and 1F may be in accordance with a country or region.

Also, although an example in which the person raises or lowers his/her hand for a question has been described in the first to seventh embodiments, the present invention is not limited thereto. For example, it is possible to perform a majority decision process according to the above-described process even when a plurality of persons in a detection region raise or lower placards or the like to or from a height higher than a head.

Also, the estimation of hand raising may be executed by recording a program for implementing the functions of the operation estimation apparatuses 20, 20A, 20B, 20C, 20D, 20E, and 20F and the control unit 102 of the processing unit 10 in the present invention on a computer-readable recording medium and causing a computer system to read and execute the program recorded on the recording medium. Also, the "computer system" used here is assumed to include an operating system (OS) and hardware such as peripheral devices. Also, the computer system is assumed to include a World Wide Web (WWW) system having a homepage providing environment (or displaying environment). In addition, the "computer-readable recording medium" refers to a storage apparatus including a flexible disk, a magneto-optical disc, a read only memory (ROM), or a portable medium such as a compact disc (CD)-ROM, and a hard disk embedded in the computer system. Furthermore, the "computer-readable recording medium" is assumed to include a medium that holds a program for a constant period of time, such as a volatile memory (random access memory (RAM))

inside a computer system serving as a server or a client when the program is transmitted via a network such as the Internet or a communication circuit such as a telephone circuit.

Also, the above-described program may be transmitted from a computer system storing the program in a storage apparatus or the like via a transmission medium or transmitted to another computer system by transmission waves in a transmission medium. Here, the "transmission medium" for transmitting the program refers to a medium having a function of transmitting information, such as a network (communication network) like the Internet or a communication circuit (communication line) like a telephone circuit. Also, the above-described program may be a program for implementing some of the above-described functions. Further, the above-described program may be a program, i.e., a so-called differential file (differential program), capable of implementing the above-described function in combination with a program already recorded on the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An operation estimation apparatus comprising:
    a distance measurement sensor that measures a distance for a predetermined range; and
    at least one processor in communication with the distance measurement sensor and configured to operate as:
        a human-body processing unit that detects a person on the basis of a distribution of distances measured by the distance measurement sensor;
        a tracking unit that assigns an identifier to each person detected by the human-body processing unit;
        a situation estimation unit that estimates a reaction of the person on the basis of a human data height which is a value of a height direction included in the measured distance in a first period set by prompting the person to start and end hand raising, wherein the situation estimation unit measures the human data height for each person to which the identifier is assigned by the tracking unit a plurality of times in the first period, extracts an identifier for which a plurality of human data heights are in the predetermined range, and estimates the reaction of the person corresponding to the extracted identifier; and
        a control unit that outputs a signal indicating a prompt for the person to start or end the hand raising and controls behavior of a robot on the basis of the estimated reaction of the person.

2. The operation estimation apparatus according to claim 1, wherein the situation estimation unit calculates a hand-raising threshold value set on the basis of an average value or a maximum value of the human data heights in a second period in which no person performs the hand raising for each person and human physique data, extracts a person for which a number of times that the human data height exceeding the hand-raising threshold value is measured is greater than a predetermined number of times in the first period, and estimates the reaction of the extracted person.

3. The operation estimation apparatus according to claim 2, wherein the situation estimation unit determines the predetermined number of times on the basis of the number of times that the human data height exceeding the hand-raising threshold value is measured and information indicating a distribution associated with whether the hand raising is performed in the first period.

4. The operation estimation apparatus according to claim 2, wherein the second period is a period set by prompting the person to end the hand raising, and
    wherein the situation estimation unit calculates an upper-limit threshold value for determining the hand raising on the basis of the human data height for each piece of human data corresponding to each person in the second period, extracts human data for which a number of times that the human data height greater than the hand-raising threshold value and less than the upper-limit threshold value is measured is greater than a predetermined number of times in a third period in which the human performs the hand raising, and estimates the reaction of the person corresponding to the extracted human data.

5. The operation estimation apparatus according to claim 1, wherein the human-body processing unit divides each of a plurality of predetermined ranges into two or more regions, selects a threshold value of a distribution of distances at which the person is detected on the basis of human physique data for each division region, and detects the person on the basis of the distribution of the distances which are measured.

6. The operation estimation apparatus according to claim 5, wherein the human-body processing unit selects physique data of a child as the human physique data for a region close to a robot which outputs a signal indicating a prompt for the person to start or end the hand raising for each division region.

7. The operation estimation apparatus according to claim 1, wherein the distance measurement sensor includes:
    a plurality of distance measurement sensors that measure distances for different predetermined ranges, and
    wherein the at least one processor is further configured to, as part of the human-body processing unit, operate as:
    a plurality of clustering units that generate human cluster data by clustering the distances measured by the distance measurement sensors; and
    a cluster data integration unit that integrates the human cluster data generated by the plurality of clustering units.

8. The operation estimation apparatus according to claim 1, wherein the distance measurement sensor includes:
    a plurality of distance measurement sensors that measure distances for different predetermined ranges,
    wherein the at least one processor is further configured to, as part of the human-body processing unit, operate as:
    a ranging data integration unit that integrates the distances measured by the plurality of distance measurement sensors for two or more predetermined ranges; and
    a clustering unit that classifies the measured distances as a cluster on the basis of a result of integration by the ranging data integration unit and detects the person on the basis of the classified cluster, and wherein the tracking unit assigns the identifier to each person detected by the clustering unit.

9. The operation estimation apparatus according to claim 8,
    wherein the at least one processor is further configured to, as part of the human-body processing unit, operate as:
    a density calculation unit that calculates a density with a peripheral cluster for each cluster on the basis of a distance between clusters classified by the clustering unit which generates human cluster data obtained by clustering the distances; and a re-clustering unit that calculates a threshold value set on the basis of human physique data from a measurement value of a height included in a region of a cluster for each cluster with respect to a cluster in which the density calculated by the density calculation unit is low, extracts a measurement point having a measurement value of the height greater than the calculated threshold value, and generates one or more small clusters smaller than the low density cluster among clusters by performing a re-clustering process on the extracted measurement point, and wherein the situation estimation unit estimates the reaction of the person on the basis of a number of the one or more small clusters among the clusters.

10. The operation estimation apparatus according to claim 1, wherein the distance measurement sensor includes:

a plurality of distance measurement sensors that measure distances for different predetermined ranges, wherein the at least one processor is further configured to, as part of the human-body processing unit, operate as:

a ranging data integration unit that integrates the distances measured by the plurality of distance measurement sensors for two or more predetermined ranges;

a dividing unit that re-divides each of two or more predetermined ranges which are integrated into m (m is an integer greater than or equal to 2) regions which are equal to or different from predetermined regions in shape and number;

m clustering units that classify the measured distances included in each of the m regions as a cluster for each of the m regions and detect the person on the basis of the classified cluster; and a cluster data integration unit that integrates results of detections by the m clustering units, and wherein the tracking unit assigns the identifier to each person detected by the clustering unit on the basis of the integrated results.

11. The operation estimation apparatus according to claim 1, wherein the tracking unit detects the person at a time subsequent to a predetermined time on the basis of a position of human data corresponding to the person detected at the predetermined time.

12. The operation estimation apparatus according to claim 1, wherein the tracking unit generates virtual distance information indicating distance information virtually measured around a position of human data corresponding to the person detected at a predetermined time in information of the distance measured at a time subsequent to the predetermined time, wherein the at least one processor is further configured to operate as a clustering unit which generates human cluster data by clustering the distances and generates mixed distance information in which the virtual distance information is mixed with the information of the distance measured at the subsequent time, wherein the human-body processing unit detects the person at the subsequent time on the basis of the mixed distance information, and wherein the tracking unit assigns the identifier to each person detected by the clustering unit.

13. The operation estimation apparatus according to claim 12, wherein the tracking unit changes a density of the virtual distance information around the position of the human data corresponding to the person detected at the predetermined time according to a time period in which the person is in a predetermined range from the position.

14. The operation estimation apparatus according to claim 12, wherein the tracking unit scatters the virtual distance information around the human data detected at the predetermined time according to a time period in which the person is in a predetermined range from the position so that a center is dense.

15. A robot comprising:

the operation estimation apparatus according to claim 1;

a memory in which a signal output by the robot and an order of output are associated and stored; and wherein the at least one processor is further configured to operate as a control unit that outputs a signal indicating a prompt for the person to start or end the hand raising and controls behavior of the robot on the basis of the reaction of the person estimated by the operation estimation apparatus.

16. An operation estimation method comprising:

a distance measurement procedure in which a distance measurement sensor measures a distance for a predetermined range;

a human processing procedure in which a human-body processing unit, implemented via at least one processor, detects a person on the basis of a distribution of distances measured in the distance measurement procedure;

a tracking procedure in which a tracking unit, implemented via at least one processor, assigns an identifier to each person detected in the human processing procedure;

a situation estimation procedure in which a situation estimation unit, implemented via at least one processor, measures human data height for each person to which the identifier is assigned in the tracking procedure a plurality of times on the basis of the human data height which is a value of a height direction included in the measured distance in a first period set by prompting the person to start and end hand raising, extracts an identifier for which a plurality of human data heights are in the predetermined range, and estimates a reaction of the person corresponding to the extracted identifier outputting procedure in which a signal indicating a prompt for the person to start or end the hand raising and controls behavior of a robot on the basis of the estimated reaction of the person is output; and an outputting procedure in which a signal indicating a prompt for the person to start or end the hand raising is output and which controls behavior of a robot on the basis of the estimated reaction of the person.

* * * * *